(12) United States Patent
Hayashi et al.

(10) Patent No.: US 6,840,647 B2
(45) Date of Patent: Jan. 11, 2005

(54) LIGHTING DEVICE, LIQUID CRYSTAL DISPLAY DEVICE INCLUDING THE SAME, AND METHOD OF FABRICATING THE SAME

(75) Inventors: Kazuhiko Hayashi, Tokyo (JP); Ichiro Fujieda, Tokyo (JP); Atsushi Oda, Tokyo (JP); Setsuo Kaneko, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/991,600

(22) Filed: Nov. 23, 2001

(65) Prior Publication Data
US 2002/0101729 A1 Aug. 1, 2002

(30) Foreign Application Priority Data

Nov. 24, 2000 (JP) ......................................... 2000-357034

(51) Int. Cl.⁷ ........................ G05F 1/1335; H05B 33/00; F21V 8/00
(52) U.S. Cl. ........................ 362/84; 362/31; 362/231; 362/561; 349/65; 349/69
(58) Field of Search ................................. 349/61–67, 69; 362/31, 84, 230, 231, 561; 313/506, 512

(56) References Cited

U.S. PATENT DOCUMENTS

| | | | | | |
|---|---|---|---|---|---|
| 3,262,224 A | * | 7/1966 | Hardesty | ...................... | 362/84 |
| 4,357,557 A | * | 11/1982 | Inohara et al. | ............... | 313/512 |
| 4,573,766 A | * | 3/1986 | Bournay, Jr. et al. | ......... | 349/65 |
| 4,903,172 A | * | 2/1990 | Schoniger et al. | ............. | 362/31 |
| 5,027,258 A | * | 6/1991 | Schoniger et al. | ............. | 362/31 |
| 5,267,062 A | * | 11/1993 | Bottorf | .......................... | 349/69 |
| 5,375,043 A | * | 12/1994 | Tokunaga | ...................... | 362/31 |
| 5,608,837 A | * | 3/1997 | Tai et al. | ........................ | 362/31 |
| 5,618,096 A | * | 4/1997 | Parker et al. | .................. | 362/31 |
| 5,664,862 A | * | 9/1997 | Redmond et al. | .............. | 362/31 |
| 5,704,703 A | * | 1/1998 | Yamada et al. | ................ | 362/31 |
| 5,806,955 A | * | 9/1998 | Parkyn et al. | ................. | 362/31 |
| 6,025,894 A | * | 2/2000 | Shirasaki et al. | .............. | 349/69 |
| 6,036,327 A | * | 3/2000 | Blonder | ........................ | 362/31 |
| 6,121,726 A | * | 9/2000 | Codama et al. | .............. | 313/512 |
| 6,198,220 B1 | * | 3/2001 | Jones et al. | .................. | 313/512 |
| 6,250,767 B1 | * | 6/2001 | Kusafuka et al. | .............. | 362/31 |
| 6,254,246 B1 | * | 7/2001 | Tiao et al. | ..................... | 362/31 |
| 6,285,422 B1 | * | 9/2001 | Maeda et al. | ................. | 349/69 |
| 6,375,335 B1 | * | 4/2002 | Tabata et al. | .................. | 362/31 |

FOREIGN PATENT DOCUMENTS

| | | |
|---|---|---|
| JP | 10-50124 | 2/1998 |
| JP | 10-268308 | 10/1998 |
| JP | 11-202799 | 7/1999 |
| JP | 11-326898 | 11/1999 |
| JP | 11-326903 | 11/1999 |
| JP | 2000-19330 | 1/2000 |
| JP | 2000-29008 | 1/2000 |
| JP | 2000-155315 | 6/2000 |

* cited by examiner

*Primary Examiner*—Alan Cariaso
(74) *Attorney, Agent, or Firm*—Scully, Scott, Murphy & Presser

(57) ABSTRACT

A lighting device includes (a) an electroluminescence device which acts as a light source, and (b) an optical conductor which introduces a light emitted from the electroluminescence device, to a liquid crystal display device. The electroluminescence device is formed on an end surface of the optical conductor. The lighting device may be used as a backlight source in a liquid crystal display device.

110 Claims, 52 Drawing Sheets

LIGHTING DEVICE, LIQUID CRYSTAL DISPLAY DEVICE INCLUDING THE SAME, AND METHOD OF FABRICATING THE SAME

BACKGROUND OF THE INVENTION

1. Field of the Invention

The invention relates to a lighting device to be used for a liquid crystal display device and including an electroluminescence device a liquid crystal device including the lighting device, and a method of fabricating the lighting device.

2. Description of the Related Art

A conventional lighting device used in a liquid crystal display device was generally designed to include a transparent optical inductor such as an acrylic plate, and a fluorescent tube or a light emitting diode arranged on an end surface of the optical inductor. Such a lighting device can be grouped into a front-light type lighting device used for a reflection type liquid crystal display device, and a back-light type lighting device used for a transmission type or a combination type liquid crystal display device. The front-light type lighting device is positioned in front of the reflection type liquid crystal display device, and emits a light to the liquid crystal display device, whereas the back-light type lighting device is positioned at the rear of the transmission or combination type liquid crystal display device, and emits a light through a back of the liquid crystal display device.

The reflection type liquid crystal display device including the front-light type lighting device is disclosed, for instance, in Japanese Unexamined Patent Publications Nos. 2000-29008, 2000-19330 and 11-326903.

Hereinbelow is explained a structure of the reflection type liquid crystal display device including the front-light type lighting device, disclosed in Japanese Unexamined Patent Publication No. 2000-29008, as a typical one.

FIG. 1 illustrates a conventional front-light type lighting device used for a reflection type liquid crystal display device.

The front-light type lighting device 110 is comprised of a linear light source 111, a reflector 109 in which the linear light source 111 is located, an optical conductor 112 through which a light emitted from the light source 111 is introduced into a liquid crystal display device (not illustrated), and a protector 113 located above an upper surface of the optical conductor 112.

The linear light source 111 is comprised of a plurality of cold cathode ray tubes or light-emitting diodes arranged in a line, and is spaced away from an end surface 112a of the optical conductor 112. The optical conductor 112 is formed at an upper surface or a reflection surface 112b at which a light emitted from the light source 111 is reflected, with a sawtooth.

In operation, a light emitted from the light source 111 enters the optical conductor 112 through the end surface 112a, is reflected at the reflection surface 112b, and leaves the optical conductor 112 through a lower surface 112c.

An example of a reflection type liquid crystal display device including a back-light type lighting device is disclosed, for instance, in "Monthly Display", May 1996, pp. 35. FIG. 2 illustrates an example of a reflection type liquid crystal display device including a back-light type lighting device.

A back-light type lighting device 130 is comprised of a light source 111, a reflector 109 in which the linear light source 111 is located, an optical conductor 112 through which a light emitted from the light source 111 is introduced into a liquid crystal display device (not illustrated), a reflector 131 making close contact with a lower surface 112b of the optical conductor 112 for reflecting a light emitted from the light source 111, a diffusion plate 134 facing an upper surface 112c of the optical conductor 112, a first lenticular lens 132 located in parallel with the diffusion plate 134, and a second lenticular lens 133 located between the diffusion plate 134 and the first lenticular lens 132.

The diffusion plate 134 and the first and second lenticular lens 132 and 133 ensure that a light having been introduced in the optical conductor 112 effectively leaves the optical conductor 112 through the upper surface 112c, and further widen a viewing angle.

In operation, a light emitted from the light source 111 enters the optical conductor 112 through an end surface 112a, is reflected at the lower surface 112b of the optical conductor 112, and leaves the optical conductor 112 through the upper surface 112c into a liquid crystal display device (not illustrated) through the first and second lenticular lens 132 and 133.

For instance, Japanese Unexamined Patent Publication No. 10-50124 has suggested a lighting device including an organic electroluminescence device as a light source, and an optical conductor through which a light emitted from the electroluminescence device is introduced into a liquid crystal display device. The electroluminescence device is spaced away from an end surface of the optical conductor.

In all of the above-mentioned conventional lighting devices, a light source and an optical conductor are fabricated separately from each other, and then, they are adhered to each other. In such a structure, it would be unavoidable that some spacing is generated between the light source 111 the end surface 112a of the optical conductor 112.

As illustrated in FIG. 1, lights emitted from the light source 111 are not always introduced into the optical conductor 112. Though about 30% of the lights are surely introduced into the optical conductor 112 as indicated with an arrow 107, about 70% of the lights are not introduced into the optical conductor 112 as indicated with arrows 108.

A light required for illuminating a liquid crystal display device is fixed in an amount. The lost lights indicated with arrows 108 cause an increase in power consumption. Since almost all power consumption is made by the lighting device in a liquid crystal display device, power loss caused by the lost lights would pose a problem that a lifetime of a battery is much shortened in a case where a liquid crystal display device is used in a handy communication device such as a cellular phone.

Japanese Unexamined Patent Publication No. 10-268308 has suggested a lighting device including a light source, and an optical conductor through which a light emitted from the light source is introduced to a target. The lighting device is arranged in front of the target. The optical conductor includes a first optical sub-conductor having a first surface through which a light emitted from the light source enters the optical conductor, and a second optical sub-conductor having a second surface through which the light leaves the optical conductor to the target. The first optical sub-conductor introduces the light to the second optical sub-conductor, which allows the light to pass therethrough in a direction normal to the second surface.

Japanese Unexamined Patent Publication No. 11-202799 has suggested a reflection type liquid crystal display device including a reflection type liquid crystal panel, an optical conductor which reflects a light emitted from a light source, in a thickness-wise direction thereof for illuminating the liquid crystal display panel, and a linear organic electroluminescence device. The organic electroluminescence device is comprised of a linear transparent electrode facing an end surface of the optical conductor, and patterned in a width smaller than a thickness of the optical conductor, a metal electrode which mirror-reflects a light and has a width greater than a width of the linear transparent electrode, an organic electroluminescence material located between the transparent electrode and the metal electrode.

Japanese Unexamined Patent Publication No. 11-326898 has suggested a reflection type liquid crystal display device including a liquid crystal layer sandwiched between a pair of substrates facing each other, a liquid crystal display element having a reflector on one of the substrates, a plate-shaped optical conductor arranged on the other of the substrates, a light source positioned adjacent to an end surface of the optical conductor, and a plurality of transmission dots three-dimensionally formed on a principal surface of the optical conductor adjacent to the liquid crystal display element, and having a mirror surface as a top surface in parallel with the principal surface.

Japanese Unexamined Patent Publication No. 2000-155315 has suggested a front-light type lighting device including a light source, and an optical conductor having an end surface through which a light emitted from the light source enters the optical conductor, and a first surface perpendicular to the end surface, through which the light leaves the optical conductor. A device for allowing a particular polarized light to pass the optical conductor is adhered to the first surface of the optical conductor such that a light is not reflected at an interface between the device and the optical conductor.

However, the above-mentioned problem remains unsolved even in the above-mentioned Publications.

SUMMARY OF THE INVENTION

In view of the above-mentioned problem in the conventional lighting devices, it is an object of the present invention to provide a lighting device which capable of preventing power loss caused by lost lights.

It is also an object of the present invention to provide both a liquid crystal display device including the lighting device, and a method of fabricating the lighting device.

In one aspect of the present invention, there is provided a lighting device including (a) an electroluminescence device which acts as a light source, and (b) an optical conductor which introduces a light emitted from the electroluminescence device, to a liquid crystal display device, the electroluminescence device being formed on an end surface of the optical conductor.

It is preferable that a face of the electroluminescence device through which the electroluminescence device emits a light is formed in the form of a line in a length-wise direction of the end surface of the optical conductor.

The lighting device may further include a reflector covering the end surface of the optical conductor to prevent a light having been introduced into the optical conductor from the electroluminescence device, from leaking out of the end surface of the optical conductor.

It is preferable that the electroluminescence device is comprised of a plurality of electroluminescence device groups each including a plurality of sub-devices emitting lights having different wavelengths from one another.

It is preferable that the electroluminescence device groups are periodically repeatedly arranged in a direction in which sub-devices are arranged.

It is preferable that the electroluminescence device groups are periodically repeatedly arranged in a direction perpendicular to a direction in which sub-devices are arranged.

It is preferable that each of the electroluminescence device groups includes a first sub-device emitting a red light, a second sub-device emitting a green light, and a third sub-device emitting a blue light.

The lighting device may farther include partitions between which the sub-devices are arranged or which at least partially surrounds the sub-devices.

It is preferable that each of the partitions is comprised of resist.

It is preferable that the electroluminescence device emits a light having a mixture color of red, green and blue.

It is preferable that the electroluminescence device has a multi-layered structure including a transparent electrode layer, a hole-injecting layer, a light-emitting layer, an electron-transporting layer, and a metal electrode layer stacked in this order as viewing from the optical conductor.

It is preferable that the electroluminescence device is comprised of a plurality of electroluminescence device groups each including a plurality of sub-devices emitting lights having different wavelengths from one another, and the electroluminescence device has a multi-layered structure including a transparent electrode layer, a hole-injecting layer, a light-emitting layer, an electron-transporting layer, and a metal electrode layer stacked in this order as viewing from the optical conductor.

It is preferable that at least one of the metal electrode layer, the electron-transporting layer, the hole-injecting layer and the transparent electrode layer is formed across the sub-devices such that each of the sub-devices commonly includes the at least one of the metal electrode layer, the electron-transporting layer, the hole-injecting layer and the transparent electrode layer.

It is preferable that one of the metal electrode layer and the transparent electrode layer is formed across the sub-devices, and the other has a smaller width than a width of each of the sub-devices.

It is preferable that the light-emitting layer and the electron-transporting layer are replaced with a single layer having the functions of the light-emitting layer and the electron-transporting layer.

It is preferable that the light-emitting layer, the electron-transporting layer and the hole-injecting layer are replaced with a single layer having the functions of the light-emitting layer, the electron-transporting layer and the hole-injecting layer.

It is preferable that the electroluminescence device emits a light by applying a current to a thin organic film.

It is preferable that the optical conductor is formed with a sawtooth-shaped portion at a first surface through which a light emitted from the electroluminescence device passes outwardly.

It is preferable that the sawtooth portion is defined by surfaces extending in parallel with the first surface and surfaces extending perpendicularly to the first surface.

The lighting device may further include a light-permeable expansion formed on the end surface of the optical conductor, the electroluminescence device being formed on the expansion such that a dispersion angle of a light emitted from the electroluminescence device is reduced.

It is preferable that the electroluminescence device has a shape reflecting a shape of a surface of the expansion.

It is preferable that the expansion has an arcuate surface.

It is preferable that the electroluminescence device is comprised of a transparent electrode layer, a hole-injecting layer, a light-emitting layer, an electron-transporting layer and a metal electrode layer stacked in this order as viewing from the optical conductor, and wherein the expansion has an index of refraction greater than indices of refraction of the hole-injecting layer, the light-emitting layer and the electron-transporting layer.

It is preferable that the optical conductor is formed at the end surface thereof with a recess in which the electroluminescence device is formed.

For instance, the recess is arcuate.

It is preferable that the optical conductor is tapered at at least one of upper and lower surfaces adjacent to the end surface such that an incident angle of a light emitted from the electroluminescence device into the optical conductor is reduced.

It is preferable that the optical conductor is tapered around each of the electroluminescence device groups at at least one of upper and lower surfaces adjacent to the end surface associated with each of the electroluminescence device groups such that an incident angle of a light emitted from each of the electroluminescence device groups into the optical conductor is reduced.

The lighting device may further include a resin entirely covering the electroluminescence device therewith to hermetically seal the electroluminescence device from surroundings.

The lighting device may further include a sealing cap entirely covering the electroluminescence device therewith to hermetically seal the electroluminescence device from surroundings.

The lighting device may further include at least one of a deoxidizer and a dehydrator sandwiched between the resin and the electroluminescence device.

The lighting device may further include at least one of a deoxidizer and a dehydrator sandwiched between the sealing cap and the electroluminescence device.

It is preferable that the sealing cap has a function of at least one of deoxidization and dehydration.

There is further provided a lighting device including (a) an electroluminescence device which acts as a light source, and (b) an optical conductor which introduces a light emitted from the electroluminescence device, to a liquid crystal display device, the electroluminescence device being at least partially embedded in the optical conductor such that at least one layer among layers constituting the electroluminescence device is embedded in the optical conductor.

In another aspect of the present invention, there is provided a liquid crystal display device including (a) a first substrate, (b) a second substrate, (c) a liquid crystal layer sandwiched between the first and second substrates, and (d) a lighting device emitting a light through the first substrate, the liquid crystal layer and the second substrate in this order such that a viewer can see produced images through the light, the lighting device including (d1) an electroluminescence device which acts as a light source, and (d2) an optical conductor which introduces a light emitted from the electroluminescence device, to a liquid crystal display device, the electroluminescence device being formed on an end surface of the optical conductor.

The liquid crystal display device may further include a half-mirror located between the first substrate and the optical conductor.

The liquid crystal display device may further include (e) a brightness detector which detects a brightness around the liquid crystal display device, and (f) a controller which turns the lighting device on or off in accordance with the brightness detected by the brightness detector.

It is preferable that the electroluminescence device is comprised of a first sub-device emitting a red light, a second sub-device emitting a green light, and a third sub-device emitting a blue light, and wherein images which have to be displayed as red, green or blue images are presented in synchronization with emission of the red, green or blue light from the first, second or third sub-device, respectively.

In still another aspect of the present invention, there is provided a method of fabricating a lighting device including an electroluminescence device which acts as a light source, and an optical conductor which introduces a light emitted from the electroluminescence device, to a liquid crystal display device, including the step of (a) forming the electroluminescence device on an end surface of the optical conductor.

The method may further include the step of (b) forming a light-permeable expansion on the end surface of the optical conductor, the electroluminescence device being formed on the expansion.

For instance, the expansion is formed by injection molding or ink-jet injection.

For instance, the step (b) includes the steps of applying a first material onto the end surface of the optical conductor, the first material having a softening temperature lower than a softening temperature of a material of which the optical conductor is composed, and annealing the optical conductor to soften the first material.

The method may further include the step of (c) forming a recess at the end surface of the optical conductor, the electroluminescence device being formed in the recess.

The method may further include the steps of forming a wiring pattern on the end surface of the optical conductor, and electrically connecting a transparent electrode and a metal electrode of the electroluminescence device to the wiring pattern through an electrical conductor.

The method may further include the step of forming a reflector covering the end surface of the optical conductor to prevent a light having been introduced into the optical conductor from the electroluminescence device, from leaking out of the end surface of the optical conductor.

The method may further include the step of tapering the optical conductor at at least one of upper and lower surfaces adjacent to the end surface such that an incident angle of a light emitted from the electroluminescence device into the optical conductor is reduced.

There is further provided a method of fabricating a lighting device including an electroluminescence device which acts as a light source, and an optical conductor which introduces a light emitted from the electroluminescence device, to a liquid crystal display device, including the step of (a) forming the electroluminescence device such that at least one layer among layers constituting the electroluminescence device is embedded in the optical conductor.

There is still further provided a method of fabricating a lighting device including an electroluminescence device which acts as a light source, and an optical conductor which introduces a light emitted from the electroluminescence device, to a liquid crystal display device, including the step of (a) stacking a plurality of the optical conductors one on another, (b) forming the electroluminescence device on an end surface of each of the optical conductors, and (c) separating the optical conductors into pieces.

The advantages obtained by the aforementioned present invention will be described hereinbelow.

In accordance with the present invention, it is possible to enhance an efficiency with which an electroluminescence device emits a light to an optical conductor, ensuring significant reduction in power consumption without reduction in a brightness.

This is because an electroluminescence device is formed directly on or embedded in an optical conductor for effectively introducing a light into the optical conductor.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

[First Embodiment]

Figure 3:
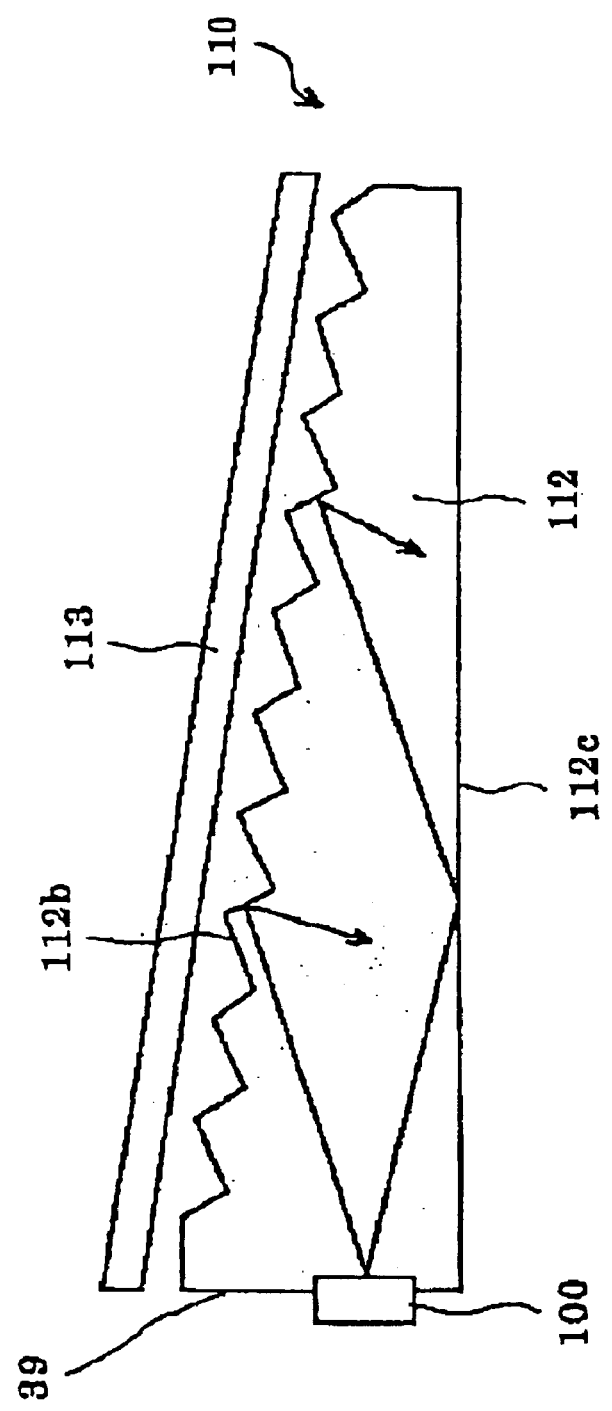
FIG. 3 is a cross-sectional view of a front-light type lighting device in accordance with the first embodiment of the present invention.

FIG. 3 is a cross-sectional view of a front-light type lighting device in accordance with the first embodiment.

The lighting device 110 is designed to include an electroluminescence device 100 as a light source, a plate-shaped optical conductor 112 introducing lights emitted from the electroluminescence device 100, into a liquid crystal display device 120, and a protector 113 located above the optical conductor 112 for protecting a first surface 112b of the optical conductor 112 from being damaged. The electroluminescence device 100 is formed directly on an end surface 39 of the optical conductor 112, or partially embedded in the optical conductor 112.

The optical conductor 112 has a first surface 112b at which lights emitted from the electroluminescence device 100 are reflected, and a second surface 112c through which lights having been reflected at the first surface 112b leave the optical conductor 112.

Figure 1:
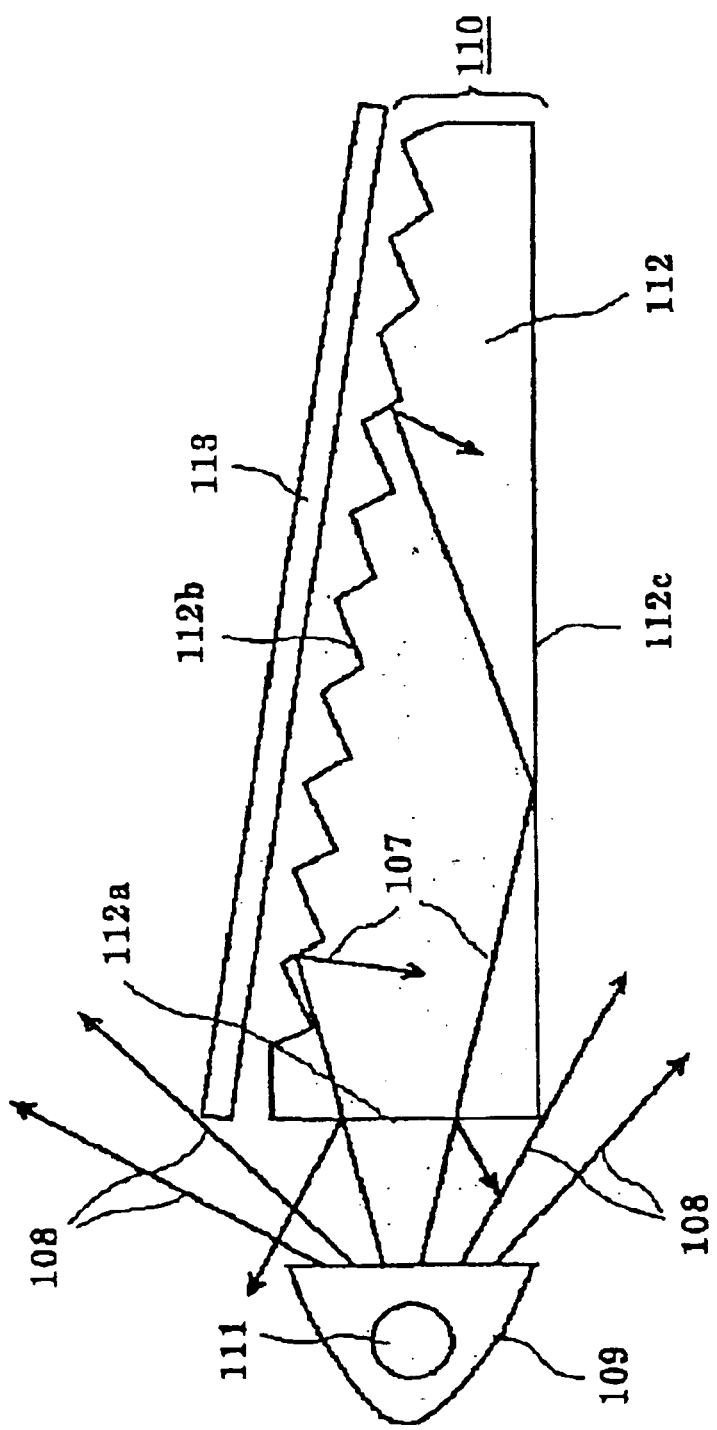
FIG. 1 is a cross-sectional view of a conventional front-light type lighting device.
Figure 2:
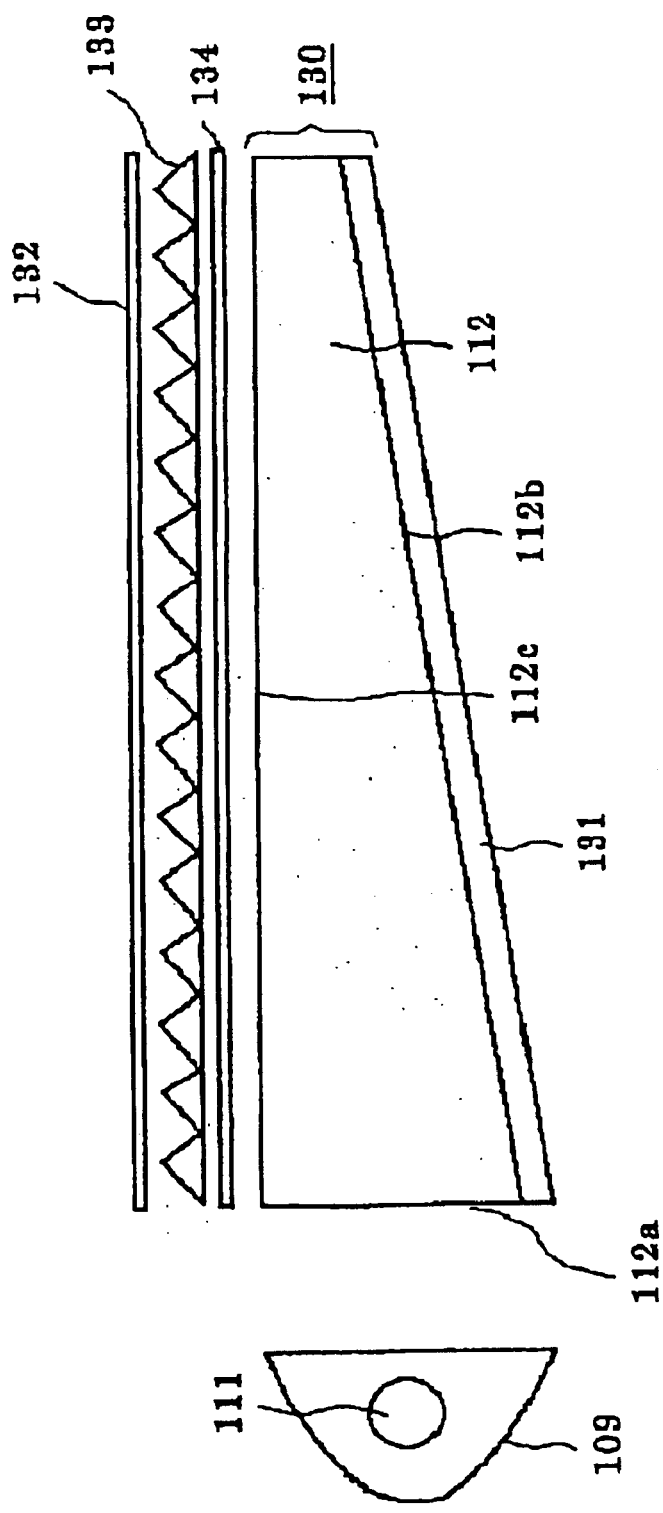
FIG. 2 is a cross-sectional view of a conventional back-light type lighting device.

As illustrated in FIG. 1, the conventional lighting device could not make lights emitted from the light source 111 introduce into the optical conductor 112, since there is a gap between the light source 111 and the end surface 39 of the optical conductor 112. In contrast, in accordance with the first embodiment, it is possible to make lights emitted from the electroluminescence device 100 introduce directly into the optical conductor 112, because the electroluminescence device 100 is formed directly on the end surface 39 of the optical conductor 112, or partially embedded in the optical conductor 112. That is, as illustrated in FIG. 3, a light emitted from the electroluminescence device 100 directly enters the optical conductor 112, is reflected at the first surface 112b, and leaves the optical conductor 112 through the second surface 112c.

Figure 4:
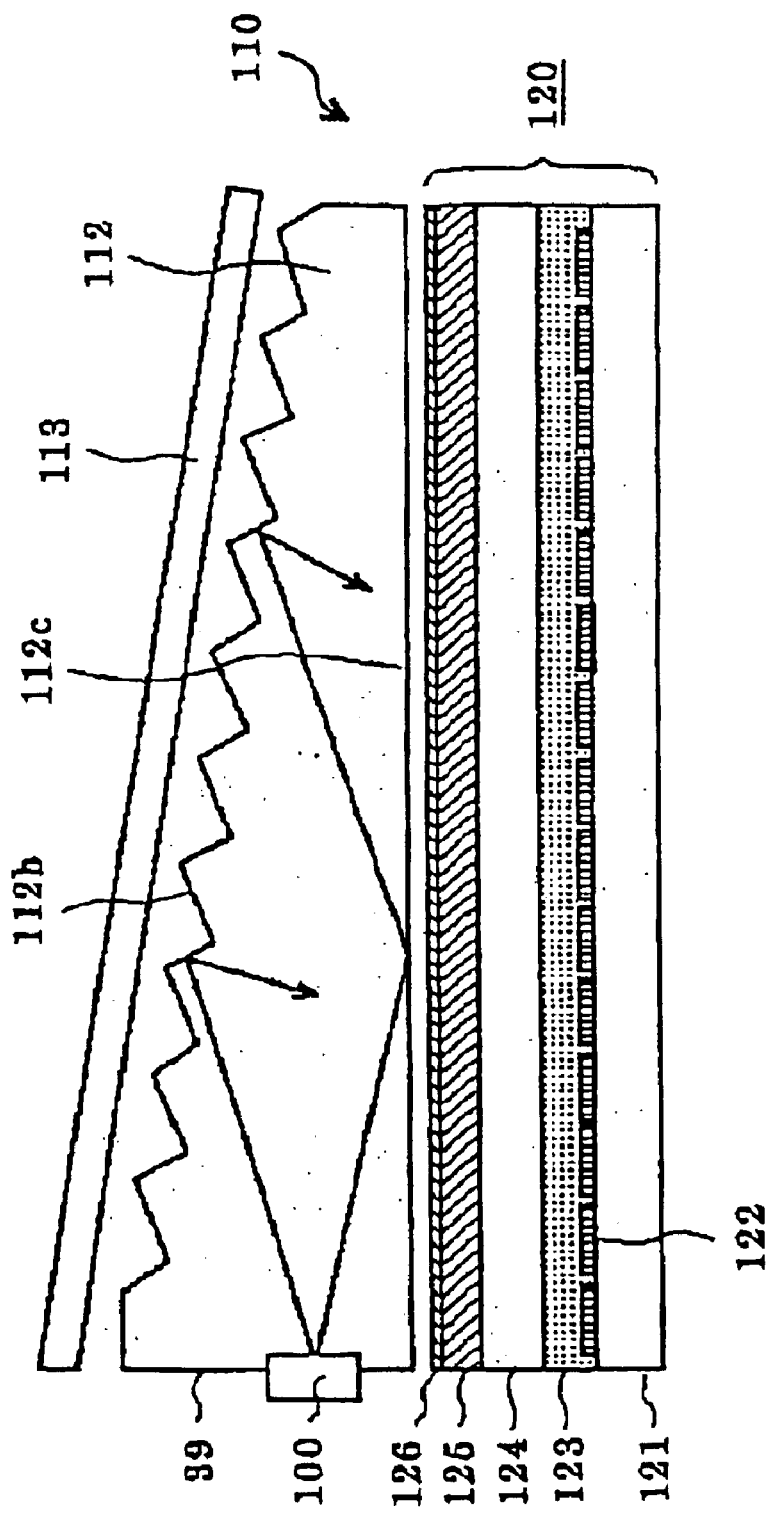
FIG. 4 is a cross-sectional view of a liquid crystal display device to which the front-light type lighting device in accordance with the fist embodiment is applied.

FIG. 4 is a cross-sectional view to which the lighting device 110 in accordance with the first embodiment is applied. For the sake of simplification, wirings through which a voltage is applied to electrodes are omitted from FIG. 4. The same is applied to the rest of the drawings.

As illustrated in FIG. 4, a light leaving the optical conductor 112 at the second surface 112c enters a liquid crystal display device 120. The light entering the liquid crystal display device 120 passes through a polarizing plate 126, a phase-difference plate 125, a transparent substrate 124 and a liquid crystal layer 123 in this order, and then, is reflected at reflectors 122 formed on an electrode substrate 121. The thus reflected light passes through the liquid crystal layer 123, the transparent substrate 124, the phase-difference plate 125 and the polarizing plate 126 in this order, and leaves the liquid crystal display device 120.

A light to be reflected at the reflectors 122 is controlled in an amount by alignment of liquid crystal molecules existing above the reflectors 122. Hence, it would be possible to display any images by individually controlling a voltage to be applied to the liquid crystal layer 123 with respect to each of the reflectors 122.

The light leaving the liquid crystal display device 120 passes through the lighting device 110, and then, reaches a viewer.

In the lighting device 110 in accordance with the first embodiment and the liquid crystal display device 120 using the lighting device 110, since the electroluminescence device 100 is formed directly on the end surface 39 of the optical conductor 112 or partially embedded in the optical conductor 112, it would be possible to avoid light loss, ensuring reduction power consumption almost all of which is made by the lighting device.

[Second Embodiment]

Figure 5:
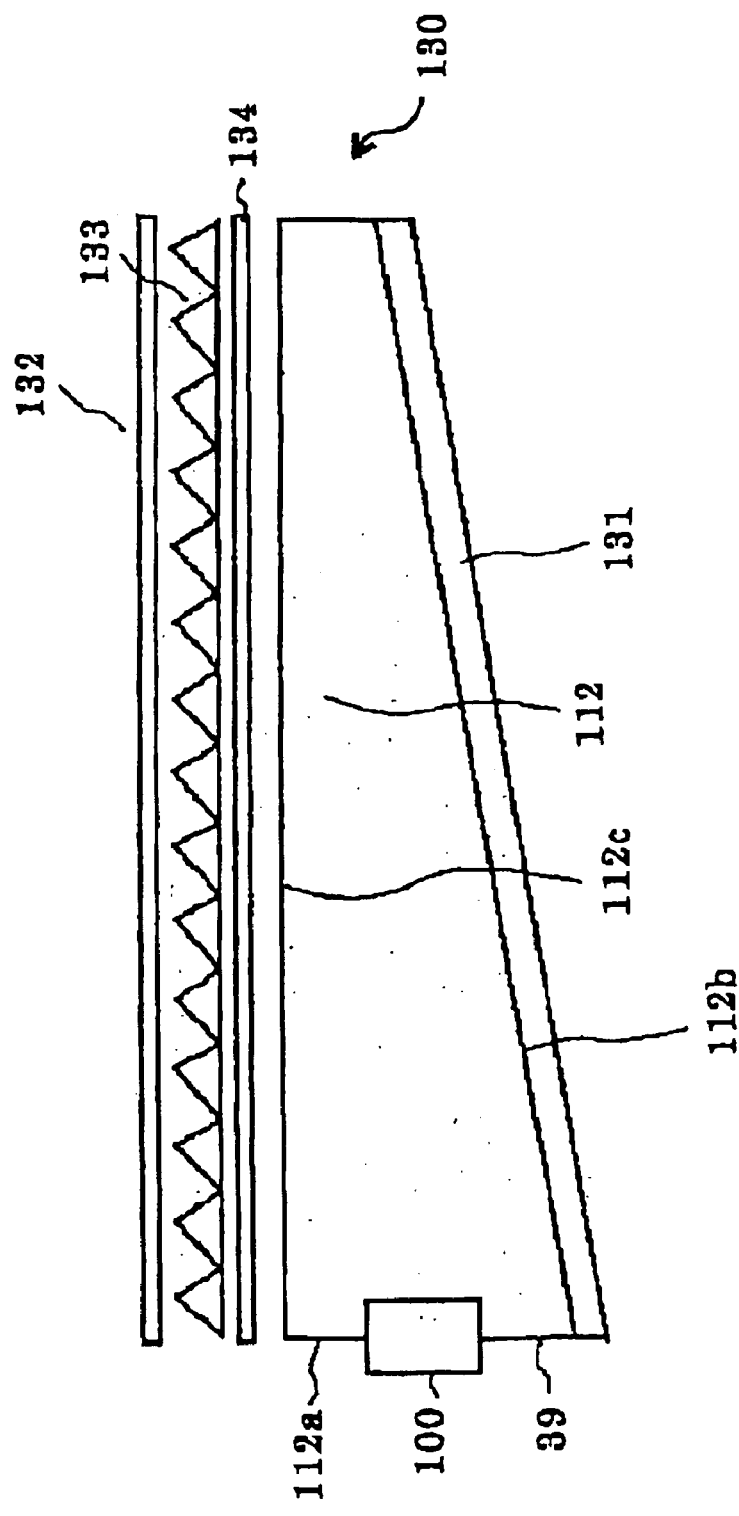
FIG. 5 is a cross-sectional view of a back-light type lighting device in accordance with the second embodiment of the present invention.

FIG. 5 is a cross-sectional view of a back-light type lighting device in accordance with the second embodiment.

The lighting device 130 is designed to include an electroluminescence device 100 as a light source, a plate-shaped optical conductor 112 introducing lights emitted from the electroluminescence device 100, into a liquid crystal display device 120, a reflector 131 making close contact of a first surface 112b of the optical conductor 112, a diffusion plate 134 facing a second surface 112c of the optical conductor 112, a first lenticular lens 132 located in parallel with the diffusion plate 134, and a second lenticular lens 133 located between the diffusion plate 134 and the first lenticular lens 132.

The diffusion plate 134 and the first and second lenticular lens 132 and 133 ensure that a light having been introduced in the optical conductor 112 effectively leaves the optical conductor 112 through the second surface 112c, and further widen a viewing angle.

The electroluminescence device 100 is formed directly on an end surface 112a of the optical conductor 112, or partially embedded in the optical conductor 112.

The optical conductor 112 has the first surface 112b at which lights emitted from the electroluminescence device 100 are reflected, and the second surface 112c through which lights having been reflected at the first surface 112b leave the optical conductor 112.

As illustrated in FIG. 1, the conventional lighting device could not make lights emitted from the light source 111 introduce into the optical conductor 112, since there is a gap between the light source 111 and the end surface 39 of the optical conductor 112. In contrast, in accordance with the second embodiment, it is possible to make lights emitted from the electroluminescence device 100 introduce directly into the optical conductor 112, because the electroluminescence device 100 is formed directly on the end surface 39 of the optical conductor 112, or partially embedded in the optical conductor 112. That is, as illustrated in FIG. 5, a light emitted from the electroluminescence device 100 enters the optical conductor 112 through the end surface 112a, is reflected at the first surface 112b, and leaves the optical conductor 112 through the second surface 112c. Then, the light passes through the diffusion plate 134, the second lenticular lens 133 and the first lenticular lens 132.

Figure 6:
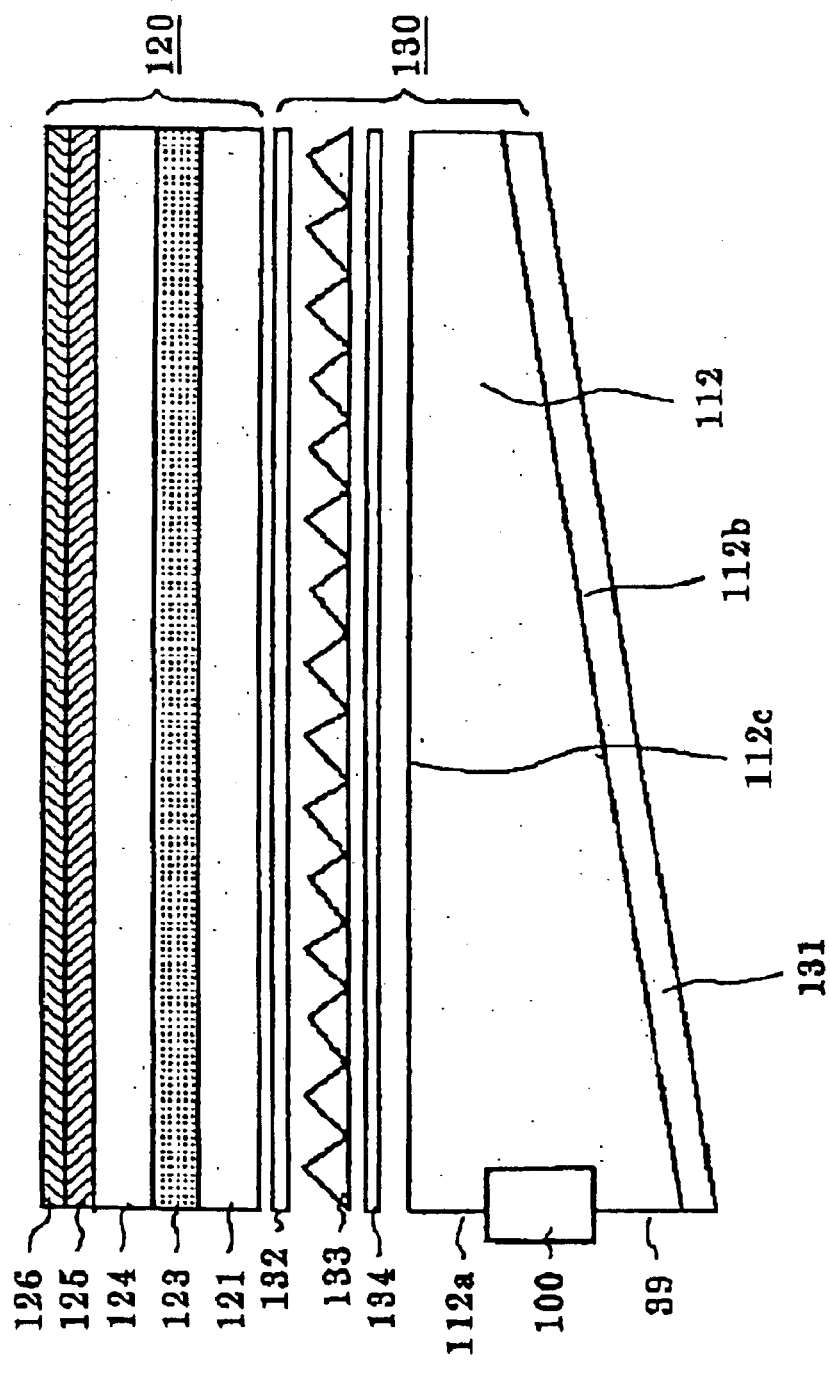
FIG. 6 is a cross-sectional view of a liquid crystal display device to which the back-light type lighting device in accordance with the second embodiment is applied.

FIG. 6 is a cross-sectional view to which the lighting device 130 in accordance with the second embodiment is applied.

As illustrated in FIG. 6, a light leaving the optical conductor 112 at the second surface 112c enters a liquid crystal display device 120. The light entering the liquid crystal display device 120 passes through an electrode substrate 121, a liquid crystal layer 123, a transparent substrate 124, a phase-difference plate 125 and a polarizing plate 126 in this order, thereby leaving the liquid crystal display device 120.

A light to be emitted through the liquid crystal display device 120 is controlled in an amount by alignment of liquid crystal molecules existing above the electrode substrate 121. Hence, it would be possible to display any images by individually controlling a voltage to be applied to the liquid crystal layer 123 with respect to electrodes formed on the electrode substrate 121.

In the lighting device 130 in accordance with the second embodiment and the liquid crystal display device 120 using the lighting device 130, since the electroluminescence device 100 is formed directly on the end surface 112a of the optical conductor 112 or partially embedded in the optical conductor 112, it would be possible to avoid light loss, ensuring reduction power consumption almost all of which is made by the lighting device.

[Third Embodiment]

Figure 7:
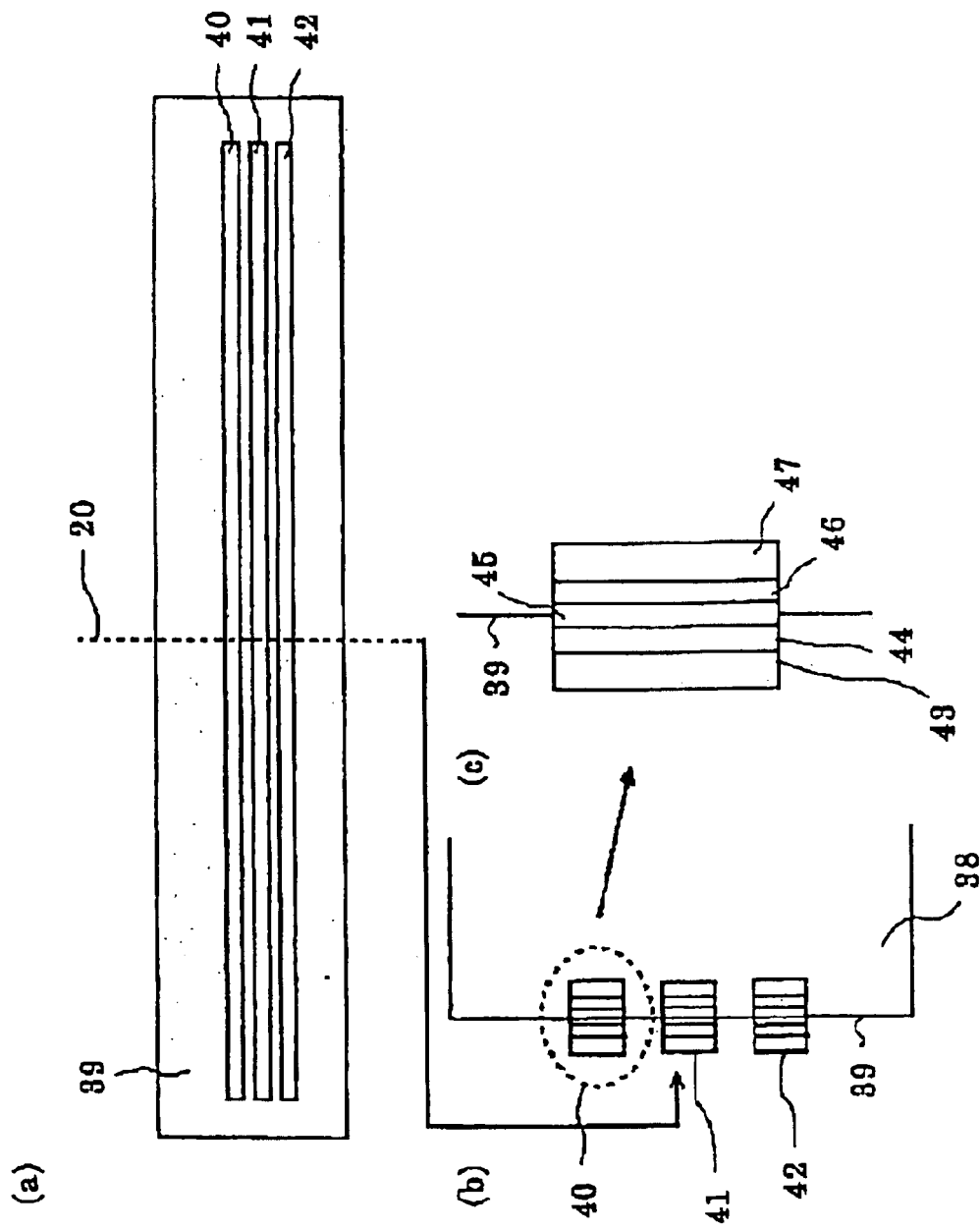
FIG. 7 illustrates an optical conductor in a lighting device in accordance with the third embodiment of the present invention.

FIG. 7 illustrates a lighting device in accordance with the third embodiment. FIG. 7(a) is a plan view of an end surface 39 of an optical conductor 38 in the lighting device, FIG. 7(b) is a cross-sectional view taken along the line 20 in FIG. 7(a), and FIG. 7(c) is an enlarged view of an electroluminescence device illustrated in FIG. 7(b).

As illustrated in FIG. 7(a), a first electroluminescence device 40 emitting a first color, a second electroluminescence device 41 emitting a second color, and a third electroluminescence device 42 emitting a third color are formed on the end surface 39 of the optical conductor 38. In the third embodiment, the first to third electroluminescence devices 40 to 42 are designed to emit red, blue and green lights, respectively. The first to third electroluminescence devices 40 to 42 are electrically connected to a circuit (not illustrated) which applies a current to the first to third electroluminescence devices 40 to 42 in accordance with ON or OFF signal transmitted from a switching circuit (not illustrated).

The first to third electroluminescence devices 40 to 42 may be designed to emit the same color light, in which case, it is preferable that the first to third electroluminescence devices 40 to 42 emit a light having a mixture color of blue, red and green, and it is further preferable that such a mixture color is white.

As illustrated in FIG. 7(b), the first to third electroluminescence devices 40 to 42 are half embedded into the optical conductor 38. However, it should be noted that it is not always necessary for the first to third electroluminescence devices 40 to 42 to be embedded in the optical conductor 38. Instead, the first to third electroluminescence devices 40 to 42 may be formed directly on the end surface 39 of the optical conductor 38.

As illustrated in FIG. 7(c), the optical conductor 38 is formed at the end surface 39 thereof with a recess, in which the first to third electroluminescence devices 40 to 42 are formed. Each of the first to third electroluminescence devices 40 to 42 is designed to have multi-layered structure of a transparent electrode layer 47, a hole-injecting layer 46, a light-emitting layer 45, an electron-transporting layer 44, and a metal electrode layer 43 stacked in this order from a bottom of the recess.

Though the transparent electrode layer 47, the hole-injecting layer 46 and a half of the light-emitting layer 45 are embedded in the optical conductor 38, one or more of the layers 47 to 43 may be embedded in the optical conductor 38.

In each of the first to third electroluminescence devices 40 to 42, a circuit (not illustrated) for applying a current to and driving the electroluminescence device is electrically connected across the transparent electrode layer 47 and the metal electrode layer 43. Color tone of the mixture color of the first to third colors can be optimized by optimizing a current to be applied to each of the first to third electroluminescence devices 40 to 42 emitting the first to third colors, respectively.

[Fourth Embodiment]

Figure 8:
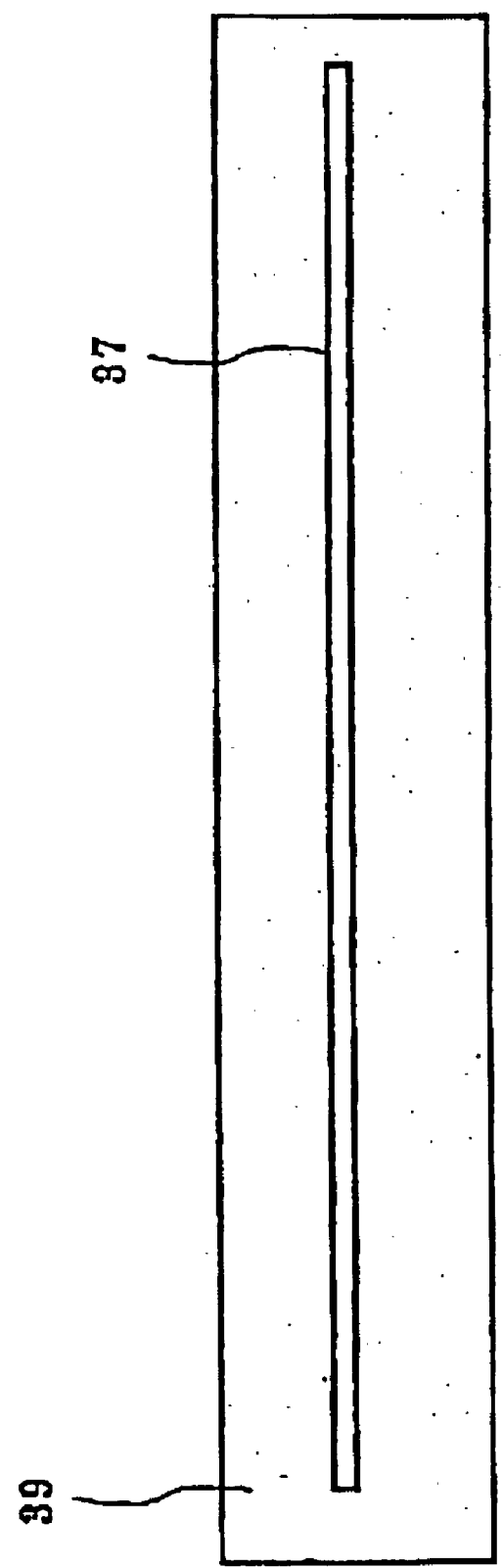
FIG. 8 is a plan view of an optical conductor in a lighting device in accordance with the fourth embodiment of the present invention.

FIG. 8 is a plan view of an optical conductor used in a lighting device in accordance with the fourth embodiment.

As illustrated in FIG. 8, an electroluminescence device 37 is formed directly on an end surface 39 of an optical conductor. The electroluminescence device 37 emits a light having a mixture color of blue, red and green. For instance, the mixture color is white. The electroluminescence device 37 is electrically connected to a circuit (not illustrated) which applies a current to the electroluminescence device 37 in accordance with ON or OFF signal transmitted from a switching circuit (not illustrated).

[Fifth Embodiment]

Figure 9:
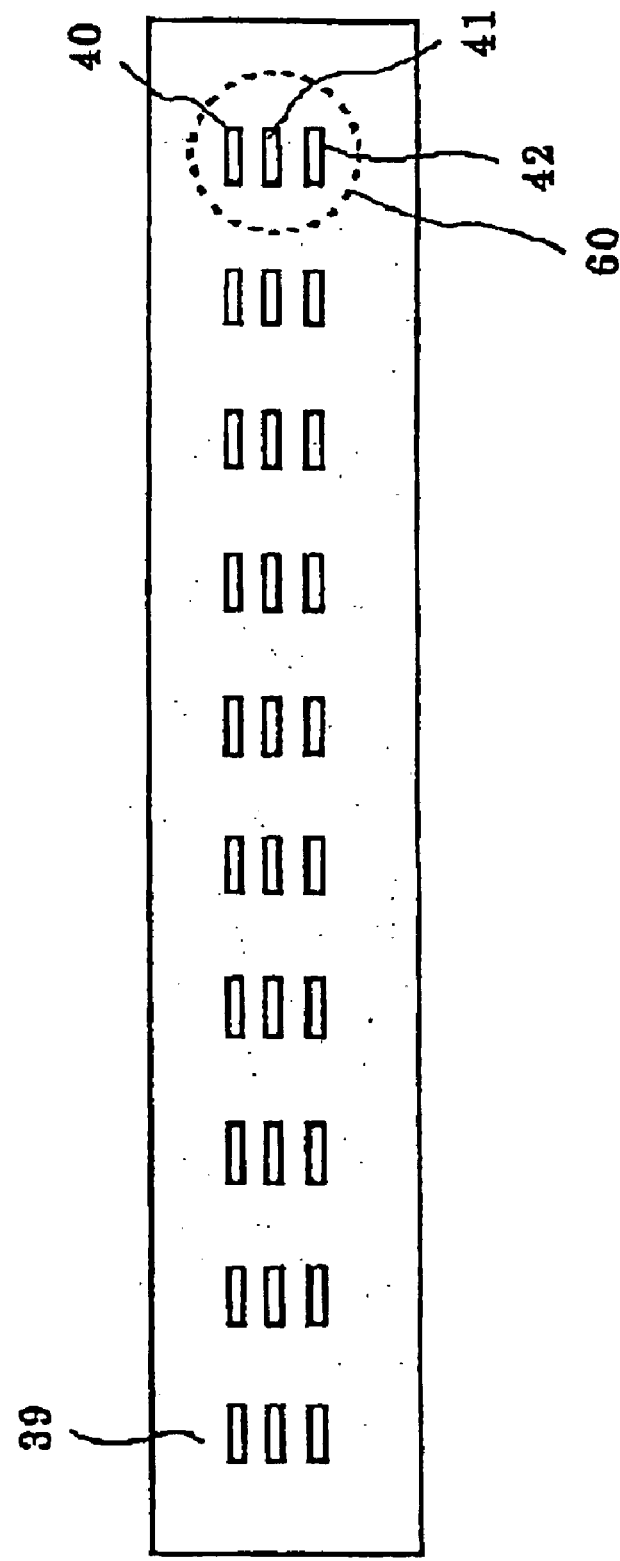
FIG. 9 is a plan view of an optical conductor in a lighting device in accordance with the fifth embodiment of the present invention.

FIG. 9 is a plan view of an optical conductor used in a lighting device in accordance with the fifth embodiment.

As illustrated in FIG. 9, an electroluminescence device is comprised of a plurality of electroluminescence device groups 60 formed on an end surface 39 of an optical conductor in a length-wise direction of the optical conductor. Each of the electroluminescence device groups 60 is comprised of a first electroluminescence sub-device 40 emitting a first color, a second electroluminescence sub-device 41 emitting a second color, and a third electroluminescence sub-device 42 emitting a third color. The first to third electroluminescence sub-devices 40 to 42 are arranged in a width-wise direction of the optical conductor in each of the electroluminescence device groups 60.

In each of the first to third electroluminescence sub-devices 40 to 42, a circuit (not illustrated) for applying a current to and driving the electroluminescence device is electrically connected across the transparent electrode layer 47 and the metal electrode layer 43 (see FIG. 7). Color tone of the mixture color of the first to third colors can be optimized by optimizing a current to be applied to each of the first to third electroluminescence sub-devices 40 to 42 emitting the first to third colors, respectively.

Similarly to the third embodiment, the first to third electroluminescence sub-devices 40 to 42 may be designed to emit the same color light, in which case, it is preferable that the first to third electroluminescence devices 40 to 42 emit a light having a mixture color of blue, red and green, and it is further preferable that such a mixture color is white.

[Sixth Embodiment]

Figure 10:
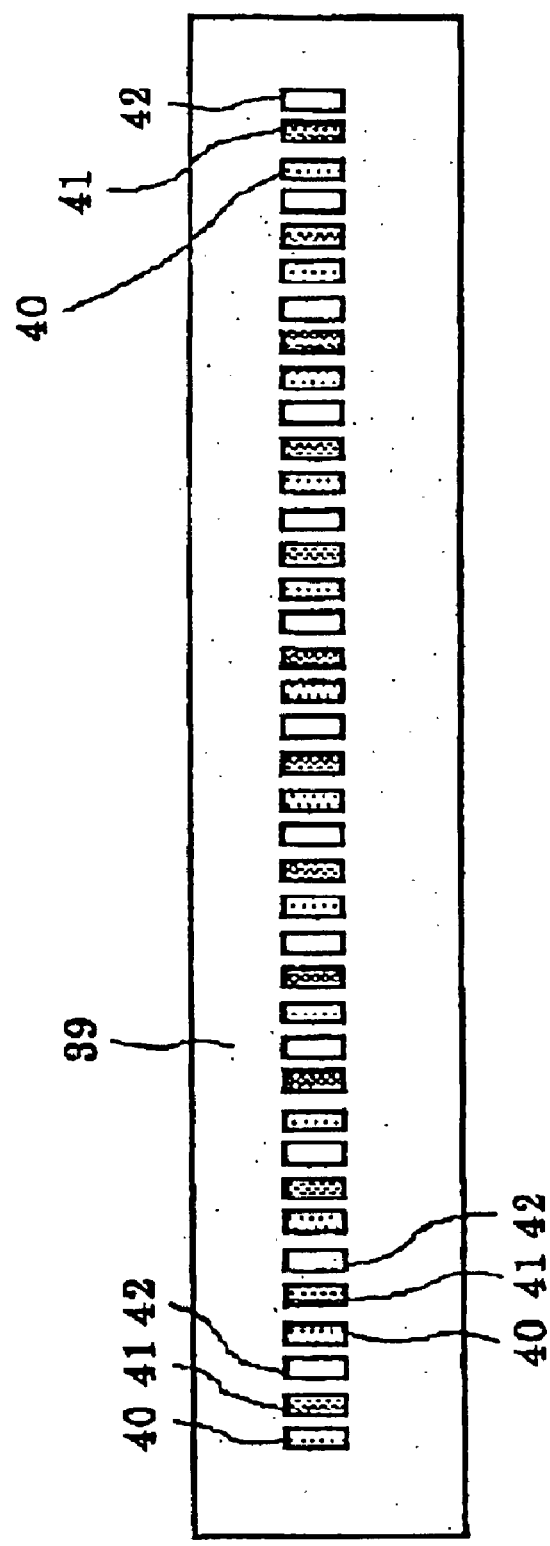
FIG. 10 is a plan view of an optical conductor in a lighting device in accordance with the sixth embodiment of the present invention.

FIG. 10 is a plan view of an optical conductor used in a lighting device in accordance with the sixth embodiment.

As illustrated in FIG. 10, an electroluminescence device is comprised of a plurality of electroluminescence sub-devices formed on an end surface 39 of an optical conductor in a length-wise direction of the optical conductor. Specifically, first to third electroluminescence sub-devices 40 to 42 emitting first to third color lights, respectively, are repeatedly arranged on the end surface 39 of the optical conductor.

In each of the first to third electroluminescence sub-devices 40 to 42, a circuit (not illustrated) for applying a current to and driving the electroluminescence device is electrically connected across the transparent electrode layer 47 and the metal electrode layer 43 (see FIG. 7). Color tone of the mixture color of the first to third colors can be optimized by optimizing a current to be applied to each of the first to third electroluminescence sub-devices 40 to 42 emitting the first to third colors, respectively.

Similarly to the above-mentioned third and fifth embodiments, the first to third electroluminescence sub-devices 40 to 42 may be designed to emit the same color light, in which case, it is preferable that the first to third electroluminescence devices 40 to 42 emit a light having a mixture color of blue, red and green, and it is further preferable that such a mixture color is white.

[Seventh Embodiment]

Figure 11:
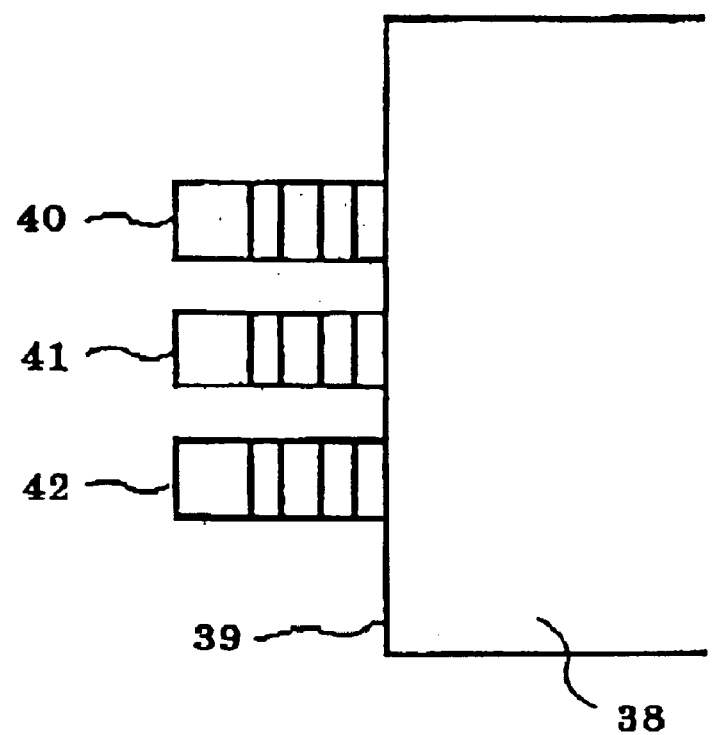
FIG. 11 is a cross-sectional view of an optical conductor and an electroluminescence device in a lighting device in accordance with the seventh embodiment of the present invention.

FIG. 11 is a cross-sectional view of an electroluminescence device and an optical conductor both used in a lighting device in accordance with the seventh embodiment.

In the seventh embodiment, an electroluminescence device is comprised of a first electroluminescence sub-device 40 emitting a first color, a second electroluminescence sub-device 41 emitting a second color, and a third electroluminescence sub-device 42 emitting a third color. Unlike the above-mentioned first to third embodiments, the first to third electroluminescence sub-devices 40 to 42 are not embedded in an optical conductor 38, but formed directly on an end surface 39 of the optical conductor 38.

[Eighth Embodiment]

Figure 12:
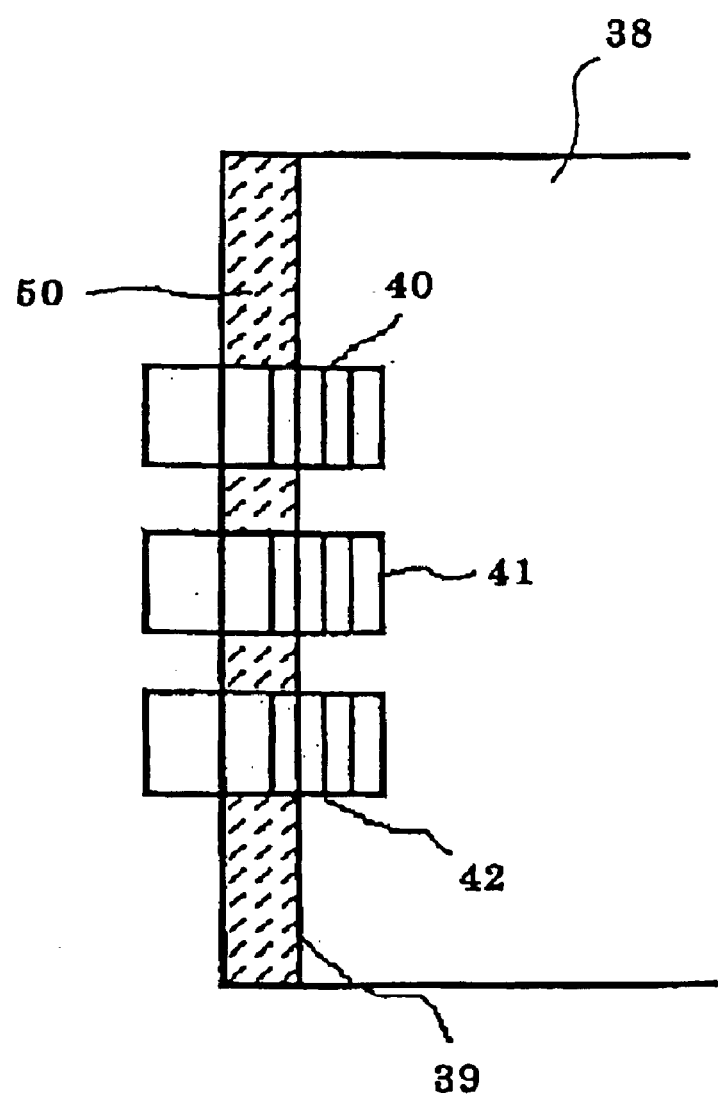
FIG. 12 is a cross-sectional view of an optical conductor and an electroluminescence device in a lighting device in accordance with the eighth embodiment of the present invention.

FIG. 12 is a cross-sectional view of a lighting device in accordance with the eighth embodiment.

As illustrated in FIG. 12, the lighting device is comprised of an optical conductor 38, an electroluminescence device partially embedded in the optical conductor 38, and a reflector 50 covering an end surface 39 of the optical conductor 38.

The electroluminescence device is comprised of a first electroluminescence sub-device 40 emitting a first color, a second electroluminescence sub-device 41 emitting a second color, and a third electroluminescence sub-device 42 emitting a third color. Each of the first to third electroluminescence sub-devices 40–42 partially project from the reflector 50.

The reflector 50 prevents a light emitted from the first to third electroluminescence sub-devices 40–42 and entering the optical conductor 38, from leaking out of the end surface 39.

[Ninth Embodiment]

Figure 13:
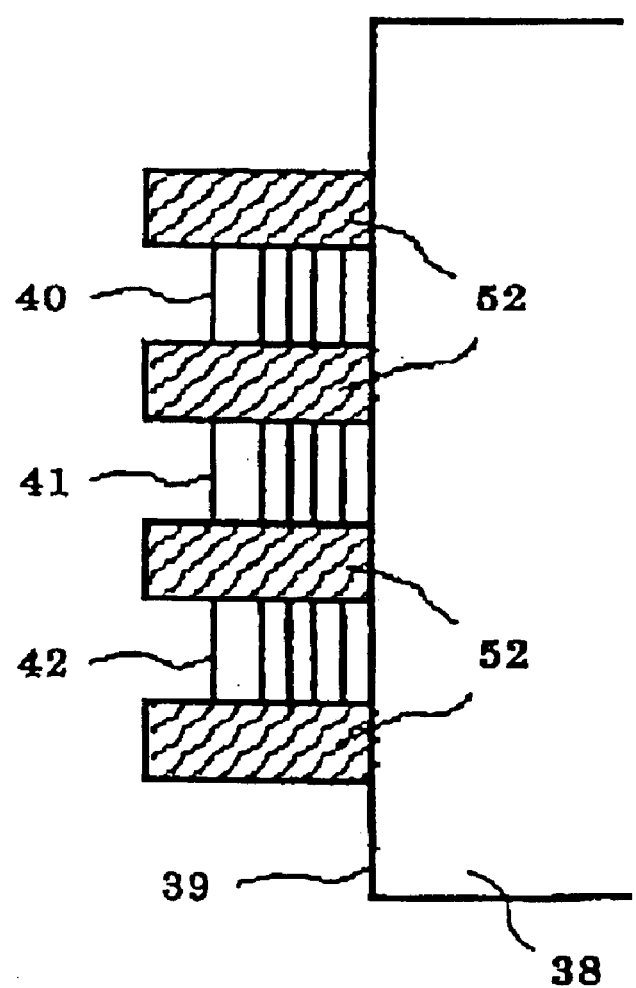
FIG. 13 is a cross-sectional view of an optical conductor and an electroluminescence device in a lighting device in accordance with the ninth embodiment of the present invention.

FIG. 13 is a cross-sectional view of a lighting device in accordance with the ninth embodiment.

As illustrated in FIG. 13, the lighting device is comprised of an optical conductor 38, an electroluminescence device formed directly on an end surface 39 of the optical conductor 38, and partitions 52.

The electroluminescence device is comprised of first to third electroluminescence sub-devices 40–42 emitting first to third color lights, respectively. The partitions 52 sandwiches the first to third electroluminescence sub-devices 40–42 therebetween. The partitions 52 may be formed of resist.

The partitions 52 prevent the first to third lights emitted from the first to third electroluminescence sub-devices 40–42, from overlapping one another, ensuring enhancement of the light-emitting performance of the electroluminescence device.

The partitions 52 may be formed to entirely surround the electroluminescence device. As an alternative, the partitions 52 may be formed to have a cut-out or cut-outs, in which case, a wiring electrically connecting each of the first to third electroluminescence sub-devices 40–42 to an external circuit (not illustrated) may be arranged in such a cut-out or cut-outs.

[Tenth Embodiment]

Figure 14:
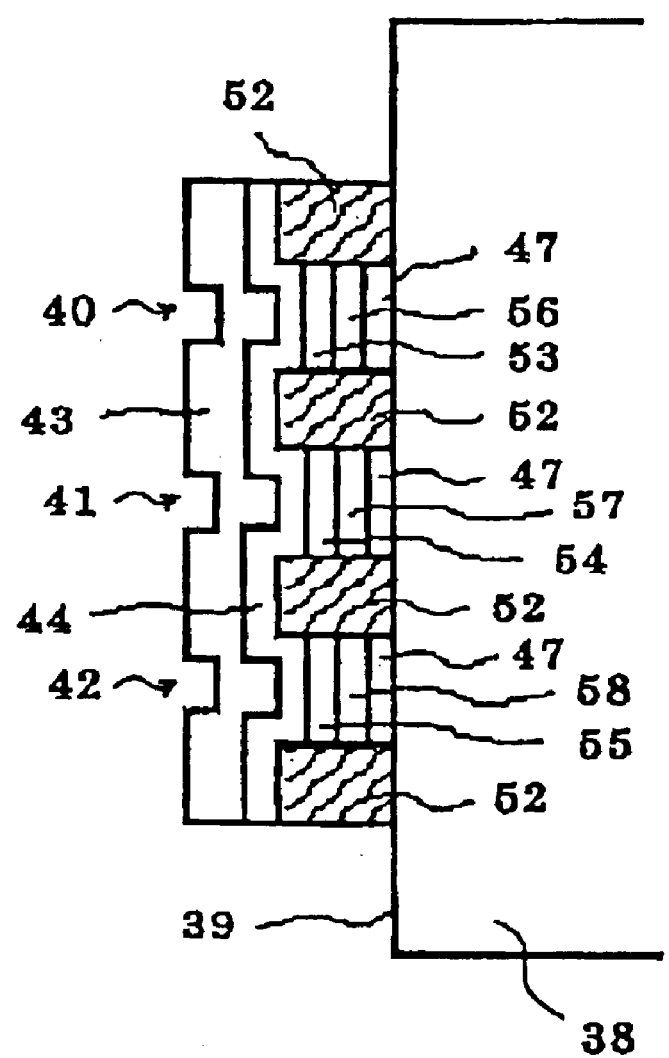
FIG. 14 is a cross-sectional view of an optical conductor and an electroluminescence device in a lighting device in accordance with the tenth embodiment of the present invention.

FIG. 14 is a cross-sectional view of a lighting device in accordance with the tenth embodiment.

As illustrated in FIG. 14, the lighting device is comprised of an optical conductor 38, an electroluminescence device formed directly on an end surface 39 of the optical conductor 38 and comprised of first to third electroluminescence sub-devices 40–42 emitting first to third color lights, and partitions 52 sandwiching the first to third electroluminescence sub-devices 40–42 therebetween.

Each of the first to third electroluminescence sub-devices 40–42 includes a transparent electrode layer 47, a hole-transporting layer 56, 57 or 58, a light-emitting layer 53, 54 or 55, an electron-transporting layer 44, and a metal electrode layer 43.

As illustrated in FIG. 14, the first to third electroluminescence sub-devices 40–42 commonly have both the electron-transporting layer 44, and the metal electrode layer 43. This ensures that the fabrication steps are simplified, and reduces the number of fabrication steps. The electron-transporting layer 44 may be omitted, in which case, the fabrication steps could be further simplified.

[Eleventh Embodiment]

Figure 15:
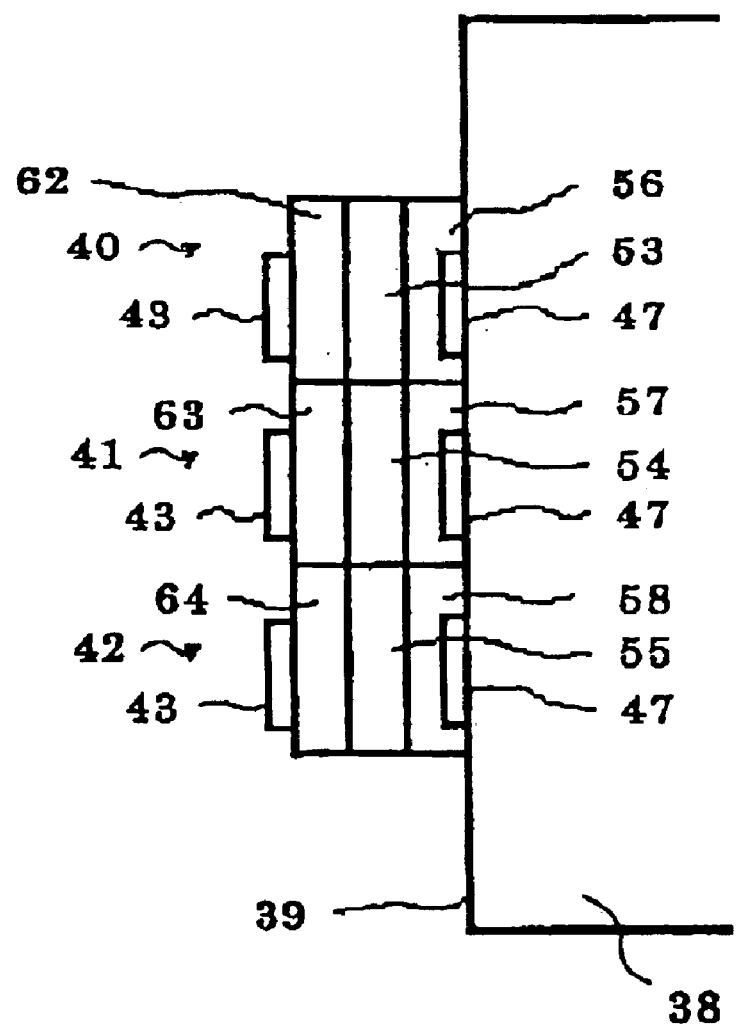
FIG. 15 is a cross-sectional view of an optical conductor and an electroluminescence device in a lighting device in accordance with the eleventh embodiment of the present invention.

FIG. 15 is a cross-sectional view of a lighting device in accordance with the eleventh embodiment.

In the eleventh embodiment, first to third electroluminescence sub-devices 40–42 are formed directly on an end surface 39 of the optical conductor 38 such that the electroluminescence sub-devices adjacent to each other make close contact with each other. In addition, in each of the first to third electroluminescence sub-devices 40–42, a transparent electrode layer 47 and a metal electrode layer 43 are formed smaller in width than a hole-injecting layer 56, 57 or 58, a light-emitting layer 53, 54 or 55 and an electron-transporting layer 62, 63 or 64.

A current preferentially runs between the transparent layer 47 and the metal electrode layer 43, resulting in that only the sub-device located therebetween emits a light. If electroluminescence sub-devices are adjacent to each other, light-emitting characteristics of the electroluminescence sub-devices might be degraded. However, the eleventh embodiment could cancel such degradation in the light-emitting characteristics, ensuring color purity in each of the first to third electroluminescence sub-devices 40–42.

[Twelfth Embodiment]

Figure 16:
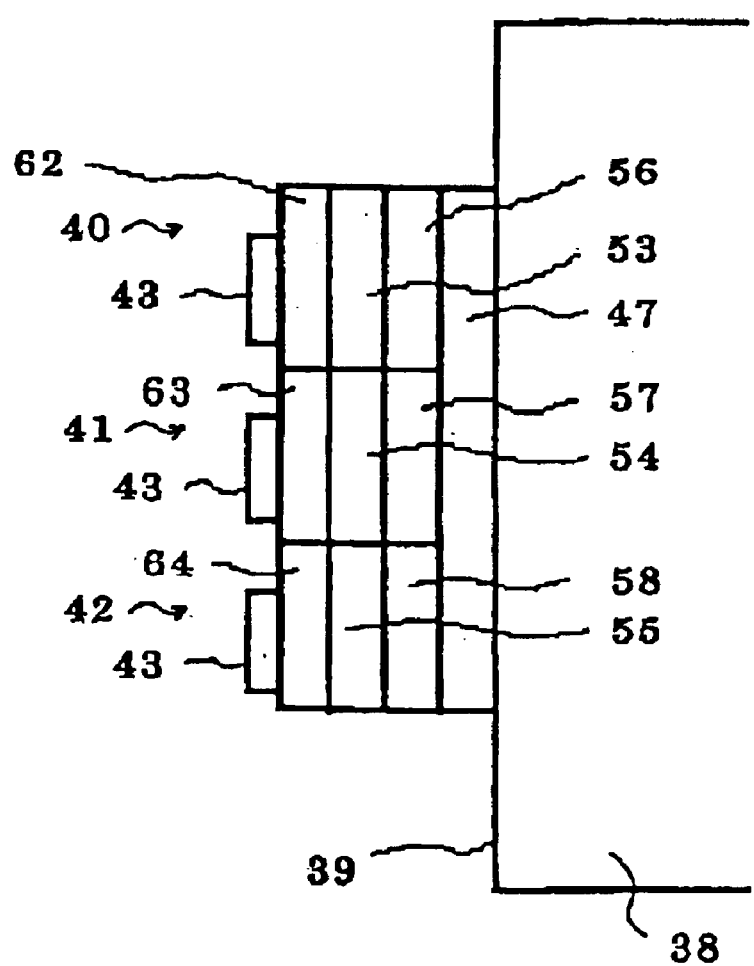
FIG. 16 is a cross-sectional view of an optical conductor and an electroluminescence device in a lighting device in accordance with the twelfth embodiment of the present invention.

FIG. 16 is a cross-sectional view of a lighting device in accordance with the twelfth embodiment.

In the twelfth embodiment, first to third electroluminescence sub-devices 40–42 are formed directly on an end surface 39 of the optical conductor 38 such that the electroluminescence sub-devices adjacent to each other make close contact with each other. In addition, the first to third electroluminescence sub-devices 40–42 commonly have a transparent electrode layer 47. In each of the first to third electroluminescence sub-devices 40–42, a metal electrode layer 43 is formed smaller in width than the common transparent electrode layer 47, a hole-injecting layer 56, 57 or 58, a light-emitting layer 53, 54 or 55 and an electron-transporting layer 62, 63 or 64.

Since a current width in which a current runs is dependent on a width of the metal electrode layer 43, it would be possible to cancel the degradation in characteristics of the sub-devices 40 to 42, caused by the sub-devices 40 to 42 being adjacent to each other, ensuring color purity in each of the first to third electroluminescence sub-devices 40–42.

Though the electron-transporting layers 62 to 64 associated with the first to third electroluminescence sub-devices 40–42 are formed separately from one another, they may be formed as a single layer like the signal transparent electrode layer 47.

As an alternative, the light-emitting layer 53 and the electron-transporting layer 62 both associated with the first electroluminescence sub-device 40 may be formed as a single layer. Similarly, the light-emitting layer 54 and the electron-transporting layer 63 both associated with the second electroluminescence sub-device 41 may be formed as a single layer, and the light-emitting layer 55 and the electron-transporting layer 64 both associated with the third electroluminescence sub-device 42 may be formed as a single layer.

As an alternative, the light-emitting layer 53, the electron-transporting layer 62 and the hole-injecting layer 56 all associated with the first electroluminescence sub-device 40 may be formed as a single layer. Similarly, the light-emitting layer 54, the electron-transporting layer 63 and the hole-injecting layer 57 all associated with the second electroluminescence sub-device 41 may be formed as a single layer, and the light-emitting layer 55, the electron-transporting layer 64 and the hole-injecting layer 58 all associated with the third electroluminescence sub-device 42 may be formed as a single layer.

[Thirteenth Embodiment]

Figure 17:
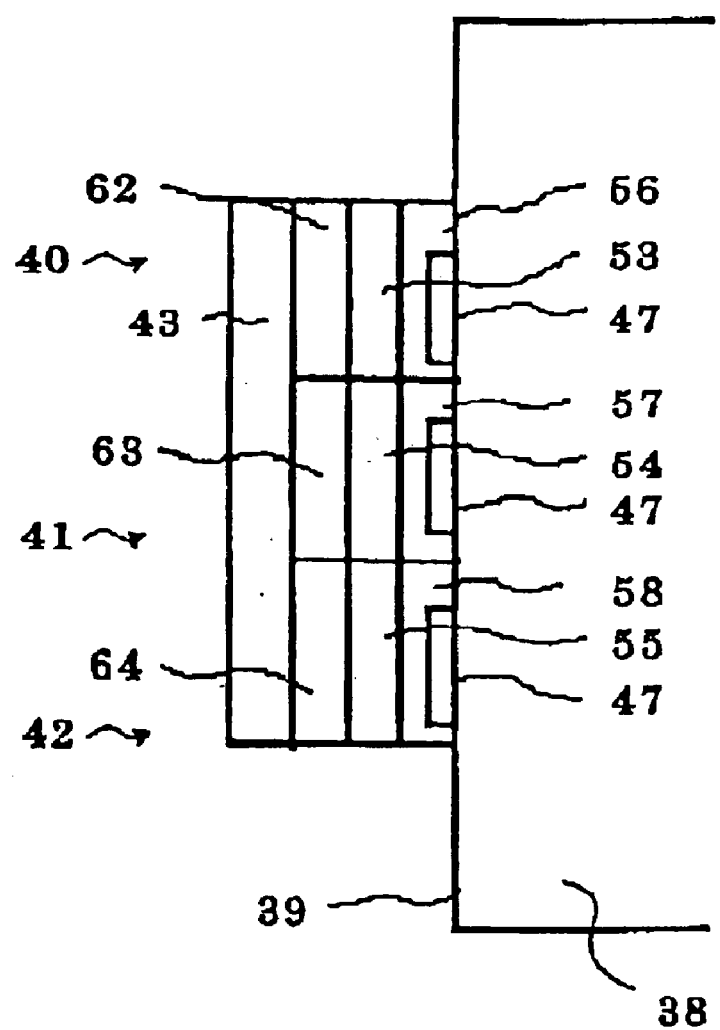
FIG. 17 is a cross-sectional view of an optical conductor and an electroluminescence device in a lighting device in accordance with the thirteenth embodiment of the present invention.

FIG. 17 is a cross-sectional view of a lighting device in accordance with the thirteenth embodiment.

The lighting device in accordance with the thirteenth embodiment is similar to the lighting device in accordance with the eleventh embodiment, illustrated in FIG. 15, but is structurally different from the eleventh embodiment in that the first to third electroluminescence sub-devices 40–42 commonly have the metal electrode layer 43.

The transparent electrode layer 47 is formed smaller in width than the other layers.

Since a current width in which a current runs is dependent on a width of the transparent electrode layer 47, it would be possible to cancel the degradation in characteristics of the sub-devices 40 to 42, caused by the sub-devices 40 to 42 being adjacent to each other, ensuring color purity in each of the first to third electroluminescence sub-devices 40–42.

Though the electron-transporting layers 62 to 64 associated with the first to third electroluminescence sub-devices 40–42 are formed separately from one another, they may be formed as a single layer like the signal transparent electrode layer 47.

As an alternative, the light-emitting layer 53 and the electron-transporting layer 62 both associated with the first electroluminescence sub-device 40 may be formed as a single layer. Similarly, the light-emitting layer 54 and the electron-transporting layer 63 both associated with the second electroluminescence sub-device 41 may be formed as a single layer, and the light-emitting layer 55 and the electron-transporting layer 64 both associated with the third electroluminescence sub-device 42 may be formed as a single layer.

As an alternative, the light-emitting layer 53, the electron-transporting layer 62 and the hole-injecting layer 56 all associated with the first electroluminescence sub-device 40 may be formed as a single layer. Similarly, the light-emitting layer 54, the electron-transporting layer 63 and the hole-injecting layer 57 all associated with the second electroluminescence sub-device 41 may be formed as a single layer, and the light-emitting layer 55, the electron-transporting layer 64 and the hole-injecting layer 58 all associated with the third electroluminescence sub-device 42 may be formed as a single layer.

[Fourteenth Embodiment]

Figure 18:
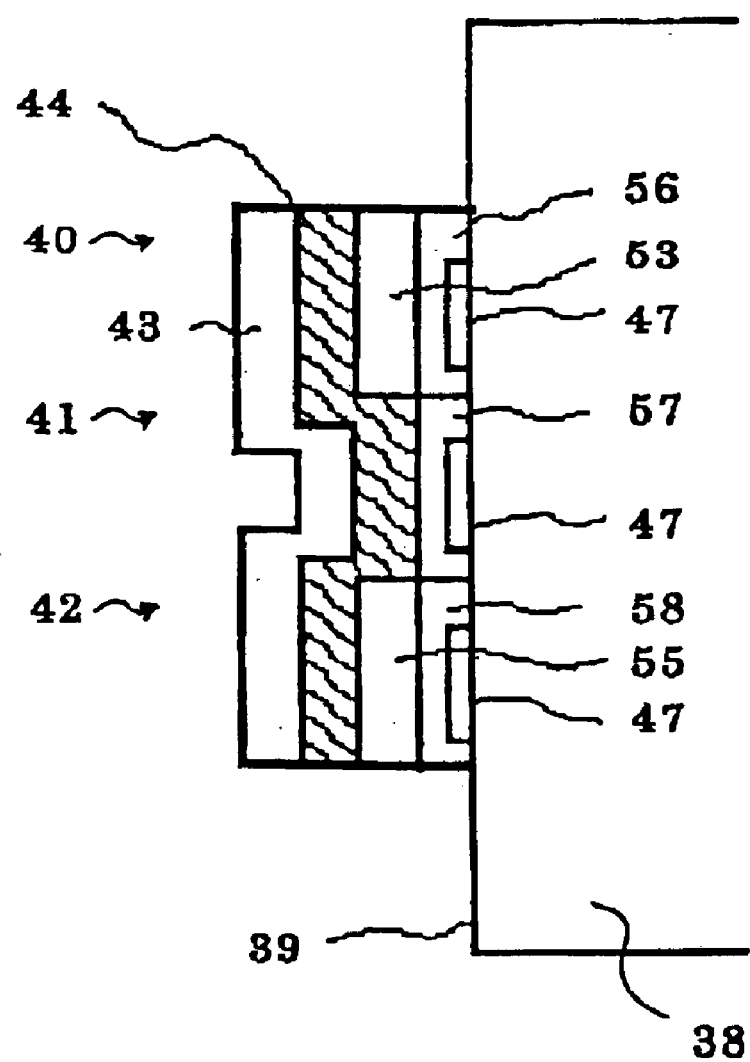
FIG. 18 is a cross-sectional view of an optical conductor and an electroluminescence device in a lighting device in accordance with the fourteenth embodiment of the present invention.

FIG. 18 is a cross-sectional view of a lighting device in accordance with the fourteenth embodiment.

The lighting device in accordance with the fourteenth embodiment is similar to the lighting device in accordance with the thirteenth embodiment, illustrated in FIG. 17, but is structurally different from the thirteenth embodiment in that the light-emitting layer 54 in the second electroluminescence sub-device 41, the electron-transporting layer 62 in the first electroluminescence sub-device 40, the electron-transporting layer 63 in the second electroluminescence sub-device 41 and the electron-transporting layer 64 in the third electroluminescence sub-device 42 are formed as a single electron-transporting layer 44. In the fourteenth embodiment, the light-emitting layer 54 is formed as a layer emitting a blue light.

In place of the light-emitting layer 54 in the second electroluminescence sub-device 41, the light-emitting layer 53 in the first electroluminescence sub-device 40 or the light-emitting layer 55 in the third electroluminescence sub-device 42 may be formed as a single layer together with the electron-transporting layers 62 to 64.

[Fifteenth Embodiment]

Figure 19:
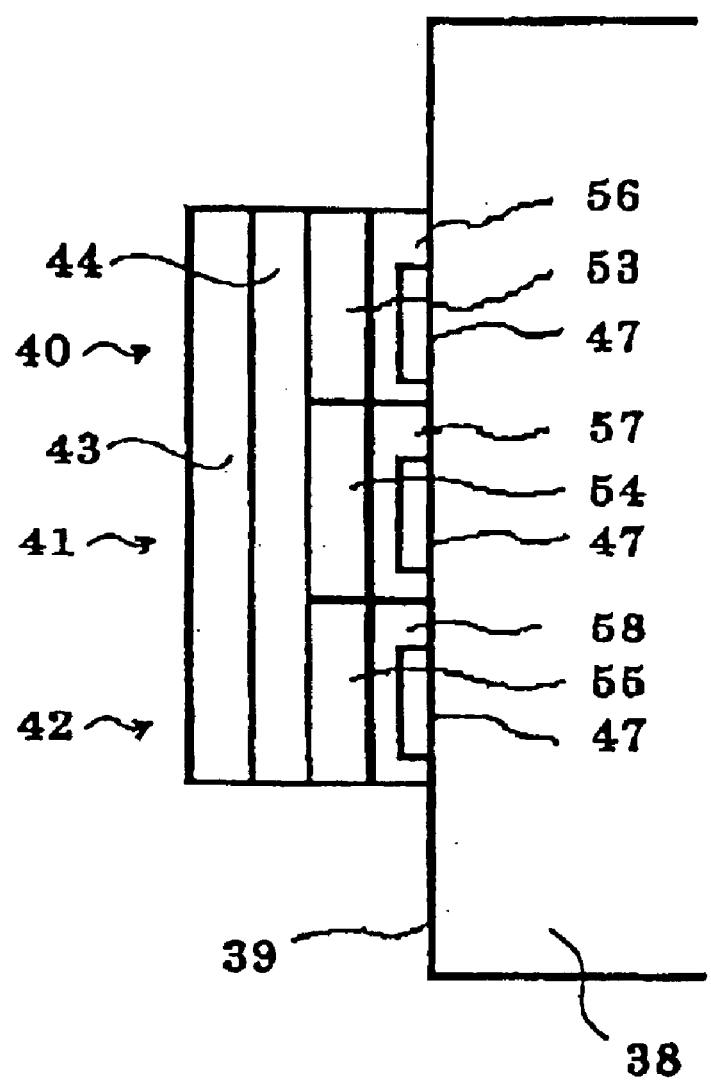
FIG. 19 is a cross-sectional view of an optical conductor and an electroluminescence device in a lighting device in accordance with the fifteenth embodiment of the present invention.

FIG. 19 is a cross-sectional view of a lighting device in accordance with the fifteenth embodiment.

The lighting device in accordance with the fifteenth embodiment is similar to the lighting device in accordance with the thirteenth embodiment, illustrated in FIG. 13, but is structurally different from the thirteenth embodiment in that the electron-transporting layers 62 to 64 in the first to third electroluminescence sub-devices 40–42 are formed as a single electron-transporting layer 44.

[Sixteenth Embodiment]

Figure 20:
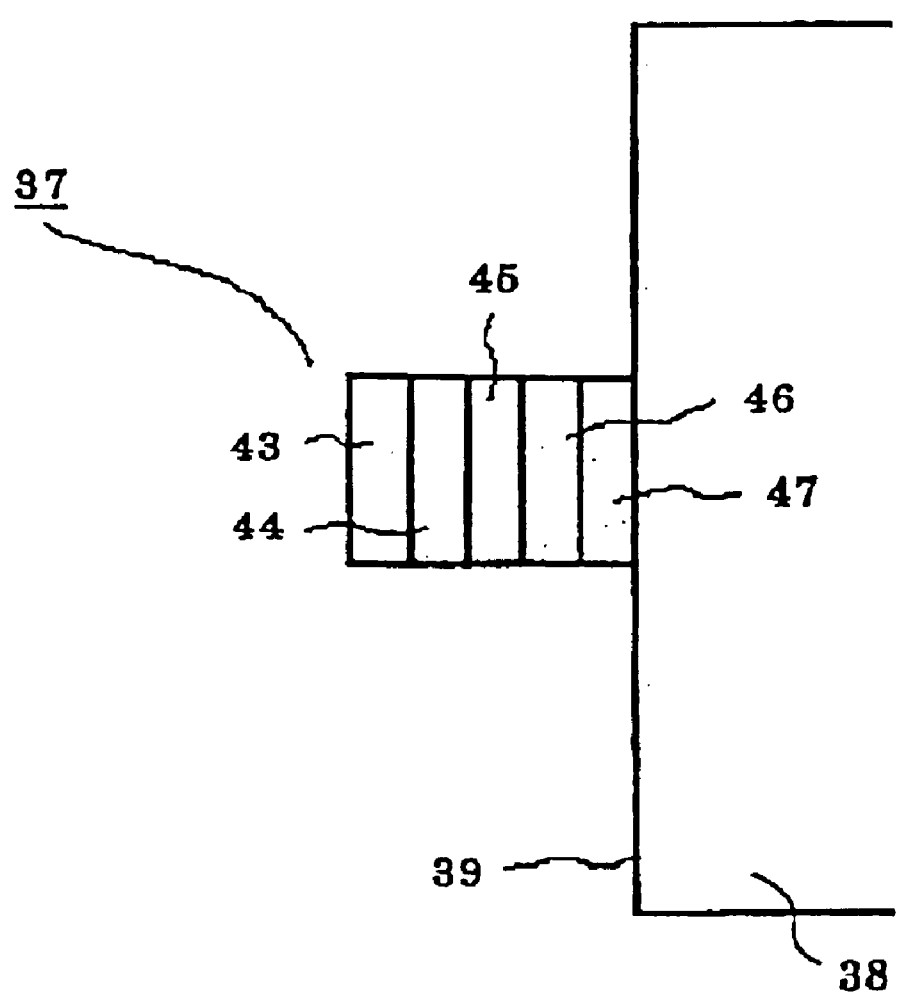
FIG. 20 is a cross-sectional view of an optical conductor and an electroluminescence device in a lighting device in accordance with the sixteenth embodiment of the present invention.

FIG. 20 is a cross-sectional view of a lighting device in accordance with the sixteenth embodiment.

In the sixteenth embodiment, an electroluminescence device 37 comprised of a transparent electrode layer 47, a hole-injecting layer 46, a light-emitting layer 45, an electron-transporting layer 44 and a metal electrode layer 43 is formed on an end surface 39 of an optical conductor 38. The electroluminescence device 37 emits a light having a mixture color of blue, red and green. The mixture color is preferably white. The electron-transporting layer 44 and the light-emitting layer 45 may be formed as a single layer, or the electron-transporting layer 44, the light-emitting layer 45 and the hole-injecting layer 46 may be formed as a single layer.

[Seventeenth Embodiment]

Figure 21:
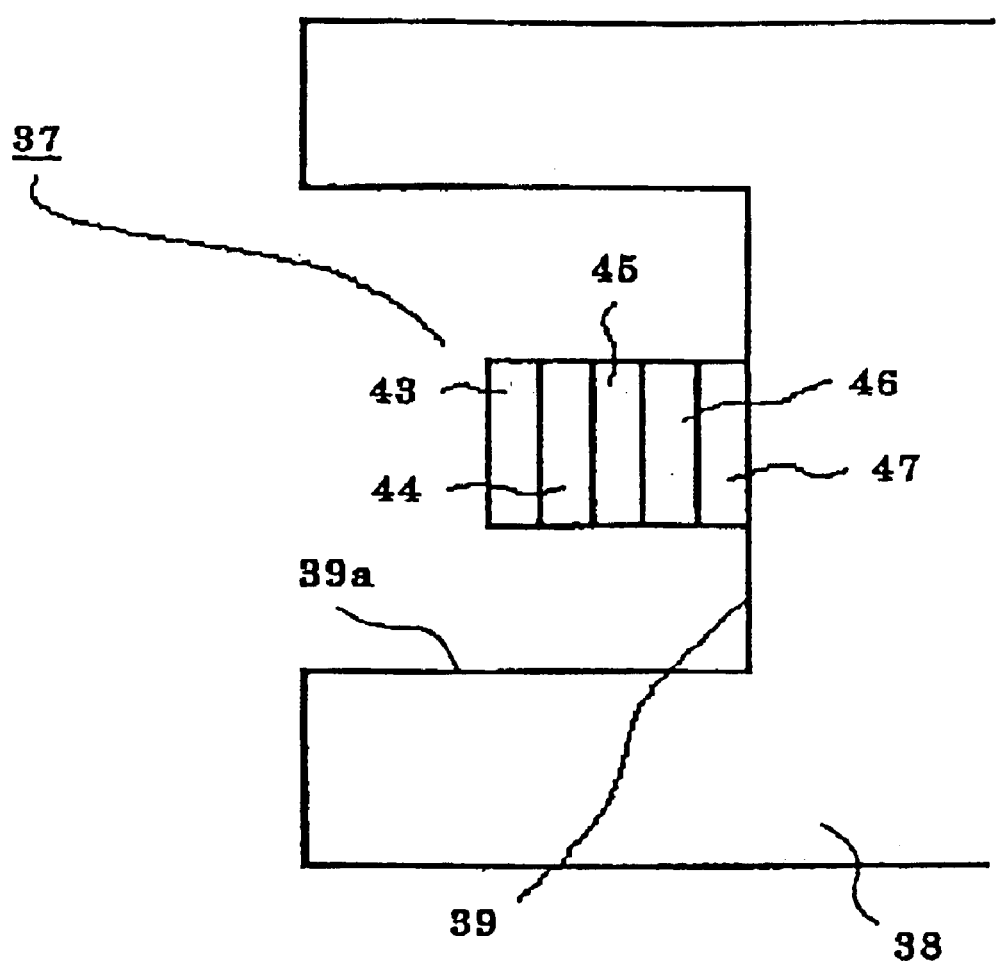
FIG. 21 is a cross-sectional view of an optical conductor and an electroluminescence device in a lighting device in accordance with the seventeenth embodiment of the present invention.

FIG. 21 is a cross-sectional view of a lighting device in accordance with the seventeenth embodiment.

In the seventeenth embodiment, an optical conductor 38 is formed at an end surface 39 thereof with a recess 39a having a width greater than a width of an electroluminescence device 37 and a depth greater than a height of the electroluminescence device 37. The electroluminescence device 37 has the same structure as the structure of the electroluminescence device 37 in the sixteenth embodiment, illustrated in FIG. 20.

[Eighteenth Embodiment]

Figure 22:
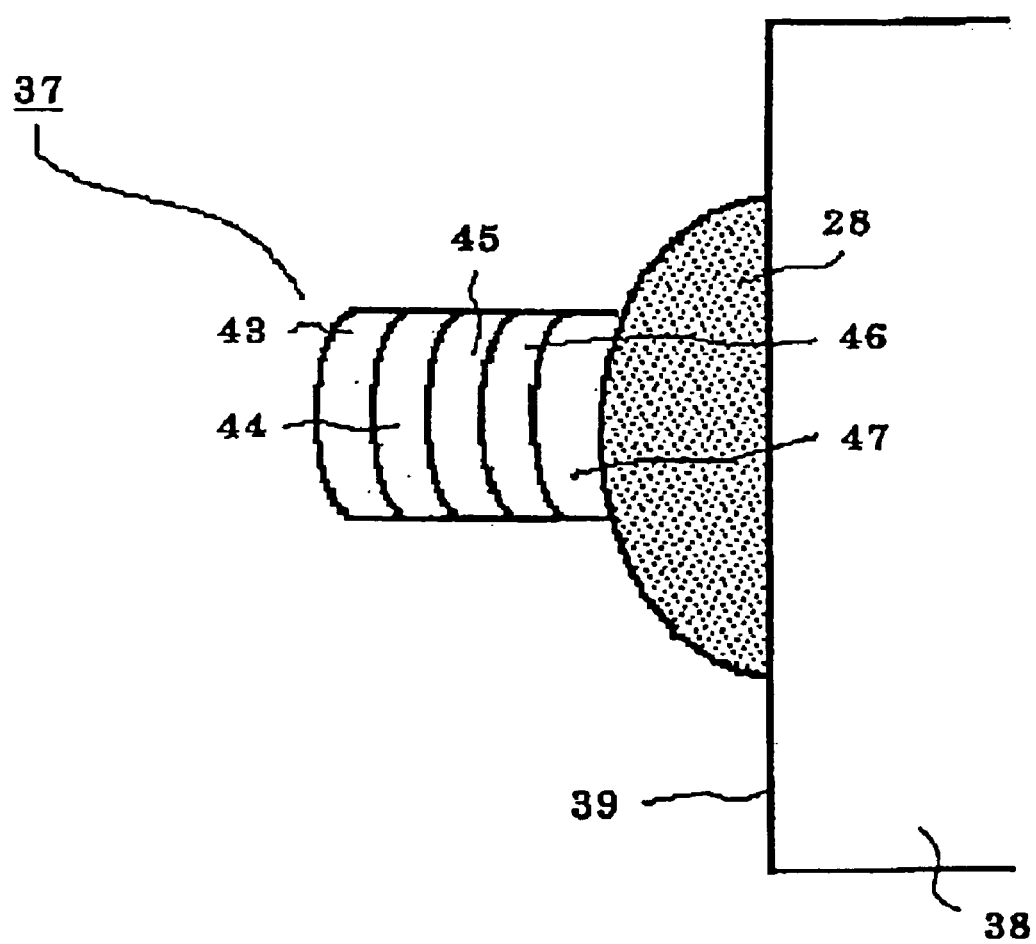
FIG. 22 is a cross-sectional view of an optical conductor and an electroluminescence device in a lighting device in accordance with the eighteenth embodiment of the present invention.

FIG. 22 is a cross-sectional view of a lighting device in accordance with the eighteenth embodiment.

The lighting device in accordance with the eighteenth embodiment includes an optical conductor 38, a transparent expansion 28 formed on an end surface 39 of the optical conductor 38, and an electroluminescence device 37 formed on the transparent expansion 28.

The electroluminescence device 37 is comprised of a transparent electrode layer 47, a hole-injecting layer 46, a light-emitting layer 45, an electron-transporting layer 44, and a metal electrode layer 43 stacked in this order on the transparent expansion 28.

The transparent expansion 28 has an arcuate surface, and hence, the layers 44 to 47 have arcuate surfaces reflecting the arcuate surface of the transparent expansion 28.

The transparent electrode layer 47 has an index of refraction greater than indices of refraction of the layers 46, 45 and 44, and the transparent expansion 28 has an index of refraction almost equal to that of the transparent electrode layer 47.

Hereinbelow is explained a merit obtained by the lighting device in accordance with the eighteenth embodiment, with reference to FIGS. 23A and 23B.

Figure 23A:
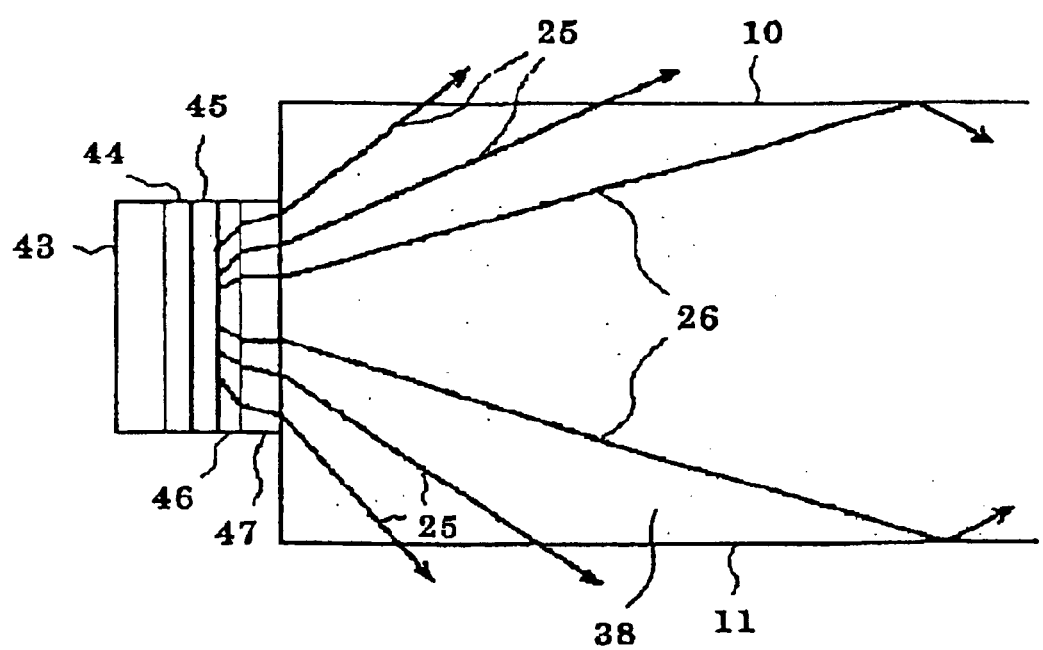
FIG. 23A is a cross-sectional view of an optical conductor and an electroluminescence device in a lighting device in accordance with the sixteenth embodiment, illustrating how lights emitted from the electroluminescence device advance in the optical conductor.
Figure 23B:
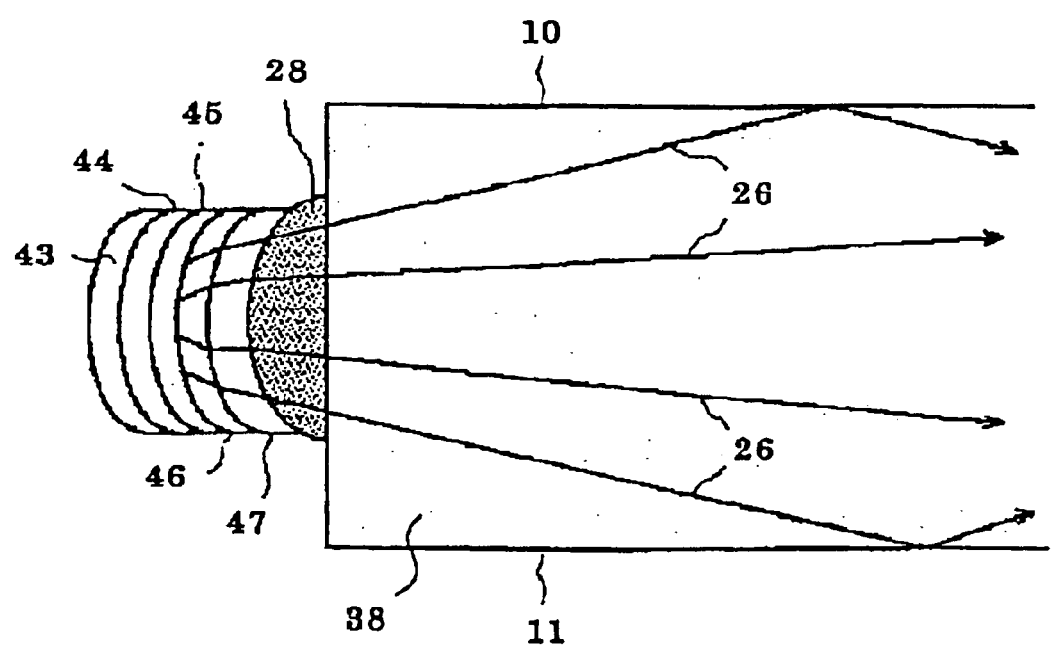
FIG. 23B is a cross-sectional view of an optical conductor and an electroluminescence device in a lighting device in accordance with the eighteenth embodiment, illustrating how lights emitted from the electroluminescence device advance in the optical conductor.

FIG. 23A illustrates a path of a light emitted from the electroluminescence device 37 in the lighting device in accordance with the sixteenth embodiment, illustrated in FIG. 20, and FIG. 23B illustrates a path of a light emitted from the electroluminescence device 37 in the lighting device in accordance with the eighteenth embodiment, illustrated in FIG. 22.

As illustrated in FIG. 23A, in the lighting device in accordance with the sixteenth embodiment, illustrated in FIG. 20, lights emitted from the light-emitting layer 45 are refracted at an interface between the hole-injecting layer 46 and the transparent electrode layer 47 and further at an interface between the transparent electrode layer 47 and the optical conductor 38, and thus, are radiated in various directions. Since lights almost vertically emitted from the light-emitting layer 45 reach an upper surface 10 and a lower surface 11 of the optical conductor 38 at a relatively low angle, the lights are all-reflected at the upper and lower surfaces 10 and 11, and advance in the optical conductor 38 as effective lights 26. On the other hand, lights reaching the upper and lower surfaces 10 and 11 at a relatively high angle leave the optical conductor 38 without all-reflecting at the upper and lower surfaces 10 and 11. That is, those lights are lost lights 25.

In contrast, as illustrated in FIG. 23B, in the lighting device in accordance with the eighteenth embodiment, illustrated in FIG. 22, though lights emitted from the light-emitting layer 45 are refracted at an interface between the hole-injecting layer 46 and the transparent electrode layer 47, lights entering the optical conductor 38 at a higher angle with respect to a length-wise center line of the optical conductor 38 are refracted at a higher angle, because the interface between the hole-injecting layer 46 and the transparent electrode layer 47 is arcuate, and the transparent electrode layer 47 has a higher index of refraction than that of the hole-injecting layer 46. As a result, there are increased lights advancing in the optical conductor 38 in a direction almost perpendicular to the end surface 39. Since lights advancing in a direction almost perpendicular to the end surface 39 reach the upper and lower surfaces 10 and 11 at a relatively low angle, the lights are all-reflected at the upper and lower surfaces 10 and 11, and advance in the optical conductor 38 as effective lights 26.

Thus, it is understood that the transparent expansion 28 introduces lights emitted from the electroluminescence device, into the optical conductor 38 without loss.

The transparent expansion 28 can be formed on the end surface 39 of the optical conductor 38 by molding injection, self-construction by resin, annealing resin or molding resin through ink jet.

[Nineteenth Embodiment]

Figure 24:
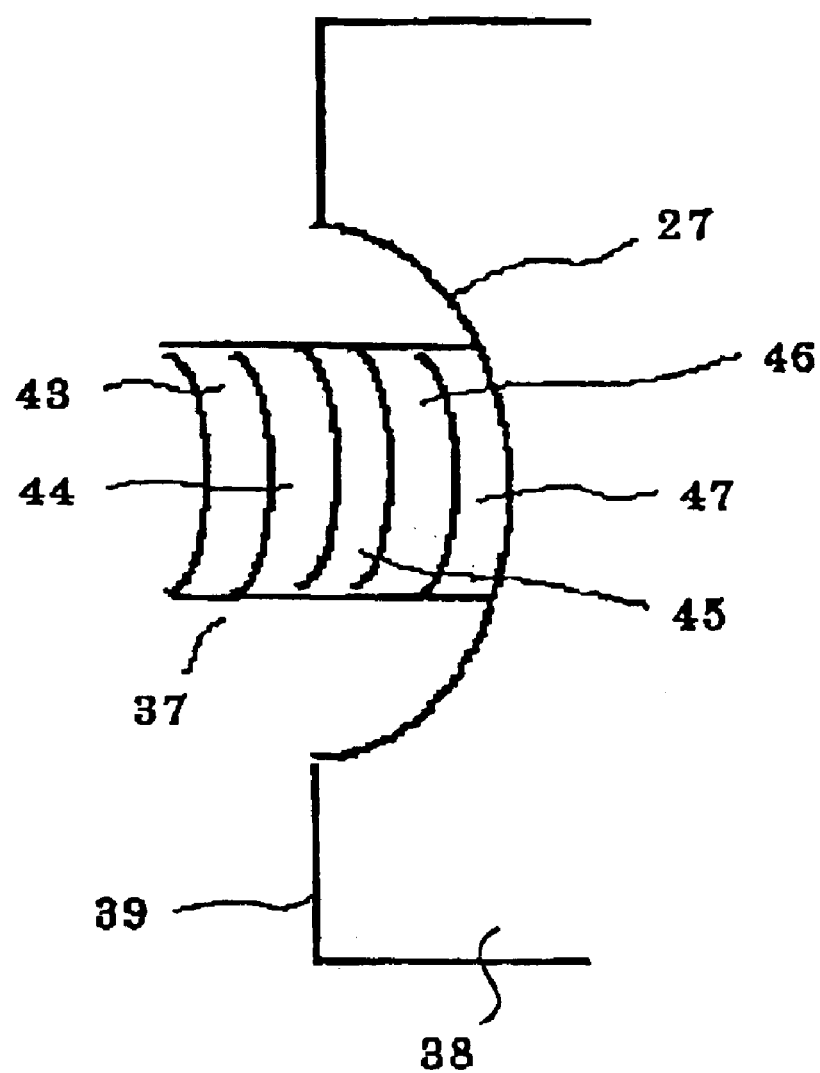
FIG. 24 is a cross-sectional view of an optical conductor and an electroluminescence device in a lighting device in accordance with the nineteenth embodiment of the present invention.

FIG. 24 is a cross-sectional view of a lighting device in accordance with the nineteenth embodiment.

In the nineteenth embodiment, an optical conductor 38 is formed at an end surface 39 thereof with an arcuate recess 39b having a diameter greater than a width of an electroluminescence device 37. The electroluminescence device 37 has the same structure as the structure of the electroluminescence device 37 in the sixteenth embodiment, illustrated in FIG. 20.

[Twentieth Embodiment]

Figure 25:
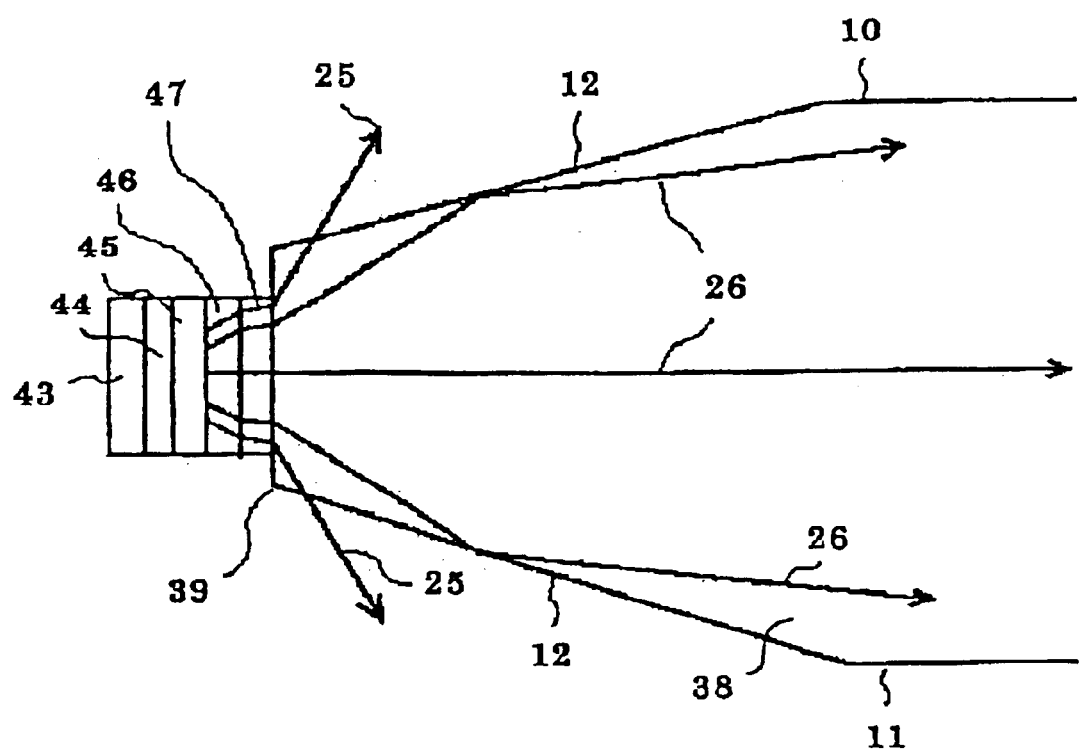
FIG. 25 is a cross-sectional view of an optical conductor and an electroluminescence device in a lighting device in accordance with the twentieth embodiment of the present invention.

FIG. 25 is a cross-sectional view of a lighting device in accordance with the twentieth embodiment.

In the twentieth embodiment, an optical conductor 38 is designed to have tapered surfaces 12 at its upper and lower surfaces 10 and 11 around an end surface 39 on which an electroluminescence device is formed.

In accordance with the twentieth embodiment, when lights emitted from the electroluminescence device reach the upper and lower surfaces 10 and 11 in the vicinity of the end surface 39, the lights collide with the tapered surfaces 12. As a result, the lights reach the upper and lower surfaces 10 and 11 at a relatively low angle, ensuring reduction in the lost lights 25.

The optical conductor 38 having the tapered surfaces 12 can be formed by molding injection, for instance.

[Twenty First Embodiment]

Figure 26:
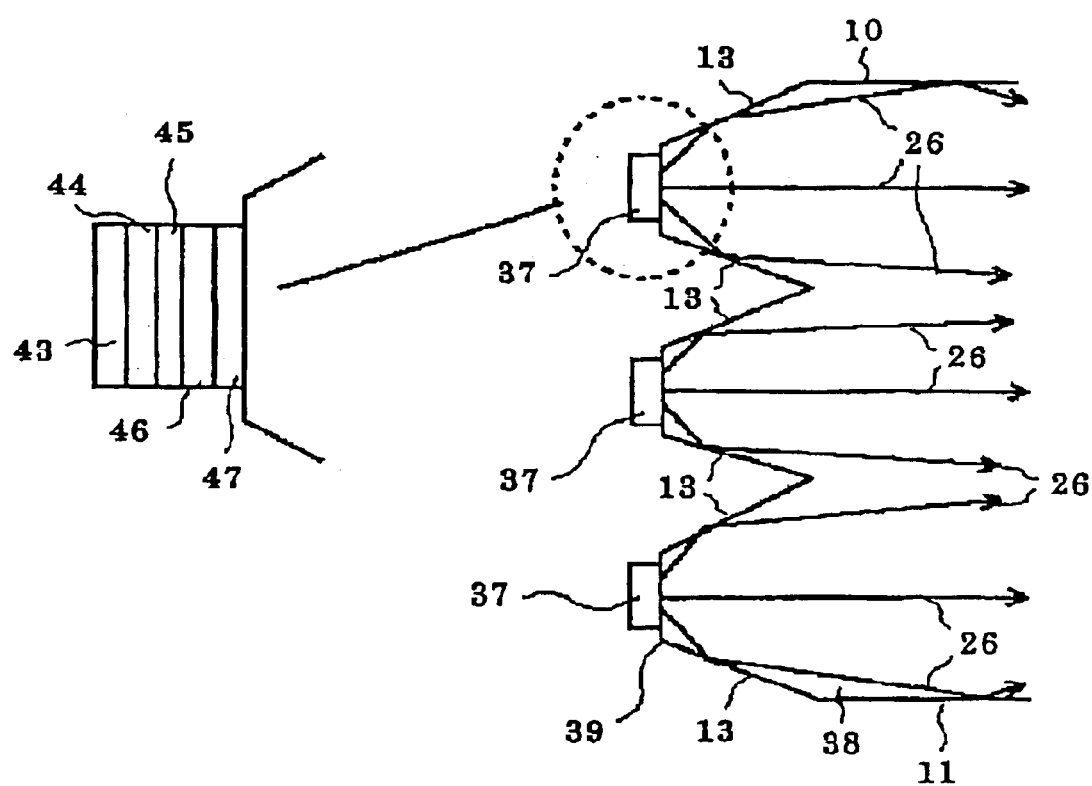
FIG. 26 is a cross-sectional view of an optical conductor and an electroluminescence device in a lighting device in accordance with the twenty first embodiment of the present invention.

FIG. 26 is a cross-sectional view of a lighting device in accordance with the twenty first embodiment.

In the twenty first embodiment, the lighting device includes a plurality of electroluminescence devices 37 spaced away from one another, and an optical conductor 38 is designed to have tapered surfaces 13 around each of the electroluminescence devices 37.

In accordance with the twenty first embodiment, lights emitted from the electroluminescence devices 37 reach the tapered surfaces 13 in the vicinity of the end surface 39 at a smaller incident angle than an incident angle of a light reaching the optical conductor 38 having no tapered surfaces. This ensures reduction in the lost lights 25 and increase in the effective lights 26 advancing in the optical conductor 38.

The optical conductor 38 having the tapered surfaces 13 can be formed by molding injection, for instance.

[Twenty Second Embodiment]

Figure 27:
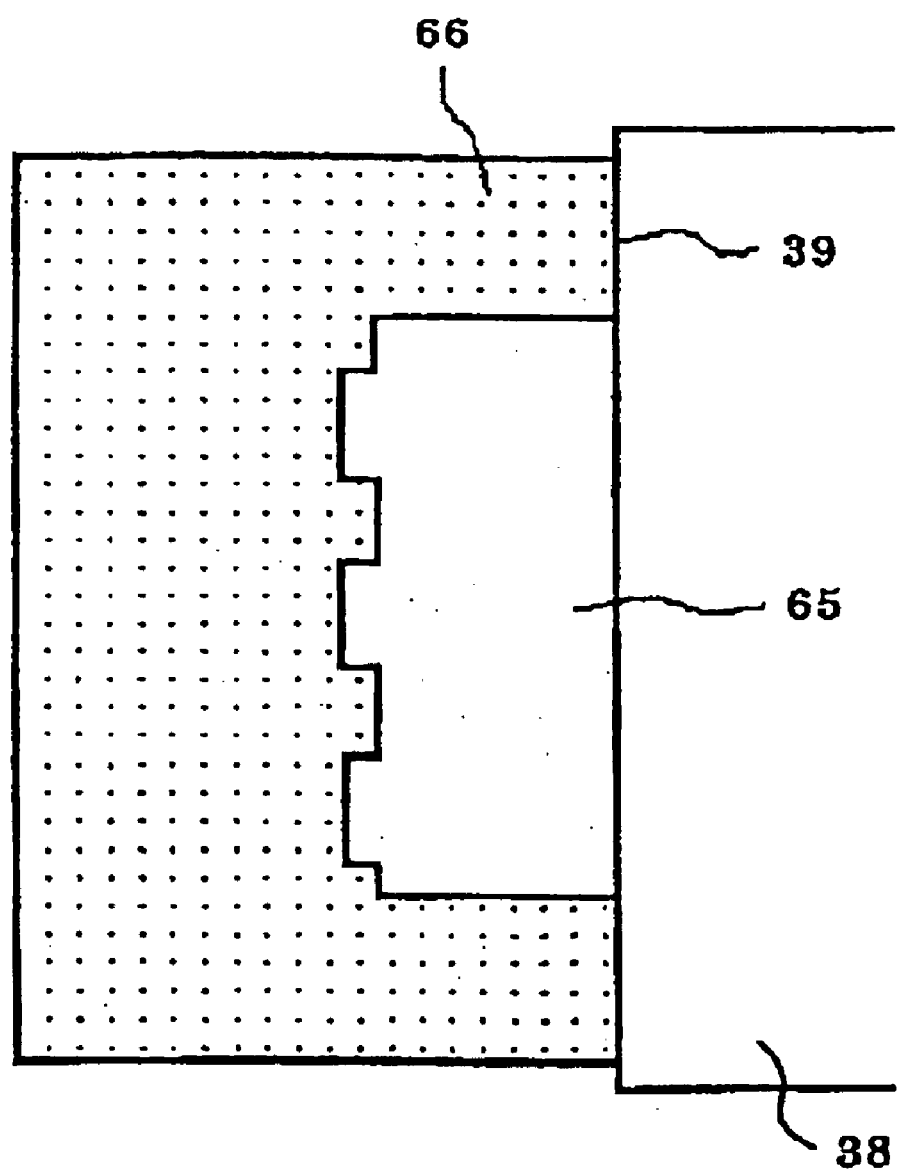
FIG. 27 is a cross-sectional view of an optical conductor and an electroluminescence device in a lighting device in accordance with the twenty second embodiment of the present invention.

FIG. 27 is a cross-sectional view of a lighting device in accordance with the twenty second embodiment.

The electroluminescence devices illustrated in FIGS. 7 to 26 might be degraded by oxygen or water with respect to its performances. In order to prevent such degradation, the electroluminescence device is necessary to be insulated from oxygen or water. The lighting device in accordance with the twenty second embodiment insulates the electroluminescence device from oxygen and water.

In the twenty second embodiment, an electroluminescence device 65 is entirely covered with a seal 66, as illustrated in FIG. 27.

For instance, the seal 66 may be composed of a resin which is hardened when ultra-violet rays are radiated thereto, in which case, such a resin is coated onto an end surface 39 of an optical conductor 38 so that the electroluminescence device 65 is entirely covered with the resin, and then, ultra-violet rays are radiated to the resin.

It is necessary for a resin of which the seal 66 is composed not to allow water and oxygen to pass therethrough, and not to exert a harmful influence on the electroluminescence device 65. In addition, a gas generated in the resin would not exert a harmful influence on the electroluminescence device 65.

[Twenty Third Embodiment]

Figure 28:
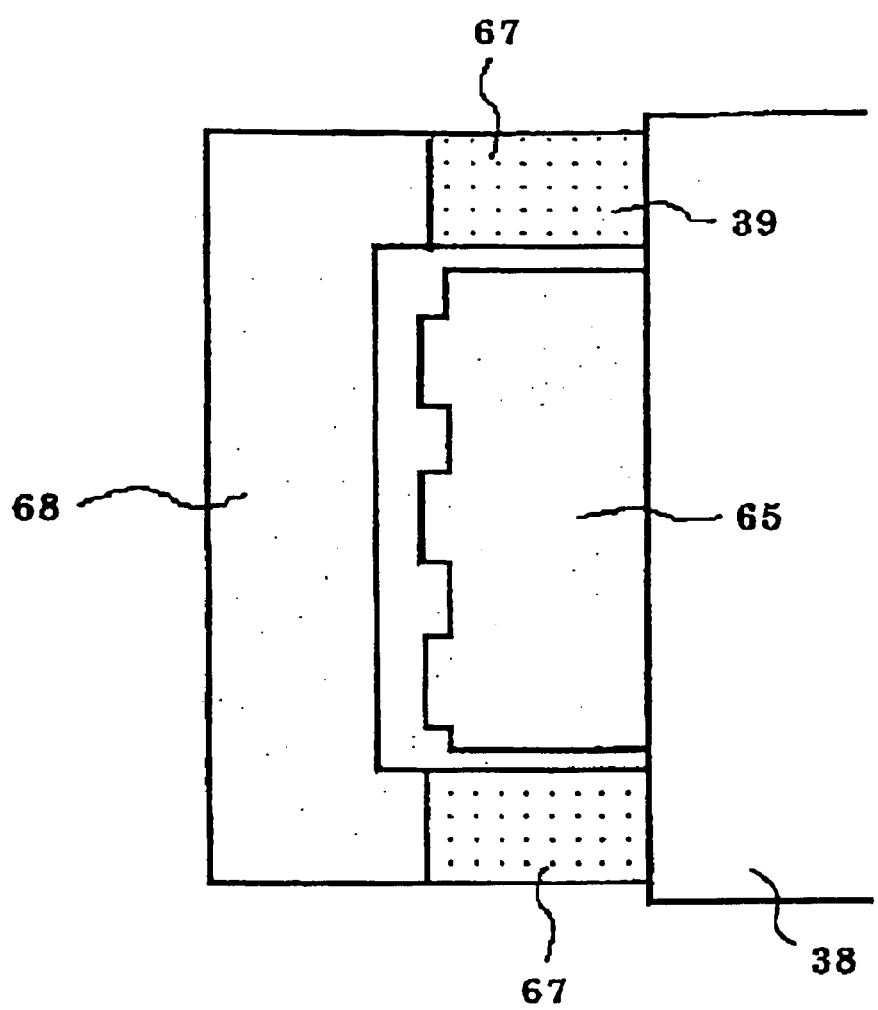
FIG. 28 is a cross-sectional view of an optical conductor and an electroluminescence device in a lighting device in accordance with the twenty third embodiment of the present invention.

FIG. 28 is a cross-sectional view of a lighting device in accordance with the twenty third embodiment.

In the twenty third embodiment, an electroluminescence device 65 is covered with a sealing cap 68, as illustrated in FIG. 28. The sealing cap 68 is adhered to an end surface 39 of an optical conductor 38 through a adhesive 67. For instance, the sealing cap 68 may be composed of a material which does not allow water and oxygen to pass therethrough, such as glass, ceramic resin or metal.

It is necessary for the adhesive 67 not to allow water and oxygen to pass therethrough, and not to exert a harmful influence on the electroluminescence device 65. In addition, a gas generated in the adhesive 67 would not exert a harmful influence on the electroluminescence device 65.

[Twenty Fourth Embodiment]

Figure 29:
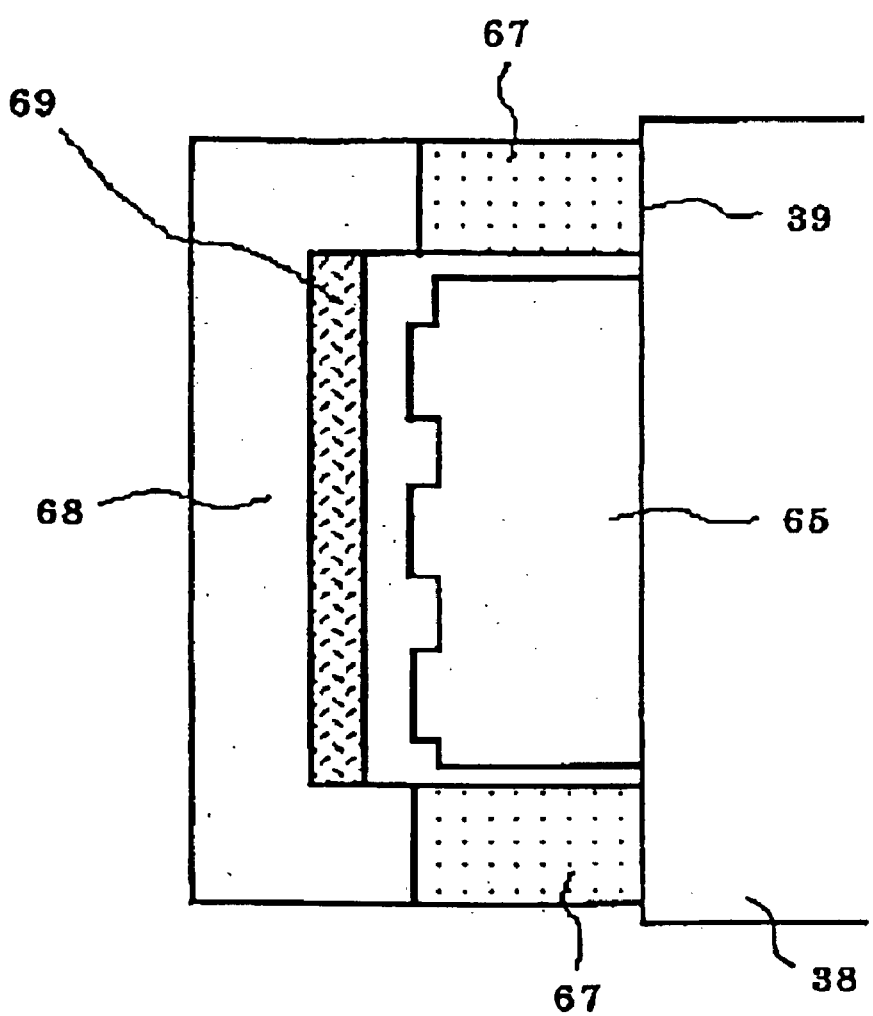
FIG. 29 is a cross-sectional view of an optical conductor and an electroluminescence device in a lighting device in accordance with the twenty fourth embodiment of the present invention.

FIG. 29 is a cross-sectional view of a lighting device in accordance with the twenty fourth embodiment.

In the twenty fourth embodiment, an electroluminescence device 65 is covered with a sealing cap 68 in which a deoxidizer and/or a dehydrator 69 is arranged, as illustrated in FIG. 29. The deoxidizer or dehydrator 69 insulates the electroluminescence device 65 from water or oxygen.

In place of arranging the deoxidizer or dehydrator 69 in the sealing cap 68, the sealing cap 68 may be designed to have functions of deoxidization and dehydration.

[Twenty Fifth Embodiment]

Figure 30:
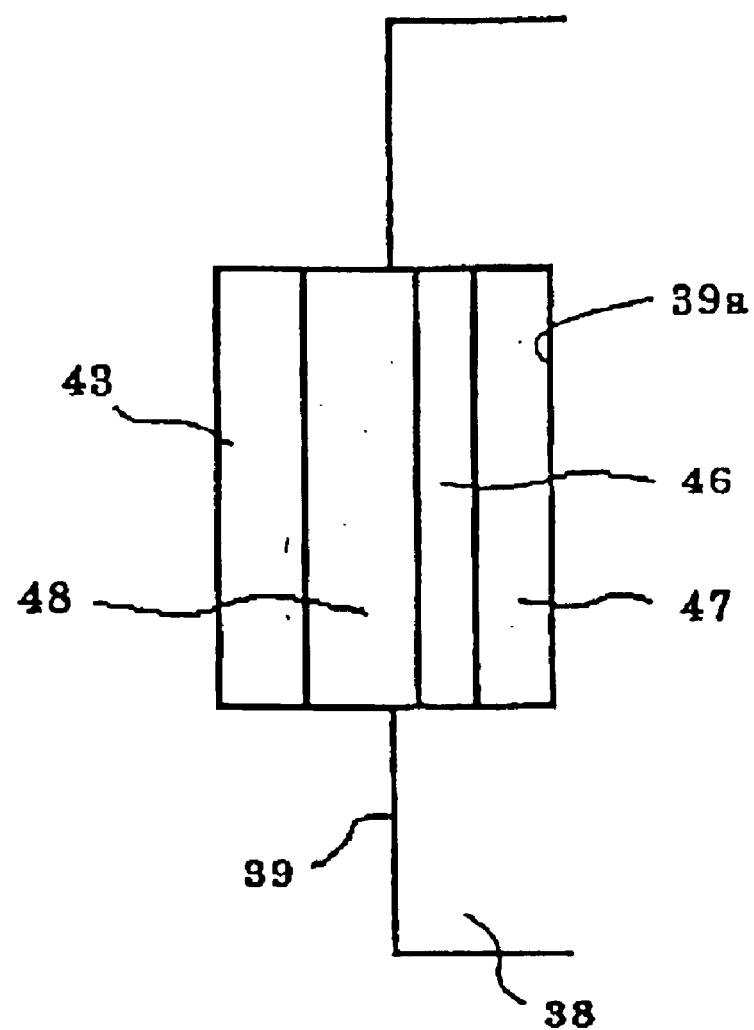
FIG. 30 is a cross-sectional view of an optical conductor and an electroluminescence device in a lighting device in accordance with the twenty fifth embodiment of the present invention.

FIG. 30 is a cross-sectional view of a lighting device in accordance with the twenty fifth embodiment.

The lighting device in accordance with the twenty fifth embodiment includes an optical conductor 38 having an end surface 39 formed with a recess 39a, and an electroluminescence device embedded in the recess 39a.

The electroluminescence device is comprised of a transparent electrode layer 47, a hole-injecting layer 46, an electron-transporting and light-emitting layer 48, and a metal electrode layer 43 stacked in this order viewing from the recess 39a. In comparison with the electroluminescence device in the lighting device in accordance with the sixteenth embodiment, illustrated in FIG. 20, the electron-transporting layer and the light-emitting layer are replaced with a single layer, that is, the electron-transporting and light-emitting layer 48 in the twenty fifth embodiment.

[Twenty Sixth Embodiment]

Figure 31:
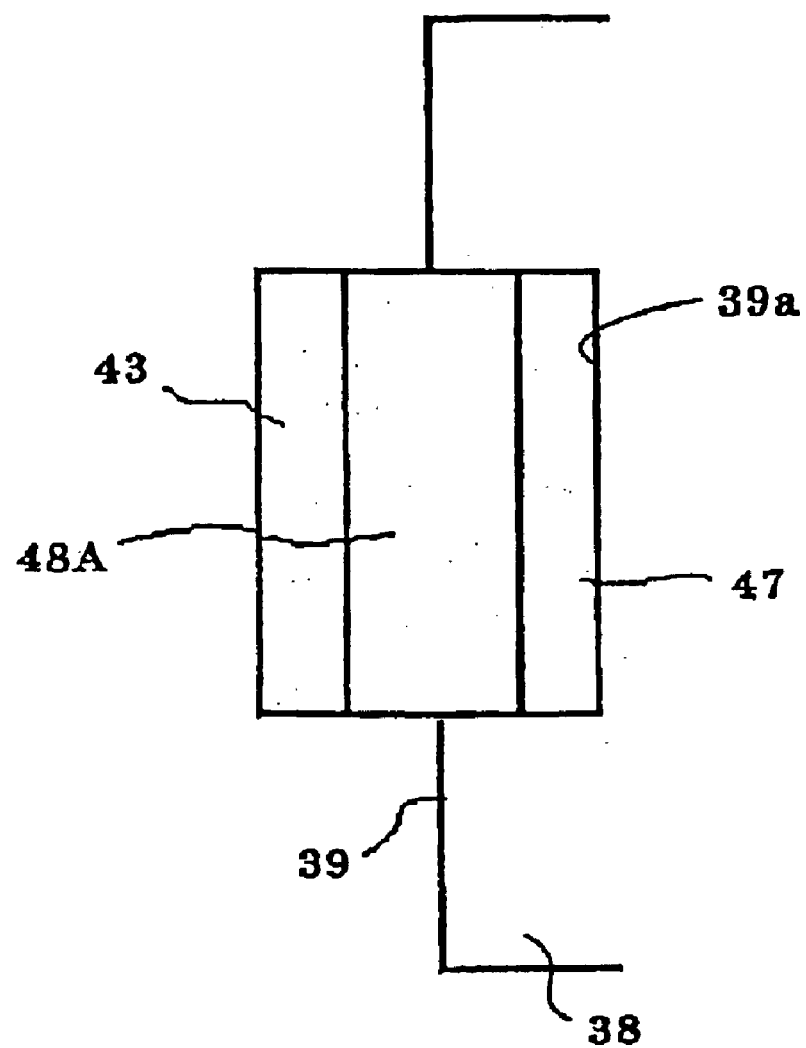
FIG. 31 is a cross-sectional view of an optical conductor and an electroluminescence device in a lighting device in accordance with the twenty sixth embodiment of the present invention.

FIG. 31 is a cross-sectional view of a lighting device in accordance with the twenty sixth embodiment.

The lighting device in accordance with the twenty sixth embodiment includes an optical conductor 38 having an end surface 39 formed with a recess 39a, and an electroluminescence device embedded in the recess 39a.

The electroluminescence device is comprised of a transparent electrode layer 47, a hole-injecting, electron-transporting and light-emitting layer 48A, and a metal electrode layer 43 stacked in this order viewing from the recess 39a. In comparison with the electroluminescence device in the lighting device in accordance with the sixteenth embodiment, illustrated in FIG. 20, the hole-injecting layer, the electron-transporting layer and the light-emitting layer are replaced with a single Layer, that is, the hole-injecting, electron-transporting and light-emitting layer 48A in the twenty sixth embodiment.

Table 1 shows examples of materials of which parts in the above-mentioned liquid crystal display device are composed.

TABLE 1

| | |
|---|---|
| Optical conductor | Transparent resin such as acrylic resin |
| Reflector | Single layer composed of Al, Ag, Cr, Ta, Zr or Hf, Multi-layers composed of the same, Layer composed of a mixture of Al, Ag, Cr, Ta, Zr or Hf, Single layer composed of Al oxide, Al nitride, Si oxide, Si nitride or Ta oxide, Multi-layers composed of the same, Layer composed of a mixture of Al oxide, Al nitride, Si oxide, Si nitride or Ta oxide |
| Transparent substrate | Glass, Transparent resin, or Quartz |
| Protector | Single layer composed of Al oxide, Al nitride, Si oxide, Si nitride or Ta oxide, Multi-layers composed of the same, Layer composed of a mixture of Al oxide, Al nitride, Si oxide, Si nitride or Ta oxide |
| Liquid crystal | TN (Twisted Nematic) mode liquid crystal cell |
| Electrode substrate | Glass, Resin or Quartz |
| Reflector | Reflective polarizer such as birefringent dielectric multi-layered film or cholesteric liquid crystal polymer film |
| Metal electrode layer | MgAg, Al, LiAl |
| Electron-transporting layer | Quinolinol aluminum complex (Alq), PBD, TAZ, BND, Oxadiazole derivative (OXD), OXD-7, polyphenylenevynylene (PPV) |
| Light-emitting layer | Quinolinol aluminum complex (Alq) to which red fluorescent pigment is added, Quinolinol aluminum complex (Alq), Beryllium benzoquinolinol complex, Oxazole complex of zinc, material containing precursor of conjugate high polymer and at least one fluorescent substance. Example of precursor: Polyvynylenphenylene or derivatives thereof Fluorescent substance: rhodamine B, distylvyphenyl, coumarin, tetraphenylbutadiene, quinacridone or derivatives thereof |
| Hole-injecting layer | Toriphenyldiamine derivatives (TPD), Polphylene compounds such as copper phthalocyanine |
| Transparent electrode layer | Indium-Tin-Oxide (ITO) |
| Driving-current switching device | Transistor |
| Device for supplying a current to an electroluminescence device | Transistor |
| First and second leads | Cu, Ta, Ru |
| Insulating layer | Al oxide, Si oxide |

Hereinbelow is explained a method of fabricating the above-mentioned lighting device, with reference to FIGS. 32A to 32H.

Figure 32A:
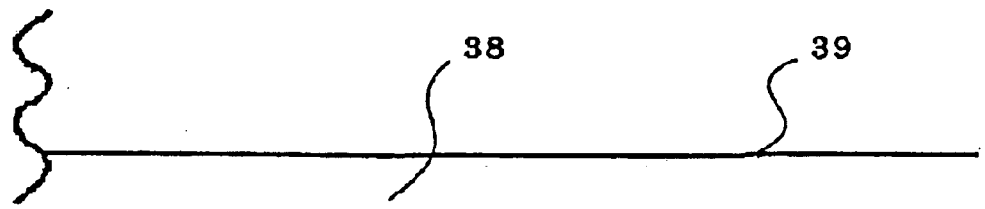
FIGS. 32A to 32H are cross-sectional views of the lighting device in accordance with the third embodiment, illustrating respective steps to be carried out in a method of fabricating the lighting device.

First, as illustrated in FIG. 32A, there is fabricated an optical conductor 38 having an end surface 39.

Figure 32B:
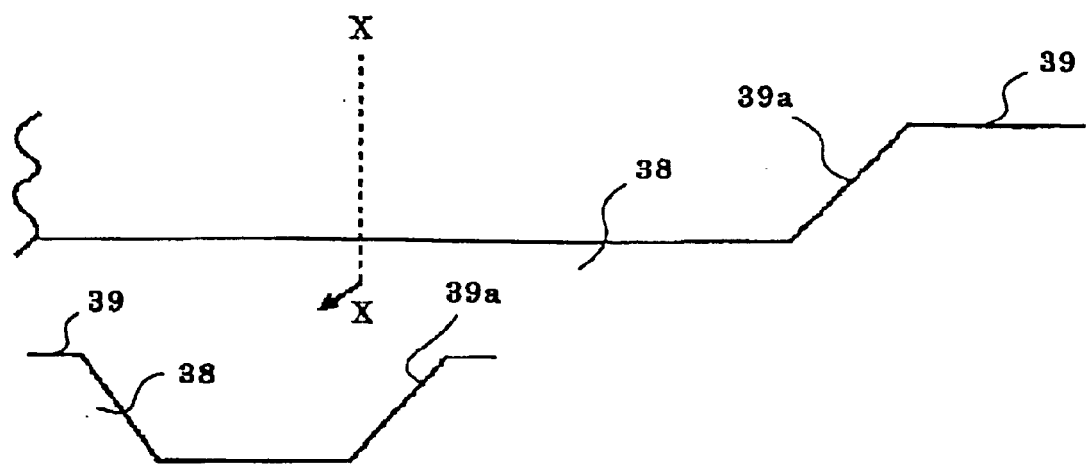

Then, as illustrated in FIG. 32B, there is formed a recess 39a at the end surface 39. FIG. 32B illustrates a cross-section of the recess 39a in a length-wise direction of the recess 39a, and a cross-section taken along the line X—X.

Figure 32C:
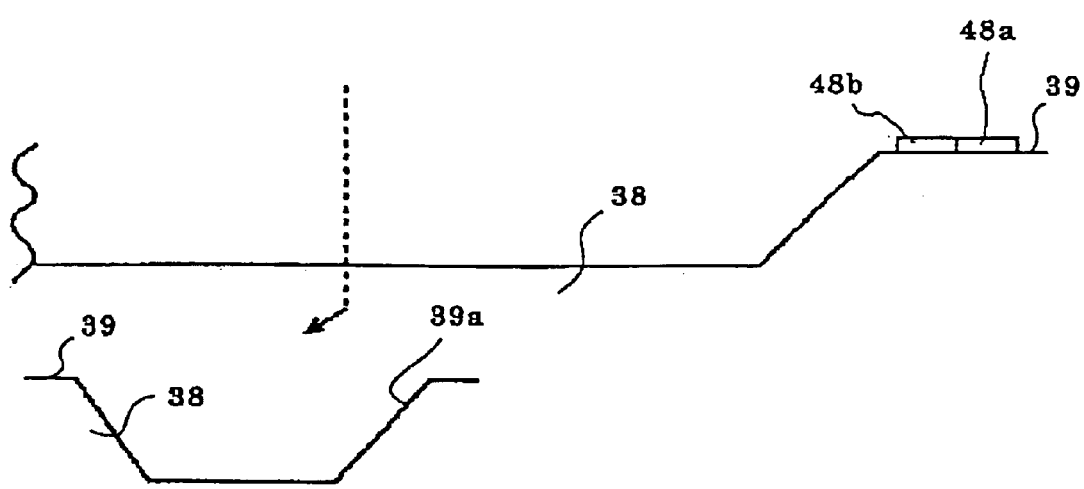

Then, as illustrated in FIG. 32C, a driving-current switching device 48a and a device 48b for supplying a current to an electroluminescence device are fabricated adjacent to each other on the end surface 39.

Figure 32D:
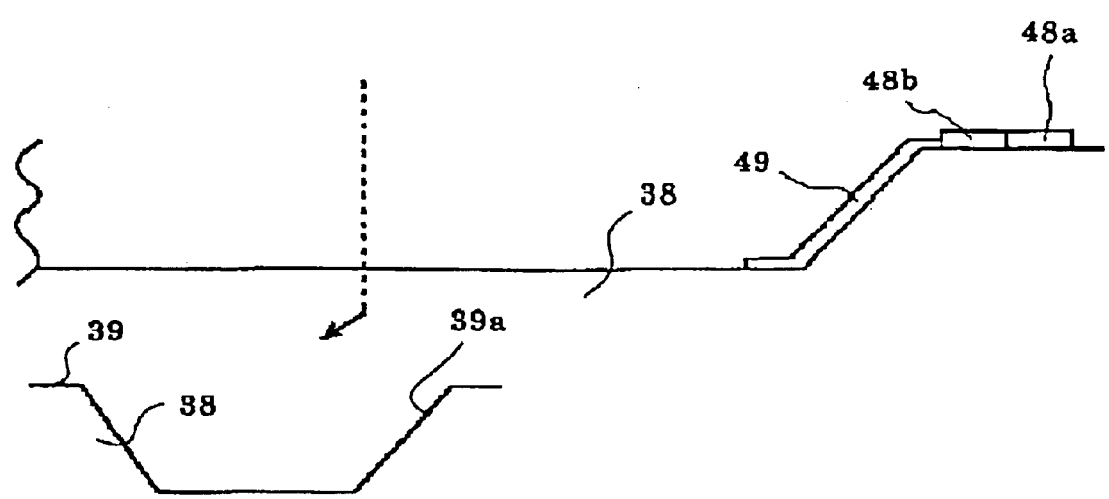

Then, as illustrated in FIG. 32D, a first lead 49 is formed on an inner sidewall of the recess 39a such that the first lead 49 is electrically connected to the current-supplying device 48b.

Figure 32E:
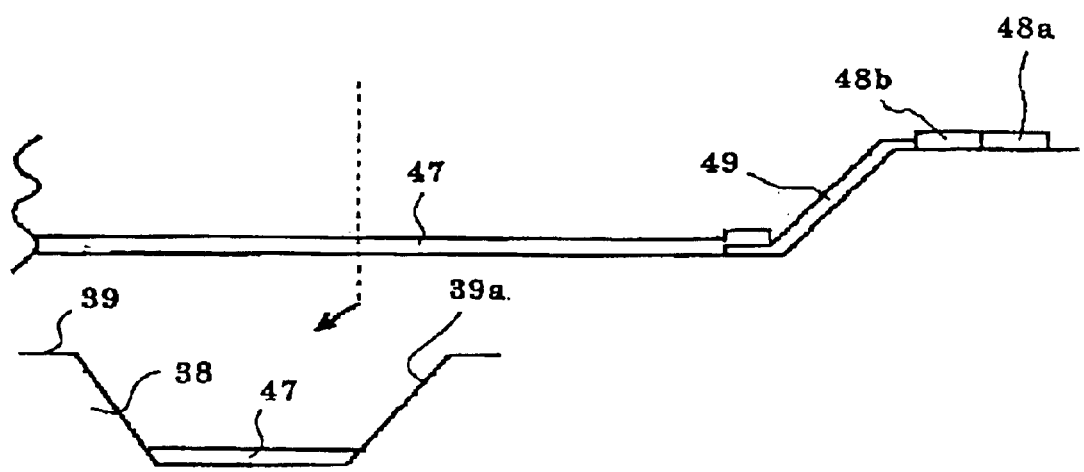

Then, as illustrated in FIG. 32E, a transparent electrode layer 47 is formed on a bottom of the recess 39a such that the transparent electrode layer 47 makes electrical contact with the first lead 49. The transparent electrode layer 47 may be patterned by sputtering through the use of a metal mask, or by a combination of sputtering and photolithography.

Though the transparent electrode layer 47 partially overlaps the first lead 49, it is not always necessary to form the transparent electrode layer 47 so as to overlap the first lead 49, if the transparent electrode layer 47 makes sufficient electrical contact with the first lead 49.

Though the first lead 49 is first formed prior to the formation of the transparent electrode layer 47 in the method, the transparent electrode layer 47 may be formed prior to the first lead 49.

Figure 32F:
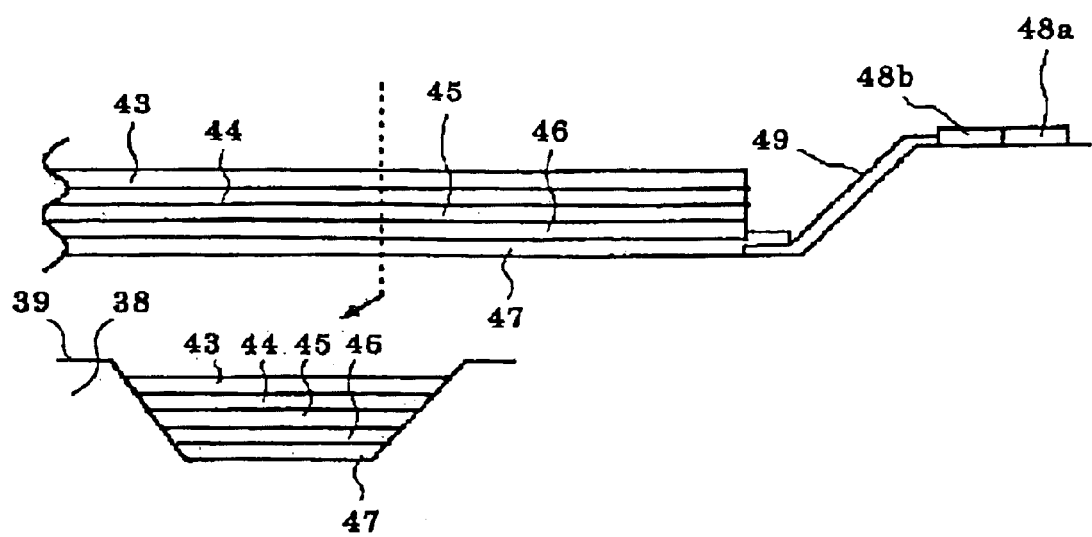

Then, as illustrated in FIG. 32F, a hole-injecting layer 46, a light-emitting layer 445, an electron-transporting layer 44 and a metal electrode layer 43 are formed in this order on the transparent electrode layer 47. The layers 46, 45 and 44 may be formed by evaporation through the use of a metal mask, or pattern-spraying through the use of ink jet. The metal electrode layer 43 may be formed by evaporation through the use of a metal mask, film deposition by sputtering, or a combination of photolithography and film deposition.

The light-emitting layer 45 and the electron-transporting layer 44 may be replaced with a single layer such as the light-emitting and electron-transporting layer 48 (see FIG. 30), and the hole-injecting layer 46, the light-emitting layer 45 and the electron-transporting layer 44 may be replaced with a single layer such as the hole-injecting, light-emitting and electron-transporting layer 48A (see FIG. 31), in which cases, fabrication steps could be simplified.

Figure 32G:
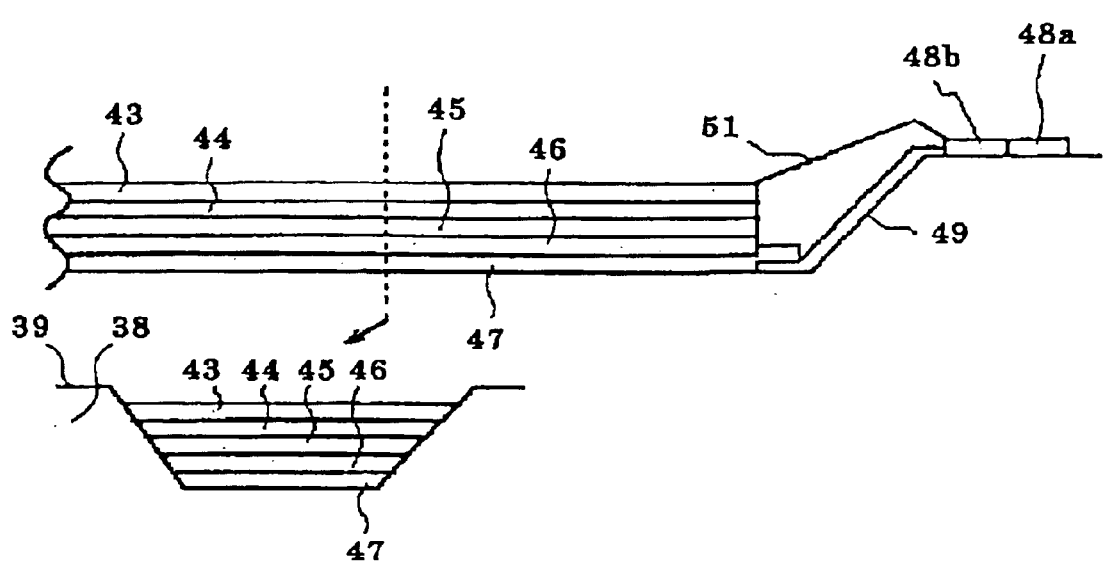

Then, as illustrated in FIG. 32G, an insulating layer 51 is formed covering the first lead 49, by sputtering through the use of a metal mask, or a combination of photolithography, sputtering and milling.

Figure 32H:
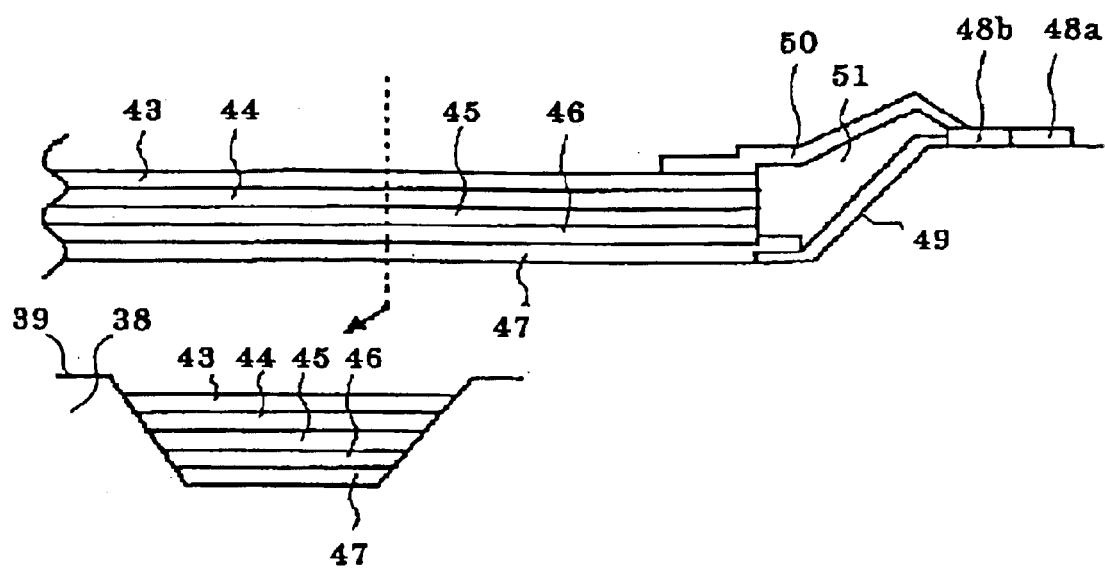

Then, as illustrated in FIG. 32H, a second lead 50 electrically connecting the metal electrode layer 43 and the device 48b to each other is formed on the insulating layer 51 by sputtering through the use of a metal mask, or a combination of photolithography, sputtering and milling.

Hereinbelow is explained another method of fabricating the lighting device, with reference to FIGS. 33A to 33G.

Figure 33A:
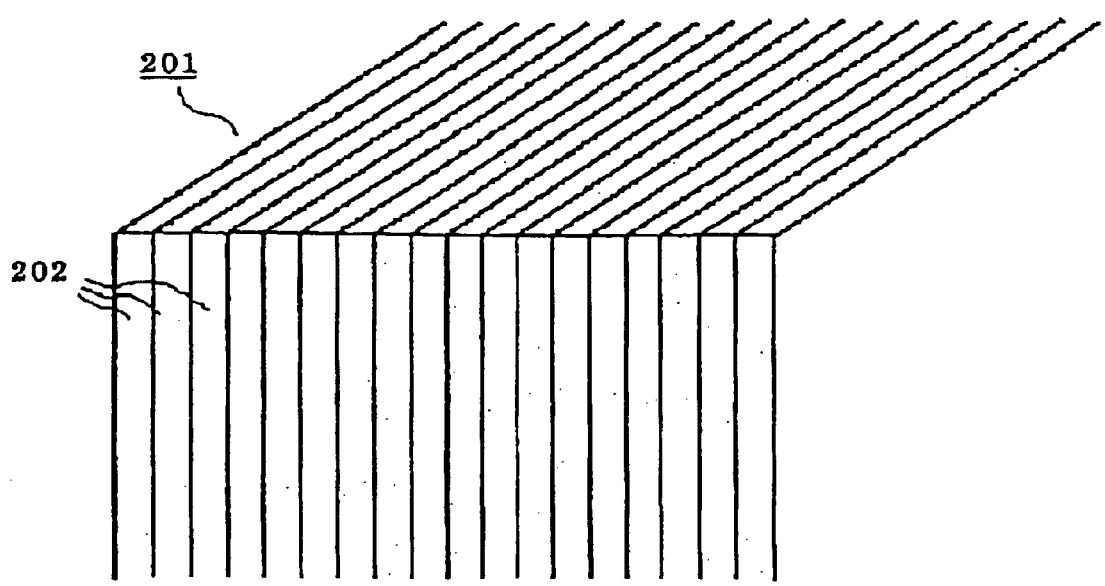
FIGS. 33A to 33G are cross-sectional views of the lighting device in accordance with the third embodiment, illustrating respective steps to be carried out in a method of fabricating the lighting device.
Figure 33B:
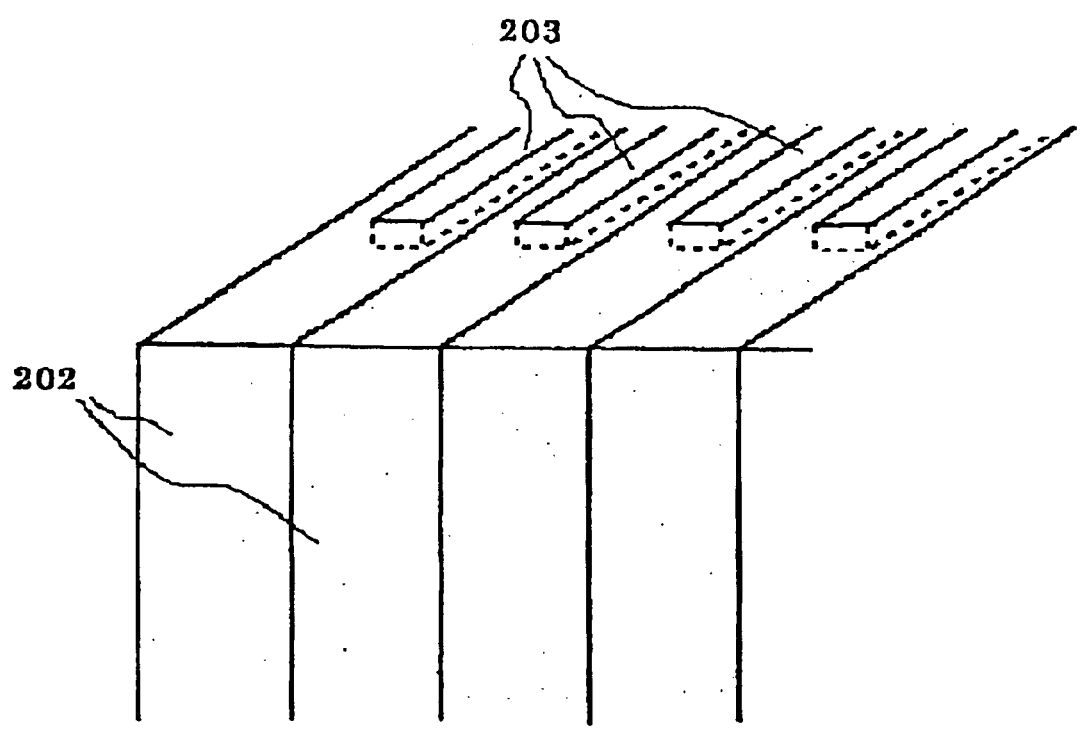

First, as illustrated in FIG. 33A, a plurality of optical conductors 202 are stacked one on another to thereby form a multi-layered optical conductor 201.

Then, as illustrated in FIG. 32B, a recess 203 is formed at an upper surface of each of the optical conductors 202. The recess 203 may be formed by means of laser beams, or by a process including steps of coating transparent material on each of the optical conductors 202 by sputtering or evaporation, and carrying out photolithography and etching to the transparent material. For instance, the transparent material may be selected from Al oxide, Al nitride, Si oxide, Si nitride or a combination thereof.

Figure 33C:
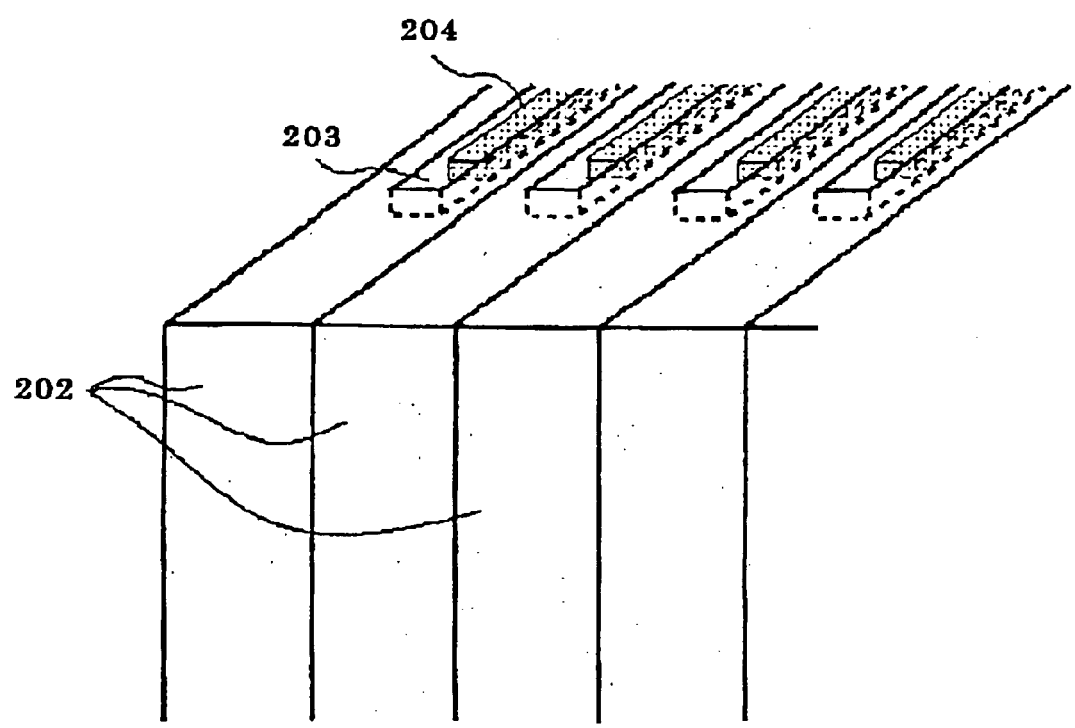

Then, as illustrated in FIG. 33C, an electroluminescence device 204 is fabricated in each of the recesses 203.

Specifically, a transparent electrode (not illustrated) is formed by sputtering. Then, the transparent electrode is patterned, for instance, by photolithography and etching. Then, a hole-injecting layer, a light-emitting layer and an electron-transporting layer are formed on the transparent electrode by evaporation, and thereafter, a metal electrode layer is formed on the electron-transporting layer by evaporation or sputtering.

Figure 33D:
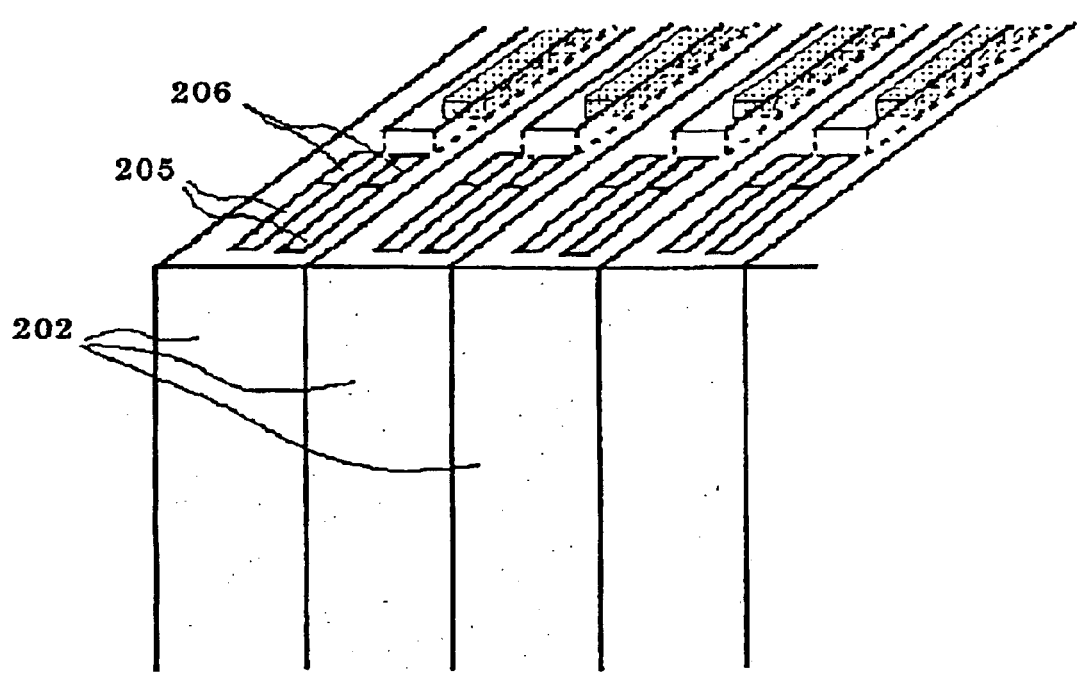

Then, as illustrated in FIG. 33D, wirings 205 and electrode terminals 206 are formed at an end surface of each of the optical conductor 202. The wirings 205 and the electrode terminals 206 are formed by photolithography and etching, for instance.

Figure 33E:
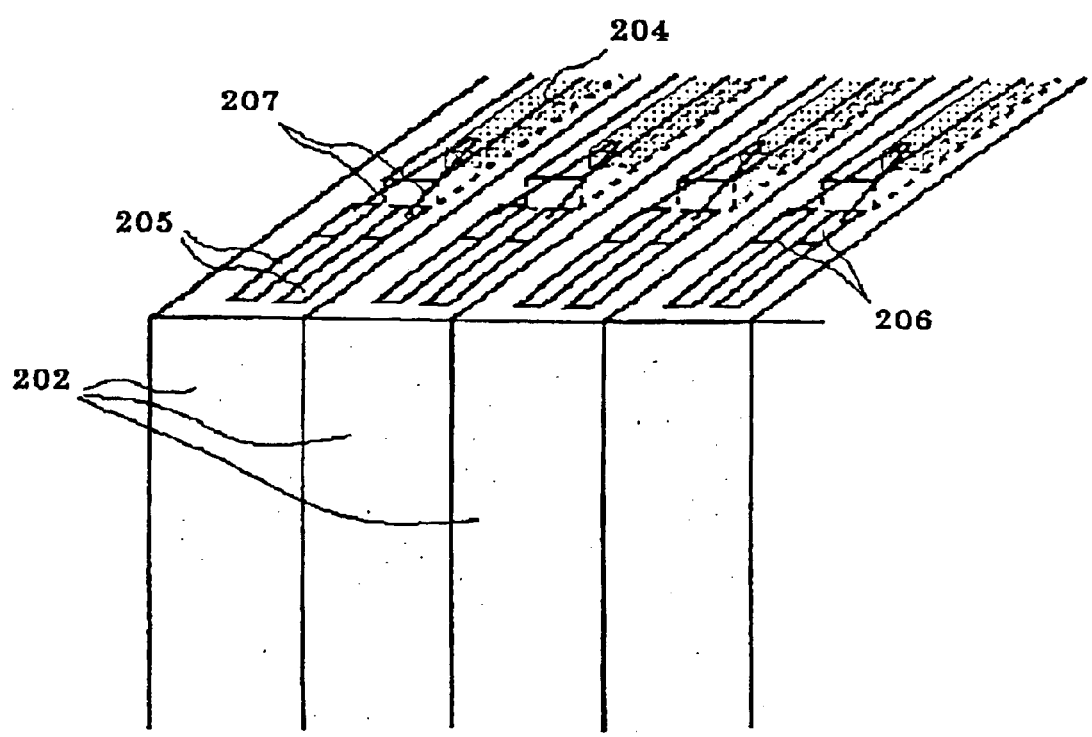

Then, as illustrated in FIG. 33E, the transparent electrode and a metal electrode (not illustrated) in each of the electroluminescence devices 204 are electrically connected to the associated electrode terminal 206 through a second wining 207. The second wiring 207 may be comprised of a bonding wire, or may be formed by depositing a wiring material through a metal mask.

Figure 33F:
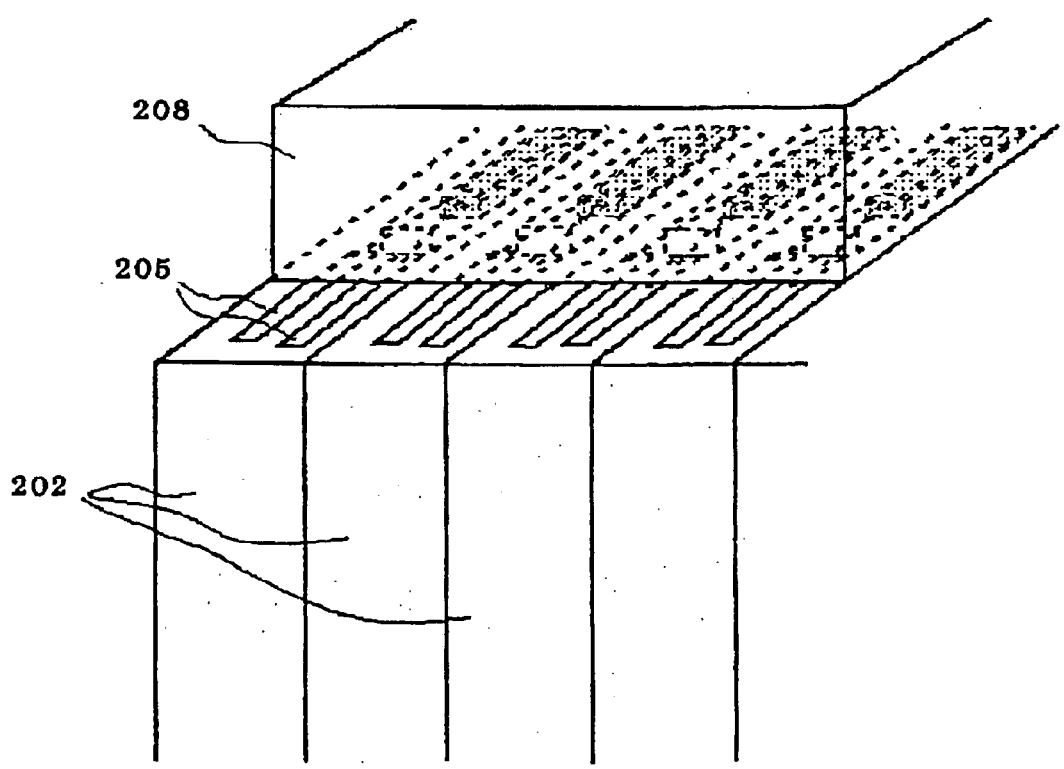

Then, as illustrated in FIG. 33F, a seal 208 is formed on the end surface of the optical conductor 202 such that the wirings 205 are not covered with the seal 208, in order to insulate the electroluminescence devices 204 from atmosphere.

Figure 33G:
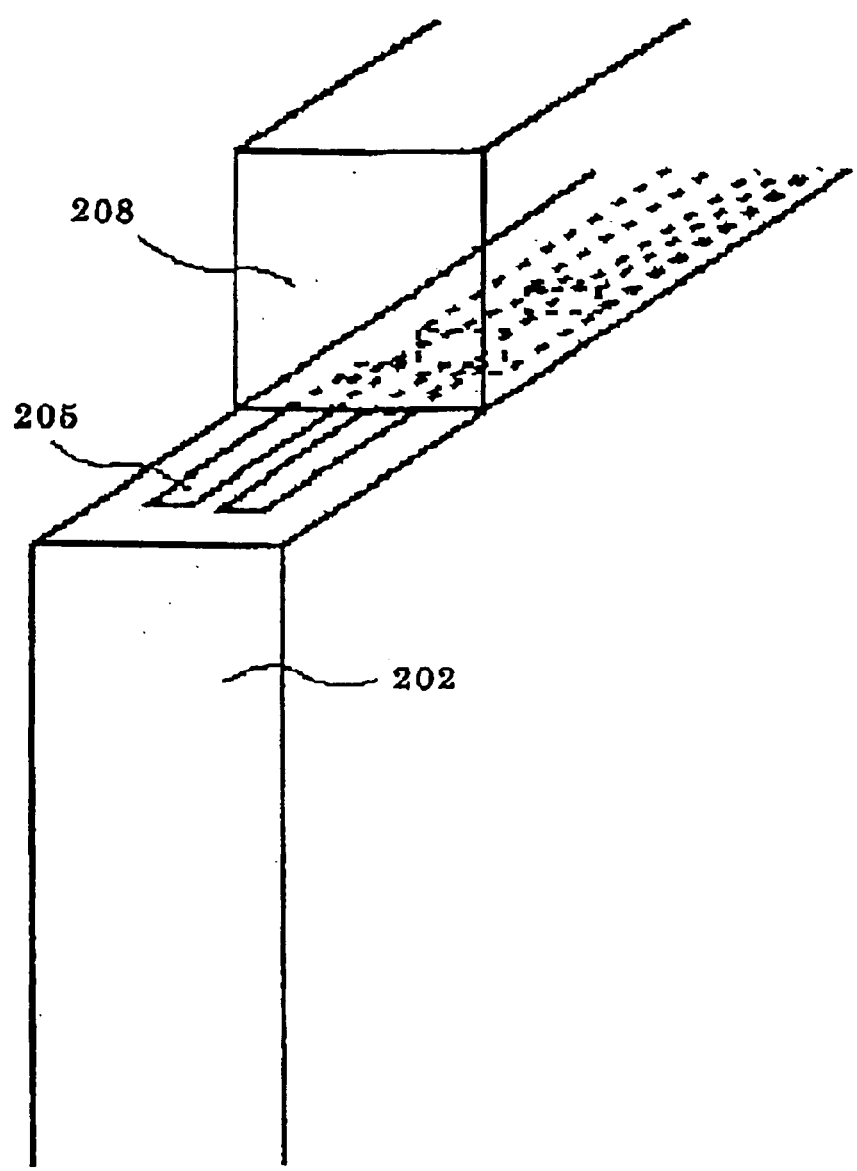

Then, as illustrated in FIG. 33G, the multi-layered optical conductor 201 is diced into the individual optical conductors 202.

[Twenty Seventh Embodiment]

Figure 34:
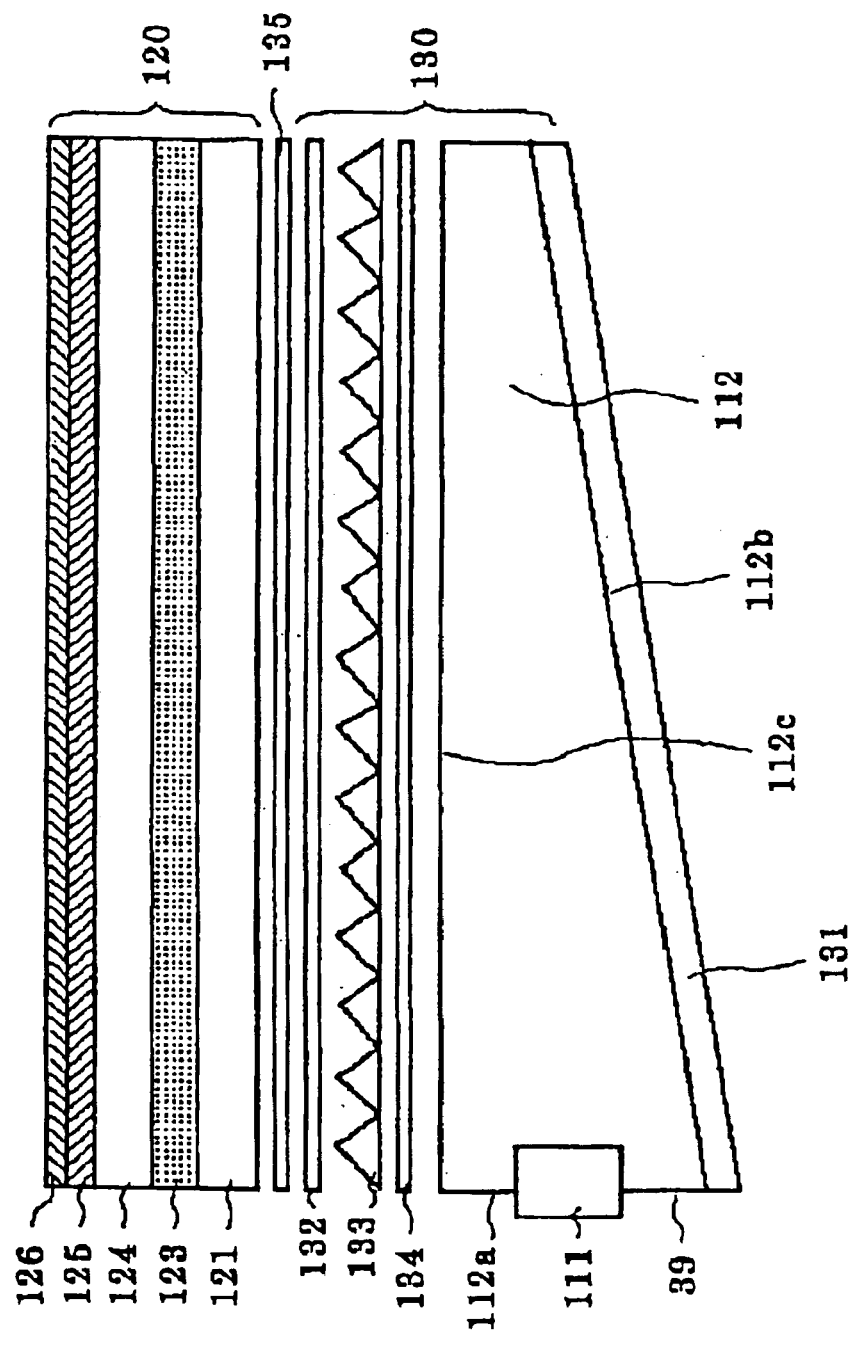
FIG. 34 is a cross-sectional view of a liquid crystal display device in accordance with the twenty seventh embodiment of the present invention.

FIG. 34 illustrates a transmission type liquid crystal display device including the lighting device 130 in accordance with the second embodiment, illustrated in FIG. 5.

As illustrated in FIG. 34, a half mirror 135 is located between the lighting device 130 and a liquid crystal display element 120.

In addition, the liquid crystal display device may further include a sensor for detecting brightness, and a controller for turning the lighting device 130 on or off in accordance with the brightness sensed by the sensor. The combination of the sensor and the controller ensures reduction in power consumption in comparison with a liquid crystal display device having neither the sensor nor the controller.

[Twenty Eighth Embodiment]

Figure 35A:
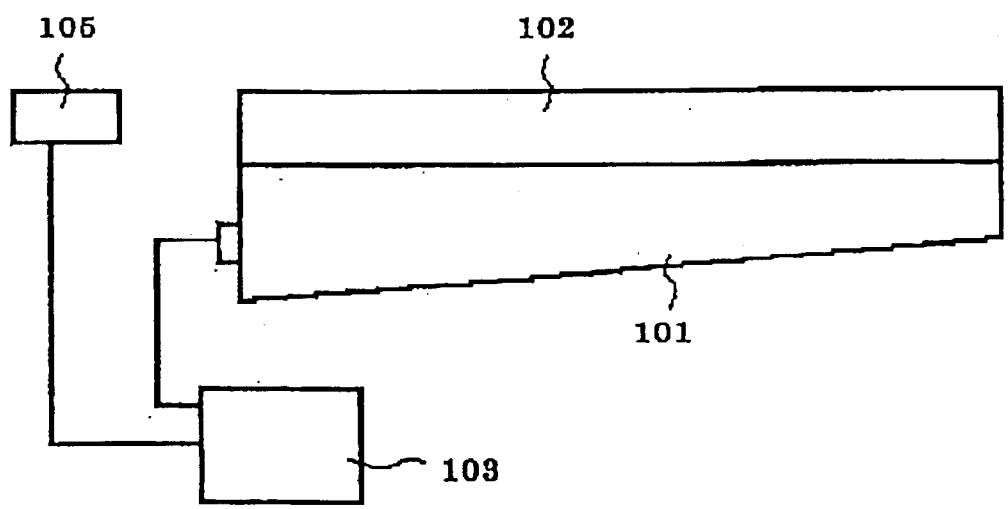
FIG. 35A is a block diagram of a transmission type liquid crystal display device in accordance with the twenty eighth embodiment of the present invention.

FIG. 35A illustrates a transmission type liquid crystal display device including a lighting device 101 in accordance with the invention.

The liquid crystal display device is comprised of a transmission type liquid crystal display element 102, a lighting device 101 for lighting the liquid crystal display element 102, a brightness sensor 105 for measuring a brightness around the liquid crystal display element 102, and a controller 103 which turns the lighting device 101 on or off.

In operation, the brightness sensor 105 measures a brightness around the liquid crystal display element 102, and transmits a signal indicative of the measured brightness, to the controller 103. The controller 103 compares the measured brightness to a threshold brightness. If the measured brightness is lower than the threshold brightness, the controller 103 turns the lighting device 101 on, whereas if the measured brightness is higher than the threshold brightness, the controller 103 turns the lighting device 101 off.

[Twenty Ninth Embodiment]

Figure 35B:
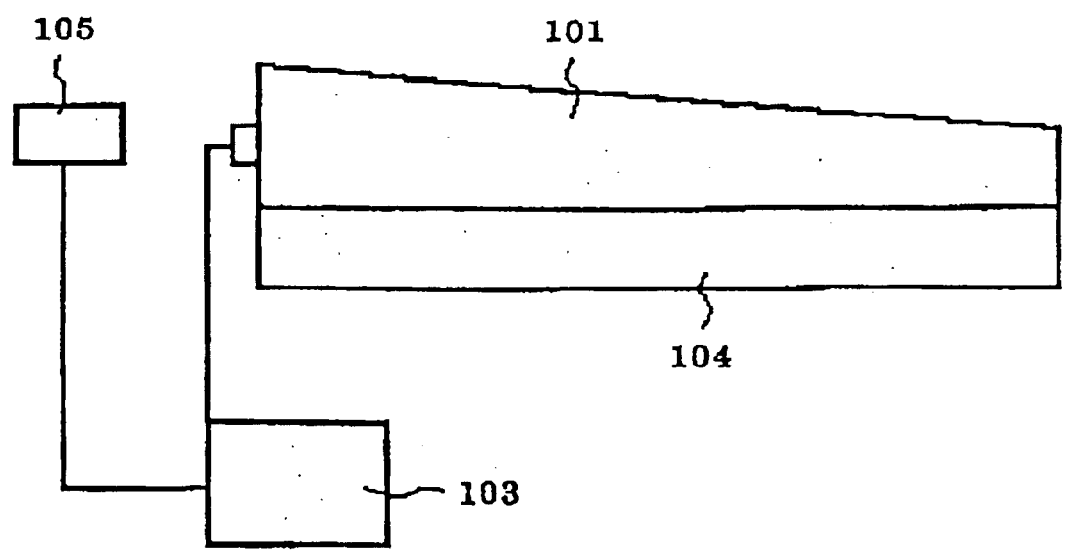
FIG. 35B is a block diagram of a reflection type liquid crystal display device in accordance with the twenty ninth embodiment of the present invention.

FIG. 35B illustrates a reflection type liquid crystal display device including a lighting device 101 in accordance with the invention.

The liquid crystal display device is comprised of a reflection type liquid crystal display element 104, a lighting device 101 for lighting the liquid crystal display element 104, a brightness sensor 105 for measuring a brightness around the liquid crystal display element 104, and a controller 103 which turns the lighting device 101 on or off.

The liquid crystal display device operates in the same way as the liquid crystal display device illustrated in FIG. 35A.

In the twenty eighth and twenty ninth embodiments, the lighting device is arranged at the rear of a transmission type liquid crystal display element and in front of a reflection type liquid crystal display element, respectively, and red, green and blue images are displayed in synchronization with turning on of the first to third electroluminescence subdevices. As a result, even though the liquid crystal display element does not include a color filter layer, it would be possible to display color images.

In accordance with the above-mentioned first to twenty ninth embodiments, an electroluminescence device is formed directly on an end surface of an optical conductor or partially embedded in an optical conductor. Hence, the lighting devices in accordance with the embodiments could prevent loss in lights emitted from the electroluminescence device, and reduce power consumption of the lighting device which consumes almost all power in the power consumed by a liquid crystal display device.

[Thirtieth Embodiment]

Figure 36:
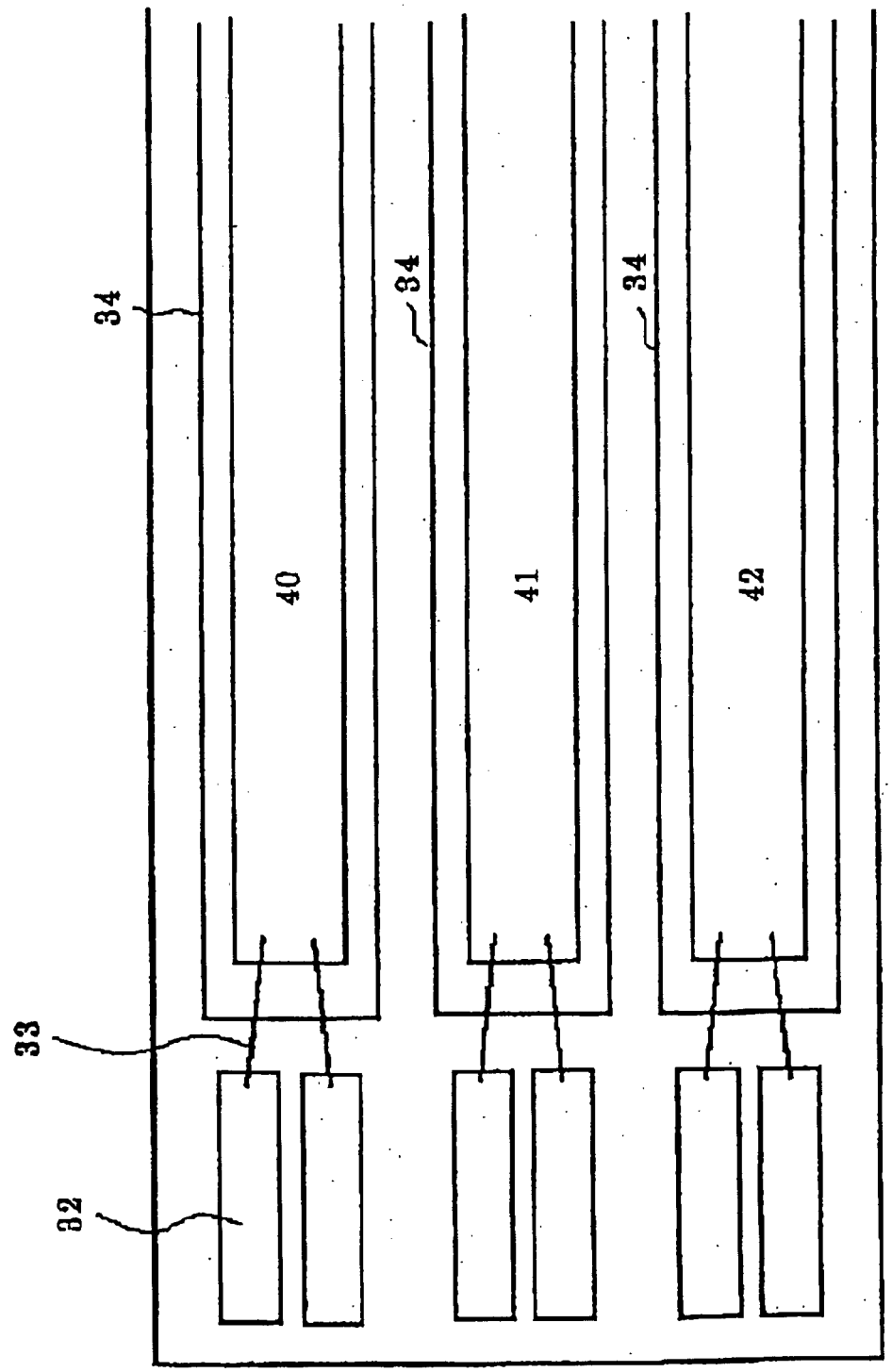
FIG. 36 is a plan view of an optical conductor in a lighting device in accordance with the thirtieth embodiment of the present invention.

FIG. 36 illustrates a reflection type liquid crystal display device including the conventional lighting device illustrated in FIG. 1 or the lighting device in accordance with the present invention. Namely, in the thirtieth embodiment, as mentioned later, there are fabricated a reflection type liquid crystal display device including the conventional lighting device illustrated in FIG. 1, and a reflection type liquid crystal display device including the lighting device in accordance with the present invention.

The light source 111 in the conventional lighting device is comprised of a cold cathode ray tube fixed on the end surface 112a of the optical conductor 112, and the lighting device in accordance with the present invention is comprised of the lighting device illustrated in FIG. 3, 9 or 12.

In the thirtieth embodiment, a metal electrode layer is composed of MgAg, a hole-injecting layer is composed of triphenyldiamine derivative (TPD), a red-light-emitting layer is composed of quinolinol aluminum complex (Alq) to which red fluorescent pigment is added, a green-light-emitting layer is composed of quinolinol aluminum complex (Alq), and a blue-light-emitting layer is composed of oxazole complex of zinc. The transparent electrode layer 47 is composed of ITO. The device 48a and the device 48b are both comprised of a transistor.

FIG. 36 is a plan view of an end surface of an optical conductor in the lighting device in accordance with the thirtieth embodiment.

As illustrated in FIG. 36, the end surface is formed with three recesses 34 in each of which a first electroluminescence sub-device 40, a second electroluminescence sub-device 41 and a third electroluminescence sub-device 42 are formed. Herein, the first to third electroluminescence sub-devices 40 to 42 emit red, green and blue lights, respectively. Three pairs of wiring terminals 32 are also formed on the end surface of the optical conductor in alignment with the first to third electroluminescence sub-devices 40 to 42. The first to third electroluminescence sub-devices 40 to 42 are electrically connected to the associated wiring terminal pairs 32 through bonding wires 33. Though not illustrated, the first to third electroluminescence sub-devices 40 to 42 are sealed with acrylic resin.

Figure 37:
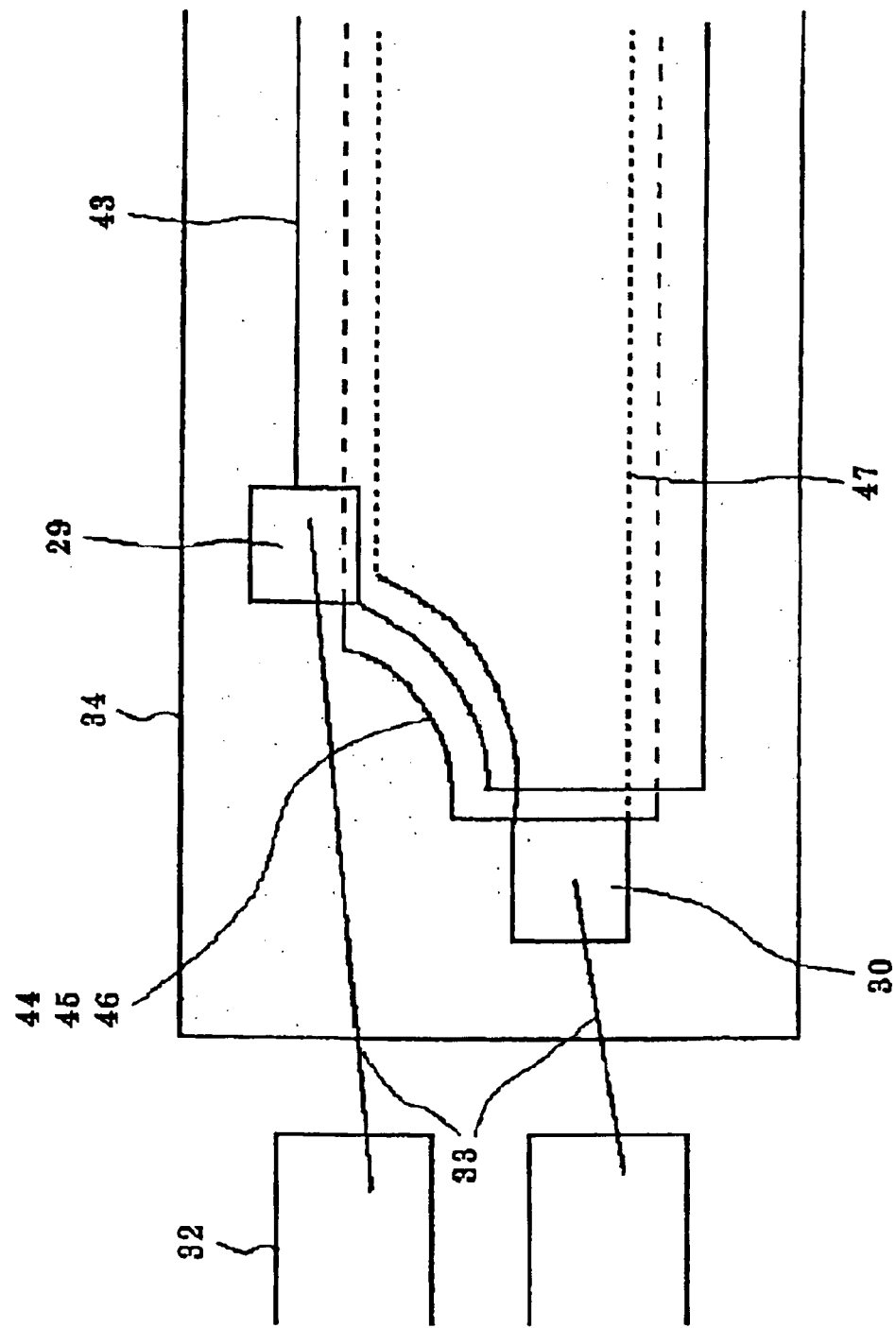
FIG. 37 is an enlarged plan view of the optical conductor illustrated in FIG. 36.

FIG. 37 is an enlarged view of one of the electroluminescence sub-devices formed at the end surface.

In the recess 34, the transparent electrode layer 47, the hole-injecting layer 46, the light-emitting layer 45, the electron-transporting layer 44, and the metal electrode layer 43 are formed in such patterns as illustrated in FIG. 37. The transparent electrode layer 47 is electrically connected at its end to a first terminal 30, and the metal electrode layer 43 is electrically connected at its end to a second terminal 29. The wiring terminal pair 32 is located outside the recess 34, and is electrically connected to the first and second terminals 30 and 29 through the bonding wires 33.

The conventional lighting device and the inventive lighting device in the thirtieth embodiment have the same structure as each other except a light source. The optical conductor is composed of acrylic resin, the transparent substrate is composed of glass, the protector is composed of aluminum oxide, the reflector is composed of aluminum, and the electrode substrate is composed of glass. As a liquid crystal cell is used a super twisted nematic (STC) mode liquid crystal cell.

The inventors conducted the following experiment, using the above-mentioned reflection type liquid crystal display devices one of which includes the conventional lighting device, and the other includes the lighting device in accordance with the present invention.

While the lighting device was kept activated and the brightness of a liquid crystal panel was kept fixed, power consumption was measured in both the first liquid crystal display device including the conventional lighting device the second liquid crystal display device including the lighting device in accordance with the present invention.

The power consumption in the first liquid crystal display device was 52 Watts, whereas the power consumption in the second liquid crystal display device was 31 Watts. Specifically, the second liquid crystal display device could reduce power consumption by about 40% in comparison with the first liquid crystal display device. This result verified that a liquid crystal display device including the lighting device in accordance with the present invention could significantly enhance an efficiency at which lights emitted from a light source were introduced into an optical conductor.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-357034 filed on Nov. 24, 2000 including specification, claims, drawings and summary is incorporated herein by reference in its entirety.

What is claimed is:

1. A lighting device comprising:
   (a) an electroluminescence device which acts as a light source; and
   (b) an optical conductor which introduces a light emitted from said electroluminescence device, to a liquid crystal display device,
   said electroluminescence device being formed on an end surface of said optical conductor,
   said electroluminescence device is comprised of a plurality of electroluminescence device groups each including a plurality of sub-devices emitting lights having different wavelengths from one another, and
   said electroluminescence device groups are periodically repeatedly arranged in a direction in which sub-devices are arranged.

2. A lighting device comprising:
   (a) an electroluminescence device which acts as a light source; and
   (b) an optical conductor which introduces a light emitted from said electroluminescence device, to a liquid crystal display device,
   said electroluminescence device being formed on an end surface of said optical conductor,
   said electroluminescence device is comprised of a plurality of electroluminescence device groups each including a plurality of sub-devices emitting lights having different wavelengths from one another, and said electroluminescence device groups are periodically repeatedly arranged in a direction perpendicular to a direction in which sub-devices are arranged.

3. A lighting device comprising:

(a) an electroluminescence device which acts as a light source; and (b) an optical conductor which introduces a light emitted from said electroluminescence device, to a liquid crystal display device, said electroluminescence device being formed on an end surface of said optical conductor, said electroluminescence device is comprised of a plurality of electroluminescence device groups each including a plurality of sub-devices emitting lights having different wavelengths from one another, and partitions between which said sub-devices are arranged or which at least partially surrounds said sub-devices.

4. The lighting device as set forth in claim 3, wherein each of said partitions is comprised of resist.

5. A lighting device comprising:

(a) an electroluminescence device which acts as a light source; and (b) an optical conductor which introduces a light, emitted from said electroluminescence device, to a liquid crystal display device, said electroluminescence device being formed on an end surface of said optical conductor, said electroluminescence device is comprised of a plurality of electroluminescence device groups each including a plurality of sub-devices emitting lights having different wavelengths from one another, said electroluminescence device has a multi-layered structure including a transparent electrode layer, a hole-injecting layer, a light-emitting layer, an electron-transporting layer, and a metal electrode layer stacked in this order as viewed from said optical conductor and at least one of said metal electrode layer, said electron-transporting layer, said hole-injecting layer and said transparent electrode layer is formed across said sub-devices such that each of said sub-devices commonly includes said at least one of said metal electrode layer, said electron-transporting layer, said hole-injecting layer and said transparent electrode layer.

6. The lighting device as set forth in claim 5, wherein one of said metal electrode layer and said transparent electrode layer is formed across said sub-devices, and the other has a smaller width than a width of each of said sub-devices.

7. The lighting device as set forth in claim 5, wherein said light-emitting layer and said electron-transporting layer are replaced with a single layer having the functions of said light-emitting layer and said electron-transporting layer.

8. The lighting device as set forth in claim 5, wherein said light-emitting layer, said electron-transporting layer and said hole-injecting layer are replaced with a single layer having the functions of said light-emitting layer, said electron-transporting layer and said hole-injecting layer.

9. The lighting device as set forth in claim 1, further comprising a light-permeable expander formed on said end surface of said optical conductor, said electroluminescence device being formed on said expander such that a dispersion angle of a light emitted from said electroluminescence device is reduced.

10. The lighting device as set forth in claim 9, wherein said electroluminescence device has a shape reflecting a shape of a surface of said expander.

11. The lighting device as set forth in claim 10, wherein said expander has an arcuate surface.

12. The lighting device as set forth in claim 9, wherein said electroluminescence device is comprised of a transparent electrode layer, a holeinjecting layer, a light-emitting layer, an electron transporting layer and a metal electrode layer stacked in this order as viewing from said optical conductor, and wherein said expander has an index of refraction greater than indices of refraction of said hole-injecting layer, said light-emitting layer and said electron-transporting layer.

13. A lighting device comprising:

(a) an electroluminescence device which acts as a light source; and (b) an optical conductor which introduces a light emitted from said electroluminescence device, to a liquid crystal display device, said electroluminescence device being at least partially embedded in said optical conductor such that at least one layer among layers constituting said electroluminescence device is embedded in said optical conductor, and a face of said electroluminescence device through which said electroluminescence device emits a light is formed in the form of a line in a length-wise direction of said end surface of said optical conductor.

14. The lighting device as set forth in claim 13, further comprising a reflector covering said end surface of said optical conductor to prevent a light having been introduced into said optical conductor from said electroluminescence device, from leaking out of said end surface of said optical conductor.

15. The lighting device as set forth in claim 13, wherein said electroluminescence device is comprised of a plurality of electroluminescence device groups each including a plurality of sub-devices emitting lights having different wavelengths from one another.

16. The lighting device as set forth in claim 15, wherein said electroluminescence device groups are periodically repeatedly arranged in a direction in which sub-devices are arranged.

17. The lighting device as set forth in claim 15, wherein said electroluminescence device groups are periodically repeatedly arranged in a direction perpendicular to a direction in which sub-devices are arranged.

18. The lighting device as set forth in claim 15, wherein each of said electroluminescence device groups includes a first sub-device emitting a red light, a second sub-device emitting a green light, and a third sub-device emitting a blue light.

19. The lighting device as set forth in claim 15, further comprising partitions between which said sub-devices are arranged or which at least partially surrounds said sub-devices.

20. The lighting device as set forth in claim 19, wherein each of gaid partitions is comprised of resist.

21. The lighting device as set forth in claim 13, wherein said electroluminescence device emits a light having a mixture color of red, green and blue.

22. The lighting device as set forth in claim 13, wherein said electroluminescence device has a multi-layered structure including a transparent electrode layer, a hole-injecting layer, a light-emitting layer, an electron-transporting layer, and a metal electrode layer stacked in this order as viewing from said optical conductor.

23. The lighting device as set forth in claim 13, wherein said electroluminescence device is comprised of a plurality of electroluminescence device groups each including a plurality of sub-devices emitting lights having different wavelengths from one another, and said electroluminescence device has a multi-layered structure including a transparent electrode layer, a hole-injecting layer, a light-emitting layer, an electron-transporting layer, and a metal electrode layer stacked in this order as viewing from said optical conductor.

24. The lighting device as set forth in claim 23, wherein at least one of said metal electrode layer, said electron-transporting layer, said hole-injecting layer and said transparent electrode layer is formed across said sub-devices such that each of said sub-devices commonly includes said at least one of said metal electrode layer, said electron-transporting layer, said hole-injecting layer and said transparent electrode layer.

25. The lighting device as set forth in claim 24, wherein one of said metal electrode layer and said transparent electrode layer is formed across said subdevices, and the other has a smaller width than a width of each of said sub-devices.

26. The lighting device as set forth in claim 24, wherein said light-emitting layer and said electron-transporting layer are replaced with a single layer having the functions of said light-emitting layer and said electron-transporting layer.

27. The lighting device as set forth in claim 24, wherein said light-emitting layer, said electron-transporting layer and said hole-injecting layer are replaced with a single layer having the functions of said light-emitting layer, said electron-transporting layer and said hole-injecting layer.

28. The lighting device as set forth in claim 13, wherein said electroluminescence device emits a light by applying a current to a thin organic film.

29. The lighting device as set forth in claim 13, wherein said optical conductor is formed with a sawtooth-shaped portion at a first surface through which a light emitted from said electroluminescence device passes outwardly.

30. The lighting device as set forth in claim 29, wherein said sawtooth portion is defined by surfaces extending in parallel with said first surface and surfaces extending perpendicularly to said first surface.

31. The lighting device as set forth in claim 13, wherein said optical conductor is tapered at at least one of upper and lower surfaces adjacent to said end surface such that an incident angle of a light emitted from said electroluminescence device into said optical conductor is reduced.

32. The lighting device as set forth in claim 15, wherein said optical conductor is tapered around each of said electroluminescence device groups at at least one of upper and lower surfaces adjacent to said end surface associated with each of said electroluminescence device groups such that an incident angle of a light emitted from each of said electroluminescence device groups into said optical conductor is reduced.

33. The lighting device as set forth in claim 13, further comprising a resin entirely covering said electroluminescence device therewith to hermetically seal said electroluminescence device from surroundings.

34. The lighting device as set forth in claim 13, further comprising a sealing cap entirely covering said electroluminescence device therewith to hermetically seal said electroluminescence device from surroundings.

35. The lighting device as set forth in claim 33, further comprising at least one of a deoxidizer and a dehydrator sandwiched between said resin and said electroluminescence device.

36. The lighting device as set forth in claim 34, further comprising at least one of a deoxidizer and a dehydrator sandwiched between said sealing cap and said electroluminescence device.

37. The lighting device as set forth in claim 34, wherein said sealing cap has a function of at least one of deoxidization and dehydration.

38. A liquid crystal display device comprising:
(a) a first substrate;
(b) a second substrate;
(c) a liquid crystal layer sandwiched between said first and second substrates; and
(d) a lighting device emitting a light through said second substrate, said liquid crystal layer and said first substrate in this order such that a viewer can see produced images through said light having been reflected at said first substrate, said lighting device including:
(d1) an electroluminescence device which acts as a light source; and
(d2) an optical conductor which introduces a light emitted from said electroluminescence device, to a liquid crystal display device,
said electroluminescence device being at least partially embedded in said optical conductor such that at least one layer among layers constituting said electroluminescence device is embedded in said optical conductor,
said electroluminescence device is comprised of a first sub-device emitting a red light, a second sub-device emitting a green light, and a third sub-device emitting a blue light, and wherein images which have to be displayed as red, green or blue images are presented in synchronization with emission of said red, green or blue light from said first, second or third sub-device, respectively.

39. The liquid crystal display device as set forth in claim 38, further comprising:
(e) a brightness detector which detects a brightness around said liquid crystal display device; and
(f) a controller which turns said lighting device on or off in accordance with said brightness detected by said brightness detector.

40. A method of fabricating a lighting device including an electroluminescence device which acts as a light source, and an optical conductor which introduces a light emitted from said electroluminescence device, to a liquid crystal display device, comprising the steps of (a) forming said electroluminescence device on an end surface of said optical conductor and (b) forming a light-permeable expander on said end surface of said optical conductor, said electroluminescence device being formed on said light-permeable expander, wherein said step (b) includes the steps of:
(b1) applying a first material onto said end surface of said optical conductor, said first material having a softening temperature lower than a softening temperature of a material of which said optical conductor is composed; and
(b2) annealing said optical conductor to soften said first material.

41. The method as set forth in claim 40, wherein said light-permeable expander is formed by injection molding.

42. The method as set forth in 40, wherein said light-permeable expander is formed by ink-jet injection.

43. A method of fabricating a lighting device including an electroluminescence device which acts as a light source, and an optical conductor which introduces a light emitted from said electroluminescence device, to a liquid crystal display device, comprising the steps of:
(a) forming said electroluminescence device on an end surface of said optical conductor,
(b) forming a wiring pattern on said end surface of said optical conductor; and
(c) electrically connecting a transparent electrode and a metal electrode of said electroluminescence device to said wiring pattern through an electrical conductor.

44. A method of fabricating a lighting device including an electroluminescence device which acts as a light source, and an optical conductor which introduces a light emitted from said electroluminescence device, to a liquid crystal display device, comprising the steps of
(a) forming said electroluminescence device such that at least one layer among layers constituting said electroluminescence device is embedded in said optical conductor,
(b) forming a wiring pattern on said end surface of said optical conductor; and
(c) electrically connecting a transparent electrode and a metal electrode of said electroluminescence device to said wiring pattern through an electrical conductor.

45. The method as set forth in claim 44, further comprising the step of (d) forming a recess at said end surface of said optical conductor, said electroluminescence device being formed in said recess.

46. The method as set forth in claim 44, further comprising the step of forming a reflector covering said end surface of said optical conductor to prevent a light, having been introduced into said optical conductor from said electroluminescence device, from leaking out of said end surface of said optical conductor.

47. The method as set forth in claim 44, further comprising the step of tapering said optical conductor at at least one of upper and lower surfaces adjacent to said end surface such that an incident angle of a light emitted from said electroluminescence device into said optical conductor is reduced.

48. The lighting device as set forth in claim 1, wherein a face of said electroluminescence device through which said electroluminescence device emits a light is formed in the form of a line in a length-wise direction of said end surface of said optical conductor.

49. The lighting device as set forth in claim 1, further comprising a reflector covering said end surface of said optical conductor to prevent a light, having been introduced into said optical conductor from said electroluminescence device, from leaking out of said end surface of said optical conductor.

50. The lighting device as set forth in claim 2, wherein a face of said electroluminescence device through which said electroluminescence device emits a light is formed in the form of a line in a length wise direction of said end surface of said optical conductor.

51. The lighting device as set forth in claim 2, further comprising a reflector covering said end surface of said optical conductor to prevent a light, having been introduced into said optical conductor from said electroluminescence device, from leaking out of said end surface of said optical conductor.

52. The lighting device as set forth in claim 1, wherein each of said electroluminescence device groups includes a first sub-device emitting a red light, a second sub-device emitting a green light, and a third sub device emitting a blue light.

53. The lighting device as set forth in claim 2, wherein each of said electroluminescence device groups includes a first sub-device emitting a red light, a second sub-device emitting a green light, and a third sub device emitting a blue light.

54. The lighting device as set forth in claim 1, wherein said electroluminescence device emits a light having a mixture color of red, green and blue.

55. The lighting device as set forth in claim 1, wherein said electroluminescence device has a multi-layered structure including a transparent electrode layer, a hole-injecting layer, a light-emitting layer, an electron-transporting layer, and a metal electrode layer stacked in this order as viewing from said optical conductor.

56. The lighting device as set forth in claim 1, wherein said electroluminescence device is comprised of a plurality of electroluminescence device groups each including a plurality of sub-devices emitting lights having different wavelengths from one another, and said electroluminescence device has a multi-layered structure including a transparent electrode layer, a hole-injecting layer, a light-emitting layer, an electron-transporting layer, and a metal electrode layer stacked in this order as viewing from said optical conductor.

57. The lighting device as set forth in claim 2, wherein said electroluminescence device emits a light having a mixture color of red, green and blue.

58. The lighting device as set forth in claim 2, wherein said electroluminescence device has a multi-layered structure including a transparent electrode layer, a hole-injecting layer, a light-emitting layer, an electron-transporting layer, and a metal electrode layer stacked in this order as viewing from said optical conductor.

59. The lighting device as set forth in claim 2, wherein said electroluminescence device is comprised of a plurality of electroluminescence device groups each including a plurality of sub-devices emitting lights having different wavelengths from one another, and said electroluminescence device has a multi-layered structure including a transparent electrode layer, a hole-injecting layer, a light-emitting layer, an electron-transporting layer, and a metal electrode layer stacked in this order as viewing from said optical conductor.

60. The lighting device as set forth in claim 3, wherein said electroluminescence device emits a light having a mixture color of red, green and blue.

61. The lighting device as set forth in claim 3, wherein said electroluminescence device has a multi-layered structure including a transparent electrode layer, a hole-injecting layer, a light-emitting layer, an electron-transporting layer, and a metal electrode layer stacked in this order as viewing from said optical conductor.

62. The lighting device as set forth in claim 3, wherein said electroluminescence device is comprised of a plurality of electroluminescence device groups each including a plurality of sub-devices emitting lights having different wavelengths from one another, and said electroluminescence device has a multi-layered structure including a transparent electrode layer, a hole-injecting layer, a light-emitting layer, an electron-transporting layer, and a metal electrode layer stacked in this order as viewing from said optical conductor.

63. The lighting device as set forth in claim 1, wherein said electroluminescence device emits a light by applying a current to a thin organic film.

64. The lighting device as set forth in claim 1, wherein said optical conductor is formed with a sawtooth-shaped portion at a first surface through which a light emitted from said electroluminescence device passes outwardly.

65. The lighting device as set forth in claim 64, wherein said sawtooth portion is defined by surfaces extending in parallel with said first surface and surfaces extending perpendicularly to said first surface.

66. The lighting device as set forth in claim 2, wherein said electroluminescence device emits a light by applying a current to a thin organic film.

67. The lighting device as set forth in claim 2, wherein said optical conductor is formed with a sawtooth-shaped portion at a first surface through which a light emitted from said electroluminescence device passes outwardly.

68. The lighting device as set forth in claim 67, wherein said sawtooth portion is defined by surfaces extending in parallel with said first surface and surfaces extending perpendicularly to said first surface.

69. The lighting device as set forth in claim 3, wherein said electroluminescence device emits a light by applying a current to a thin organic film.

70. The lighting device as set forth in claim 3, wherein said optical conductor is formed with a sawtooth-shaped portion at a first surface through which a light emitted from said electroluminescence device passes outwardly.

71. The lighting device as set forth in claim 70, wherein said sawtooth portion is defined by surfaces extending in parallel with said first surface and surfaces extending perpendicularly to said first surface.

72. The lighting device as set forth in claim 2, further comprising a light-permeable expander formed on said end surface of said optical conductor, said electroluminescence device being formed on said expander such that a dispersion angle of a light emitted from said ectroluminescence device is reduced.

73. The lighting device as set forth in claim 72, wherein said electroluminescence device has a shape reflecting a shape of a surface of said expander.

74. The lighting device as set forth in claim 73, wherein said expander has an arcuate surface.

75. The lighting device as set forth in claim 72, wherein
said electroluminescence device is comprised of a transparent electrode layer, a holeinjecting layer, a light-emitting layer, an electron transporting layer and a metal electrode layer stacked in this order as viewing from said optical conductor, and wherein
said expander has an index of refraction greater than indices of refraction of said hole-injecting layer, said light-emitting layer and said electron-transporting layer.

76. The lighting device as set forth in claim 3, further comprising a light-permeable expander formed on said end surface of said optical conductor,
said electroluminescence device being formed on said expander such that a dispersion angle of a light emitted from said electroluminescence device is reduced.

77. The lighting device as set forth in claim 76, wherein said electroluminescence device has a shape reflecting a shape of a surface of said expander.

78. The lighting device as set forth in claim 77, wherein said expander has an arcuate surface.

79. The lighting device as set forth in claim 76, wherein
said electroluminescence device is comprised of a transparent electrode layer, a holeinjecting layer, a light-emitting layer, an electron transporting layer and a metal electrode layer stacked in this order as viewing from said optical conductor, and
wherein said expander has an index of refraction greater than indices of refraction of said hole-injecting layer, said light-emitting layer and said electron-transporting layer.

80. The lighting device as set forth in claim 1, wherein said optical conductor is formed at said end surface thereof with a recess in which said electroluminescence device is formed.

81. The lighting device as set forth in claim 80, wherein said recess is arcuate.

82. The lighting device as set forth in claim 1, wherein said optical conductor is tapered at at least one of upper and lower surfaces adjacent to said end surface such that an incident angle of a light emitted from said electroluminescence device into said optical conductor is reduced.

83. The lighting device as set forth in claim 1, wherein said optical conductor is tapered around each of said electroluminescence device groups at at least one of upper and lower surfaces adjacent to said end surface associated with each of said electroluminescence device groups such that an incident angle of a light emitted from each of said electroluminescence device groups into said optical conductor is reduced.

84. The lighting device as set forth in claim 1, further comprising a resin entirely covering said electroluminescence device therewith to hermetically seal said electroluminescence device from surroundings.

85. The lighting device as set forth in claim 1, further comprising a sealing cap entirely covering said electroluminescence device therewith to hermetically seal said electroluminescence device from surroundings.

86. The lighting device as set forth in claim 84, further comprising at least one of a deoxidizer and a dehydrator sandwiched between said resin and said electroluminescence device.

87. The lighting device as set forth in claim 85, further comprising at least one of a deoxidizer and a dehydrator sandwiched between said sealing cap and said electroluminescence device.

88. The lighting device as set forth in claim 85, wherein said sealing cap has a function of at least one of deoxidization and dehydration.

89. The lighting device as set forth in claim 2, wherein said optical conductor is formed at said end surface thereof with a recess in which said electroluminescence device is formed.

90. The lighting device as set forth in claim 89, wherein said recess is arcuate.

91. The lighting device as set forth in claim 2, wherein said optical conductor is tapered at at least one of upper and lower surfaces adjacent to said end surface such that an incident angle of a light emitted from said electroluminescence device into said optical conductor is reduced.

92. The lighting device as set forth in claim 2, wherein said optical conductor is tapered around each of said electroluminescence device groups at at least one of upper and lower surfaces adjacent to said end surface associated with each of said electroluminescence device groups such that an incident angle of a light emitted from each of said electroluminescence device groups into said optical conductor is reduced.

93. The lighting device as set forth in claim 2, further comprising a resin entirely covering said electroluminescence device therewith to hermetically seal said electroluminescence device from surroundings.

94. The lighting device as set forth in claim 2, further comprising a sealing cap entirely covering said electroluminescence device therewith to hermetically seal said electroluminescence device from surroundings.

95. The lighting device as set forth in claim 93, further comprising at least one of a deoxidizer and a dehydrator sandwiched between said resin and said electroluminescence device.

96. The lighting device as set forth in claim 94, further comprising at least one of a deoxidizer and a dehydrator sandwiched between said sealing cap and said electroluminescence device.

97. The lighting device as set forth in claim 94, wherein said sealing cap has a function of at least one of deoxidization and dehydration.

98. The lighting device as set forth in claim 3, wherein said optical conductor is formed at said end surface thereof with a recess in which said electroluminescence device is formed.

99. The lighting device as set forth in claim 98, wherein said recess is arcuate.

100. The lighting device as set forth in claim 3, wherein said optical conductor is tapered at at least one of upper and lower surfaces adjacent to said end surface such that an incident angle of a light emitted from said electroluminescence device into said optical conductor is reduced.

101. The lighting device as set forth in claim 3, wherein said optical conductor is tapered around each of said electroluminescence device groups at at least one of upper and lower surfaces adjacent to said end surface associated with each of said electroluminescence device groups such that an incident angle of a light emitted from each of said electroluminescence device groups into said optical conductor is reduced.

102. The lighting device as set forth in claim 3, further comprising a resin entirely covering said electroluminescence device therewith to hermetically seal said electroluminescence device from surroundings.

103. The lighting device as set forth in claim 3, further comprising a sealing cap entirely covering said electroluminescence device therewith to hermetically seal said electroluminescence device from surroundings.

104. The lighting device as set forth in claim 102, further comprising at least one of a deoxidizer and a dehydrator sandwiched between said resin and said electroluminescence device.

105. The lighting device as set forth in claim 103, further comprising at least one of a deoxidizer and a dehydrator sandwiched between said sealing cap and said electroluminescence device.

106. The lighting device as set forth in claim 103, wherein said sealing cap has a function of at least one of deoxidization and dehydration.

107. A liquid crystal display device comprising:
(a) a first substrate;
(b) a second substrate;
(c) a liquid crystal layer sandwiched between said first and second substrates;
(d) a lighting device emitting a light through said first substrate, said liquid crystal layer and said second substrate in this order such that a viewer can see produced images through said light, said lighting device including:
(d1) an electroluminescence device which acts as a light source; and
(d2) an optical conductor which introduces a light emitted from said electroluminescence device, to a liquid crystal display device, said electroluminescence device being formed on an end surface of said optical conductor, and
(e) a half-mirror located between said first substrate and said optical conductor,
said electroluminescence device being comprised of a first sub-device emitting a red light, a second sub-device emitting a green light, and a third sub-device emitting a blue light, and images which have to be displayed as red, green or blue images are presented in synchronization with emission of said red, green or blue light from said first, second or third sub-device, respectively.

108. The liquid crystal device as set forth in claim 107, further comprising:
(f) a brightness detector which detects a brightness around said liquid crystal display device; and
(g) a controller which turns said lighting device on or off in accordance with said brightness detected by said brightness detector.

109. The method as set forth in claim 40, further comprising the step of forming a reflector covering said end surface of said optical conductor to prevent a light, having been introduced into said optical conductor from said electroluminescence device, from leaking out of said end surface of said optical conductor.

110. The method as set forth in claim 40, further comprising the step of tapering said optical conductor at at least one of upper and lower surfaces adjacent to said end surface such that an incident angle of a light emitted from said electroluminescence device into said optical conductor is reduced.

* * * * *